(12) United States Patent
Khan et al.

(10) Patent No.: US 9,542,231 B2
(45) Date of Patent: Jan. 10, 2017

(54) EFFICIENT EXECUTION OF PARALLEL COMPUTER PROGRAMS

(75) Inventors: Rishi L. Khan, Wilmington, DE (US);
Daniel Orozco, Newark, DE (US);
Guang R. Gao, Newark, DE (US)

(73) Assignee: ET International, Inc., Newark, DE (US)

( * ) Notice: Subject to any disclaimer, the term of this patent is extended or adjusted under 35 U.S.C. 154(b) by 34 days.

(21) Appl. No.: 13/086,132

(22) Filed: Apr. 13, 2011

(65) Prior Publication Data

US 2011/0289507 A1    Nov. 24, 2011

Related U.S. Application Data

(60) Provisional application No. 61/323,362, filed on Apr. 13, 2010, provisional application No. 61/377,067, (Continued)

(51) Int. Cl.
*G06F 9/46* (2006.01)
*G06F 9/50* (2006.01)
*G06F 9/45* (2006.01)

(52) U.S. Cl.
CPC ............ *G06F 9/5066* (2013.01); *G06F 8/451* (2013.01); *G06F 9/5094* (2013.01);
(Continued)

(58) Field of Classification Search
None
See application file for complete search history.

(56) References Cited

U.S. PATENT DOCUMENTS 6,061,709 A *  5/2000  Bronte .................. G06F 9/4812
                                                    718/102
2003/0191927 A1    10/2003  Joy et al.
(Continued)

FOREIGN PATENT DOCUMENTS

CN    101533417 A    9/2009
WO      03102758 A1   12/2003

OTHER PUBLICATIONS

International Preliminary Report on Patenability issued in PCT/US2011/032316, mailed Jun. 17, 2011.
(Continued)

*Primary Examiner* — Gregory A Kessler
(74) *Attorney, Agent, or Firm* — Panitch Schwarze Belisario & Nadel LLP

(57) ABSTRACT

The present invention, known as runspace, relates to the field of computing system management, data processing and data communications, and specifically to synergistic methods and systems which provide resource-efficient computation, especially for decomposable many-component tasks executable on multiple processing elements, by using a metric space representation of code and data locality to direct allocation and migration of code and data, by performing analysis to mark code areas that provide opportunities for runtime improvement, and by providing a low-power, local, secure memory management system suitable for distributed invocation of compact sections of code accessing local memory. Runspace provides mechanisms supporting hierarchical allocation, optimization, monitoring and control, and supporting resilient, energy efficient large-scale computing.

15 Claims, 53 Drawing Sheets

Related U.S. Application Data filed on Aug. 25, 2010, provisional application No. 61/386,472, filed on Sep. 25, 2010.

(52) U.S. Cl.
CPC ....... *G06F 2209/501* (2013.01); *Y02B 60/142* (2013.01); *Y02B 60/167* (2013.01)

(56) References Cited

U.S. PATENT DOCUMENTS

| | | |
|---|---|---|
| 2005/0188177 A1 | 8/2005 | Gao et al. |
| 2008/0189522 A1 | 8/2008 | Meil et al. |
| 2009/0164399 A1 | 6/2009 | Bell, Jr. et al. |
| 2009/0259713 A1 | 10/2009 | Blumrich et al. |
| 2009/0288086 A1 | 11/2009 | Ringseth et al. |

OTHER PUBLICATIONS

International Search Report and Written Opinion, PCT/US11/32316, issued Jun. 17, 2011.

Extended European Search Report issued Nov. 17, 2014 in EP Application No. 11769525.4.

Augonnet et al, "Automatic Calibration of Performance Models on Hetergeneous Multicore Architectures," Parallel Processing Workshops, The Netherlands, pp. 56-65 (Aug. 25, 2009).

Hormati et al, "Flextream: Adaptive Compilation of Streaming Applications for Heterogeneous Architectures," 18th International Conference on Parallel Architectures and Compilation Techniques, Piscataway, NJ, pp. 214-223 (Sep. 12, 2009).

Maheswaran et al, "A dynamic matching and scheduling algorithm for heterogeneous computing systems," Seventh Proceedings of the Heterogeneous Computer Workshop, Orlando, FL, pp. 57-69 (Mar. 30, 1998).

Pllana et al, "Towards an Intelligent Environment for Programming Multi-core Computing Systems," Euro-par 2008 workshops—parallel processing, Berlin, DE, pp. 141-151 (Aug. 25, 2008).

Dolbeau et al, "HMPP: A Hybrid Multi-core Parallel Programming Environment," Proceedings of the Workshop on General Purpose Processing on Graphics Processing Unit, Boston, MA, pp. 1-5 (Oct. 4, 2007).

English translation of an Office Action and Search Report issued Aug. 12, 2015 in CN Application No. 201180019116.4.

Veen, "Dataflow Machine Architecture", ACM Computing Surveys, vol. 18, No. 4, pp. 365-396, Dec. 1986.

Culler, "Dataflow Architectures" Laboratory for Computer Science, pp. 1-34, Feb. 12, 1986.

\* cited by examiner

FIG. 1  Exemplary runspace architecture
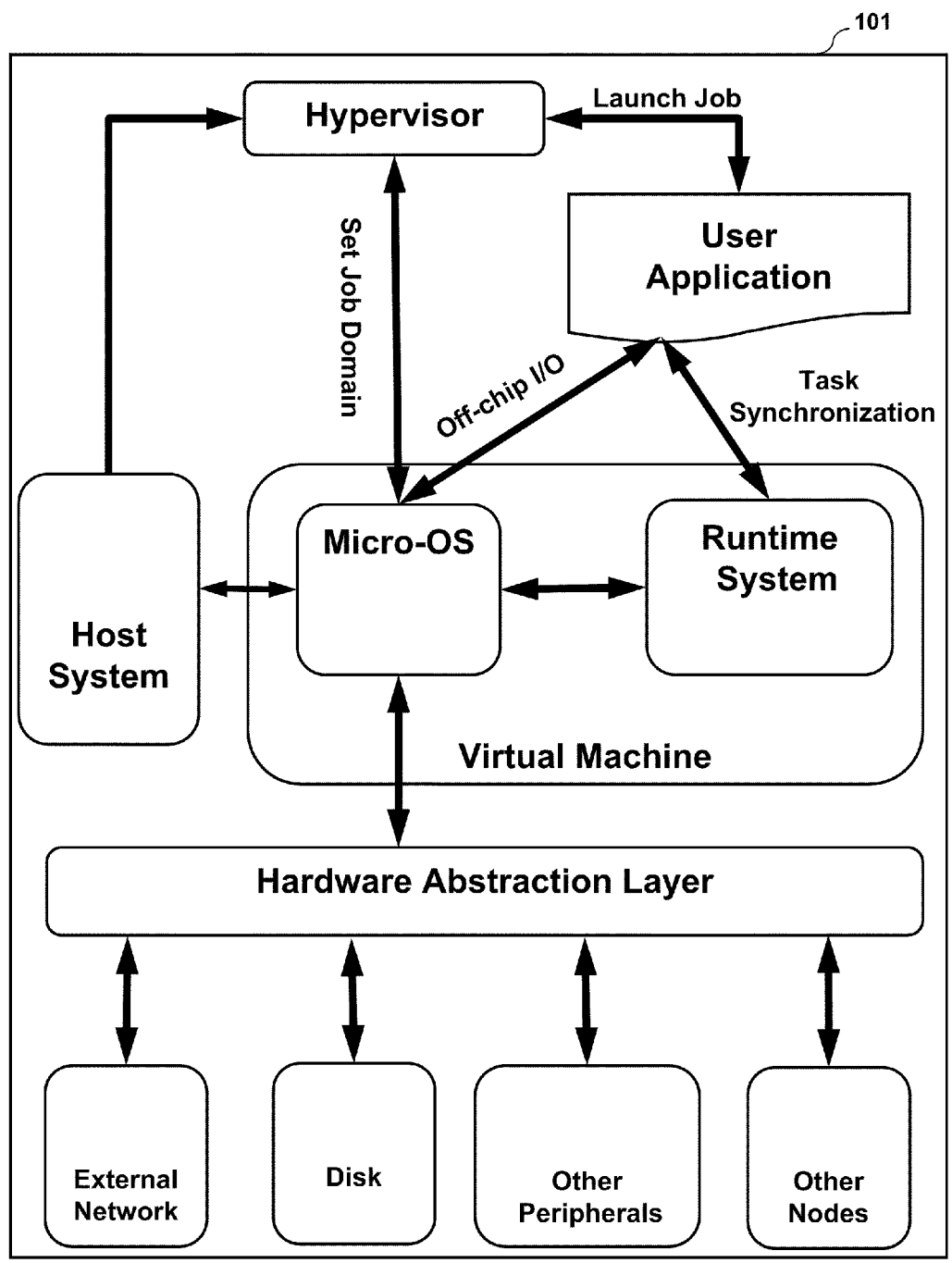

FIG. 2    Exemplary runspace allocation with multiple scopes
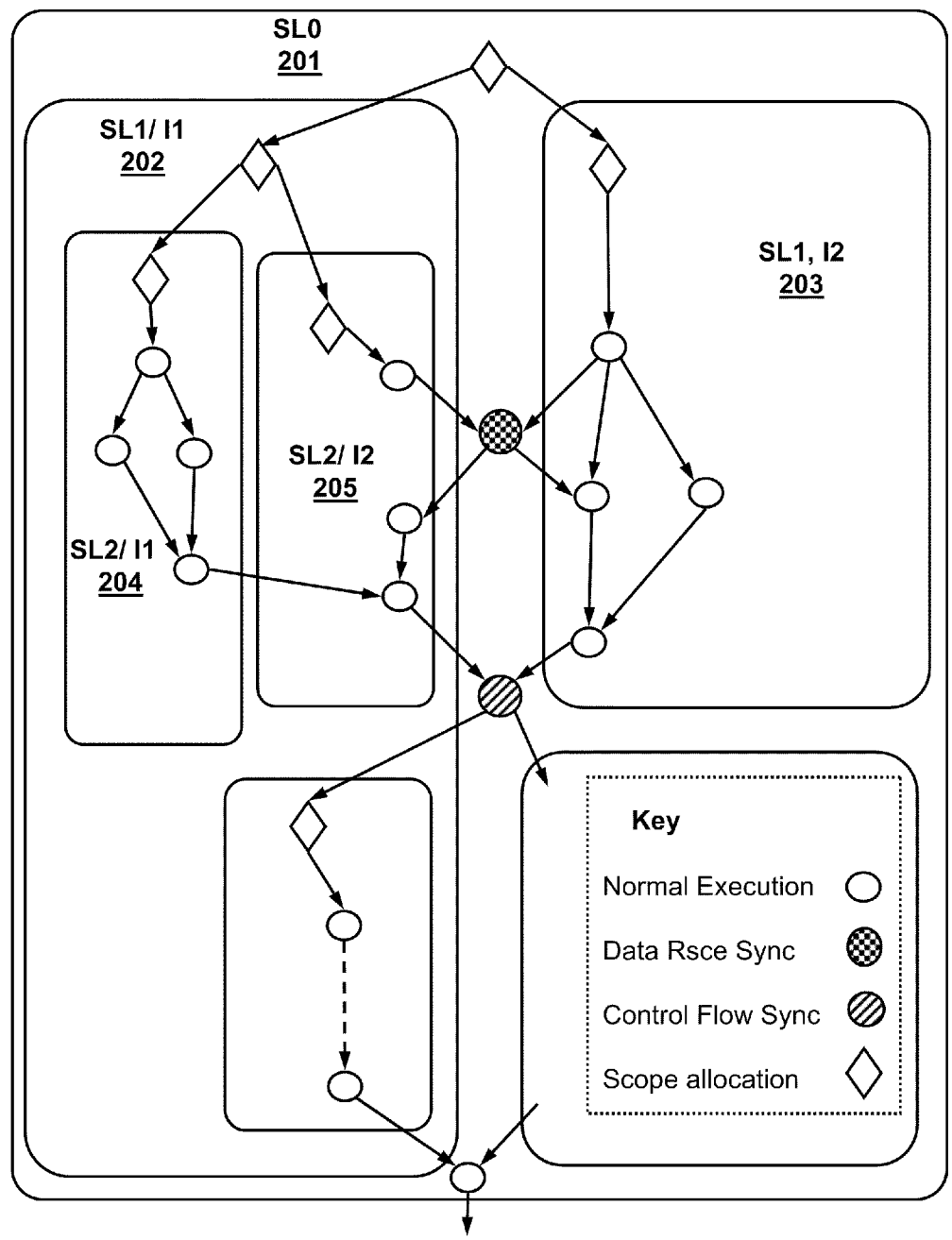

FIG. 3         Exemplary runspace runtime system
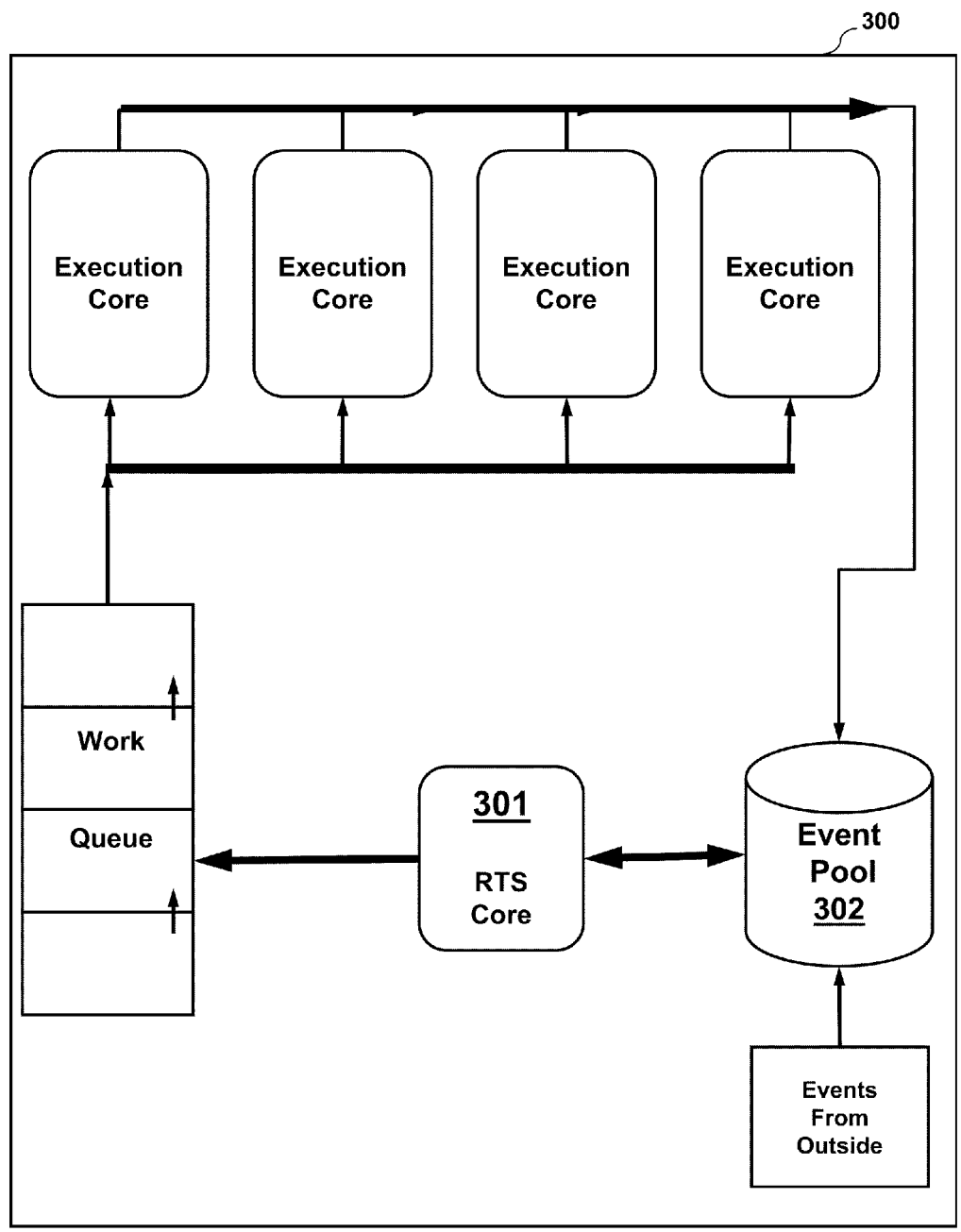

FIG. 4    Exemplary runtime performance monitoring and allocation
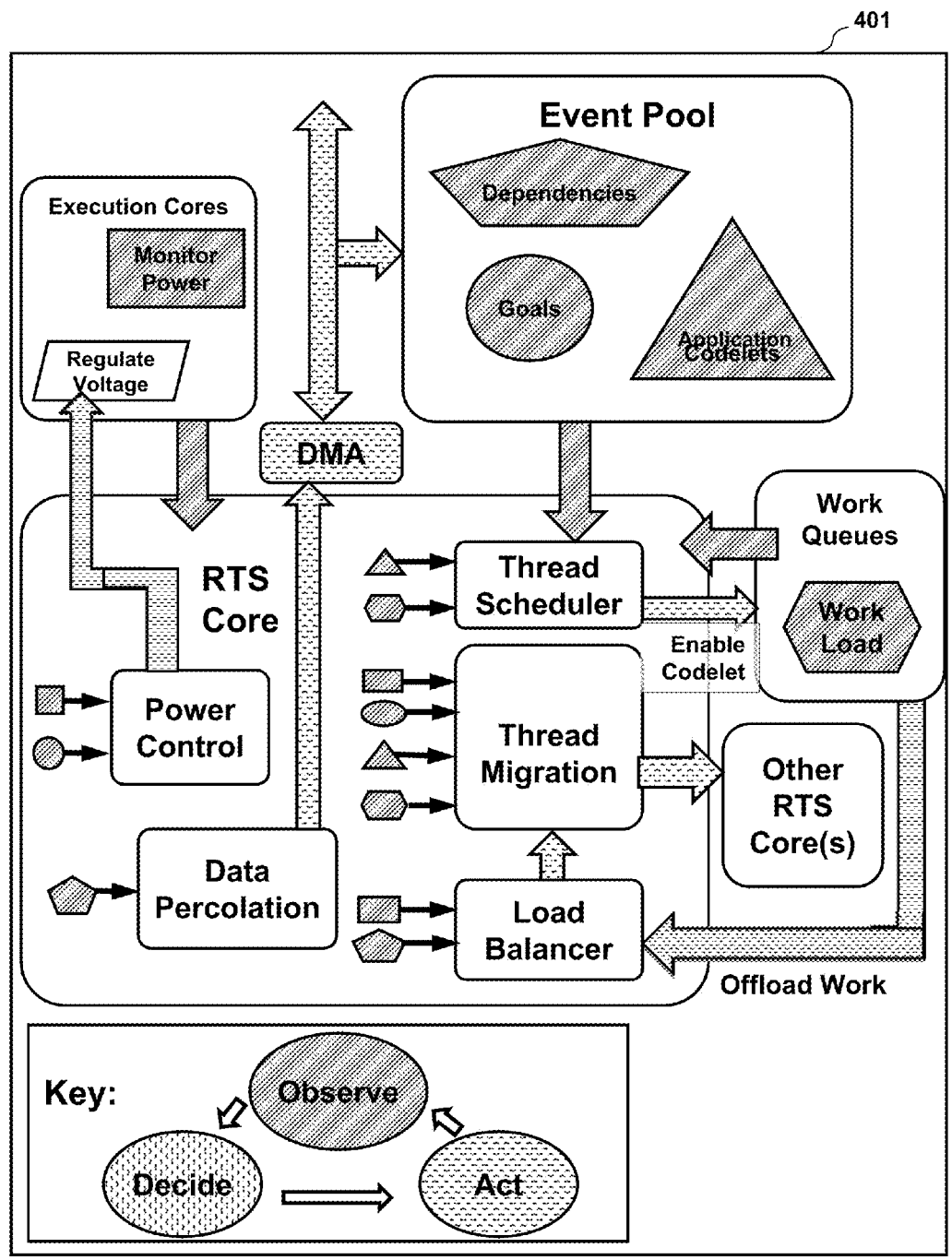

FIG. 5  Exemplary Runtime Behavior
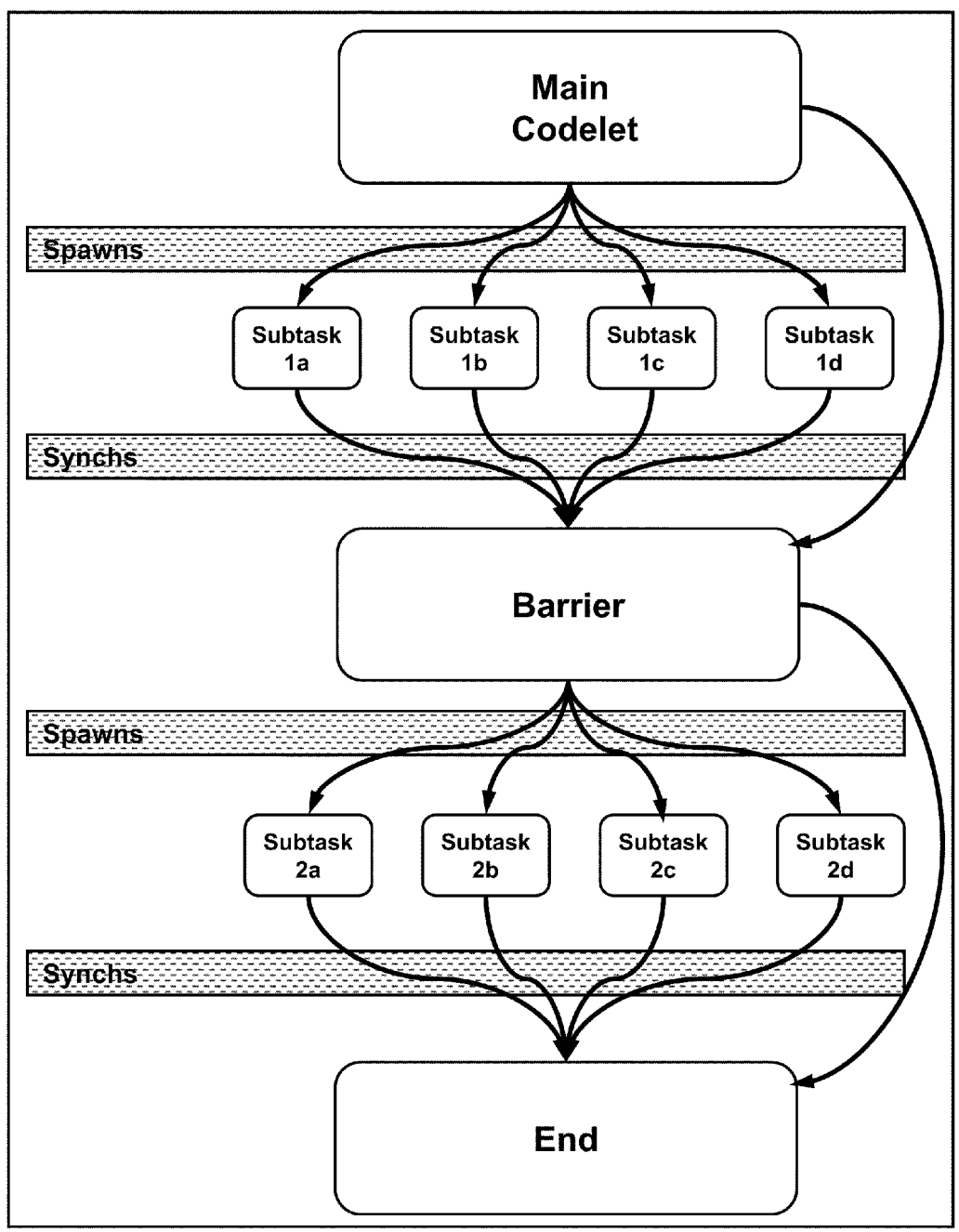

FIG. 6  Exemplary hierarchy of interactions
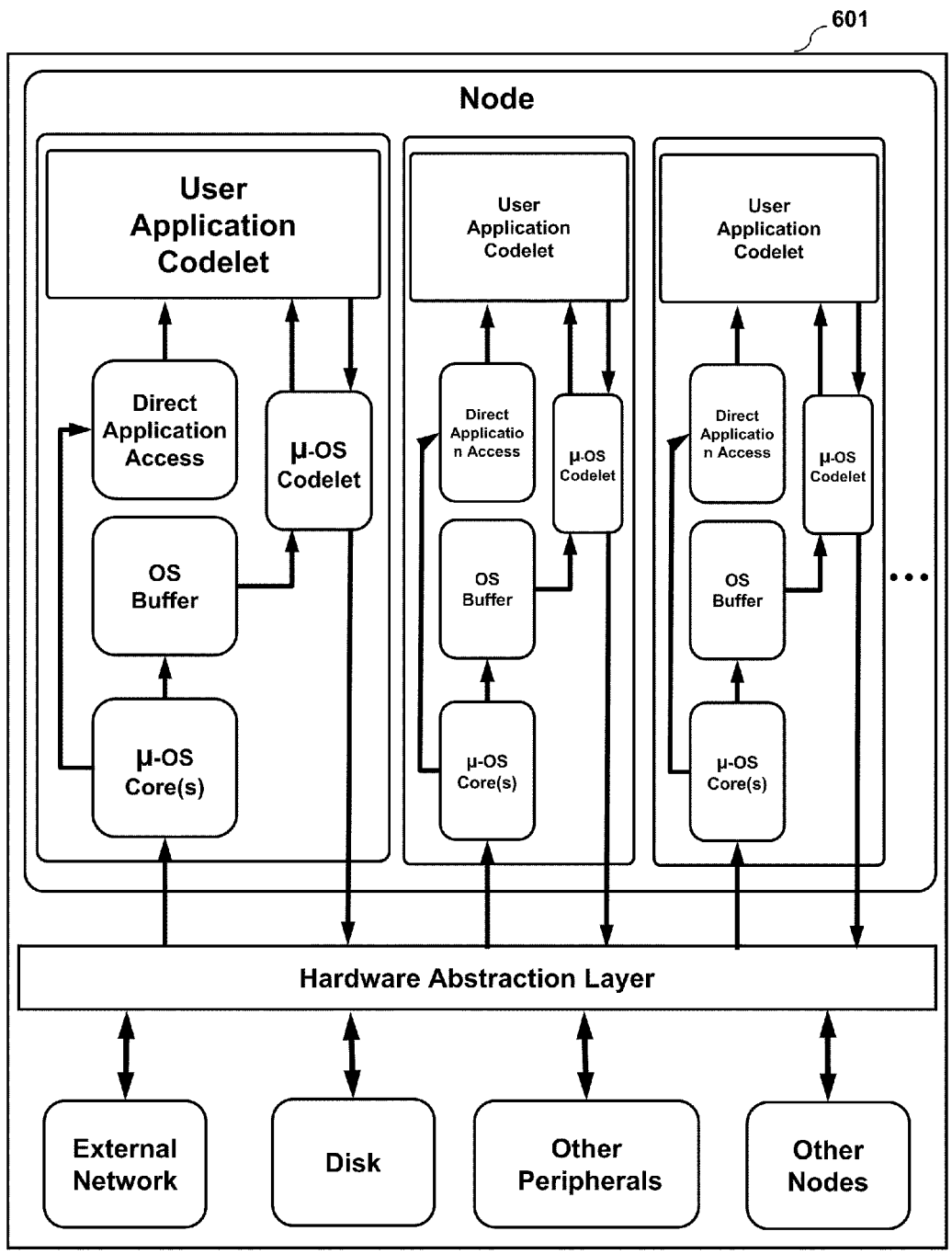

FIG. 7        Exemplary self-aware operating system
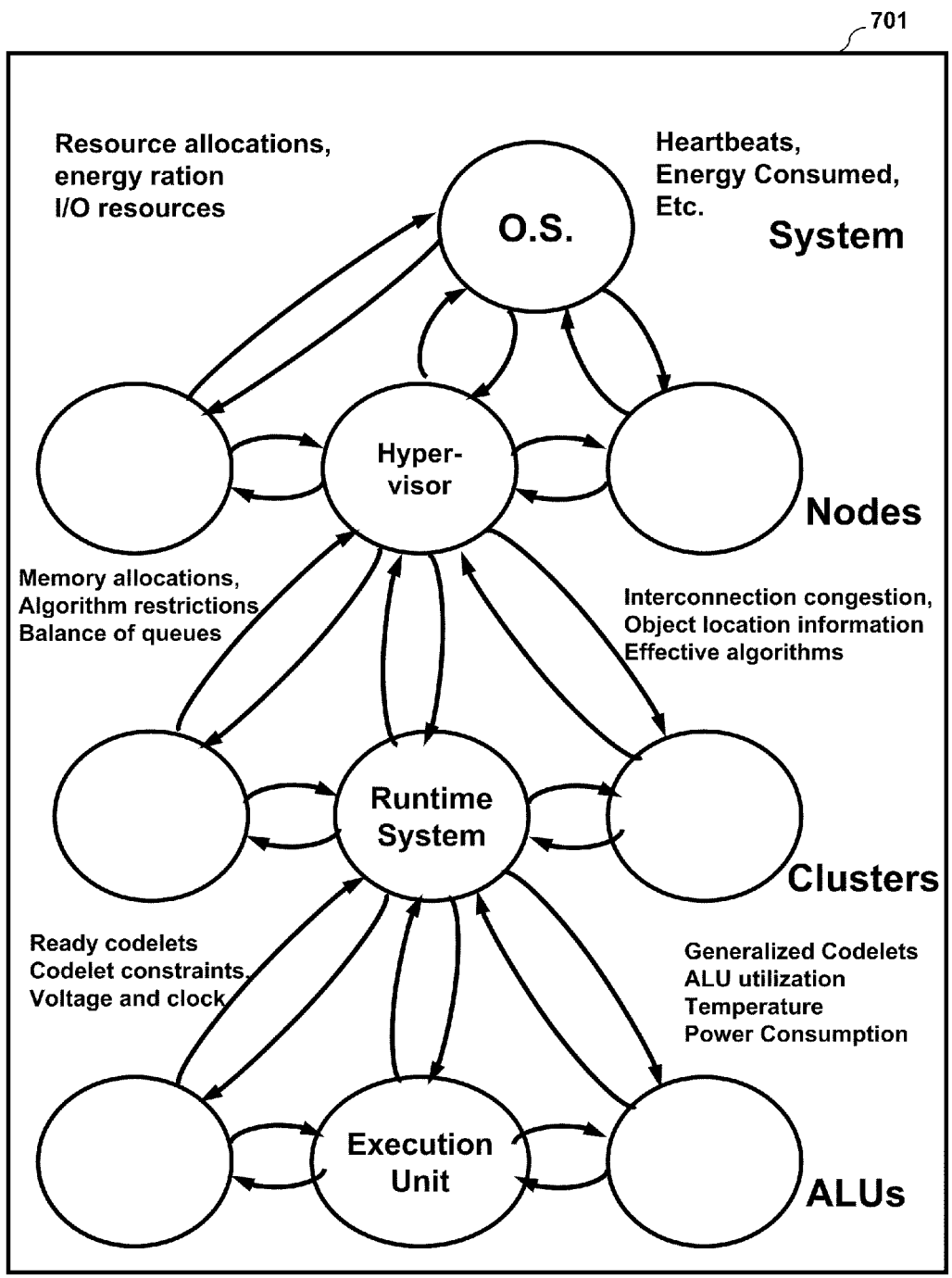

FIG. 8  Exemplary allocation hints

─── 801

C Language - explicit language element include <tasks.h> double_task f1(double *x, double *y) {

…..

pragma resource_stall
access_resource();
… z = f2(y[i], x[j]);

return z
}

─── 802

C Language – implicit in api call include <tasks.h> double_task f2(double *x, double *y) {

…..

z = approx_fp_pow(x[i],y[j]); … return z;
}

FIG. 9    Exemplary micro-memory management unit
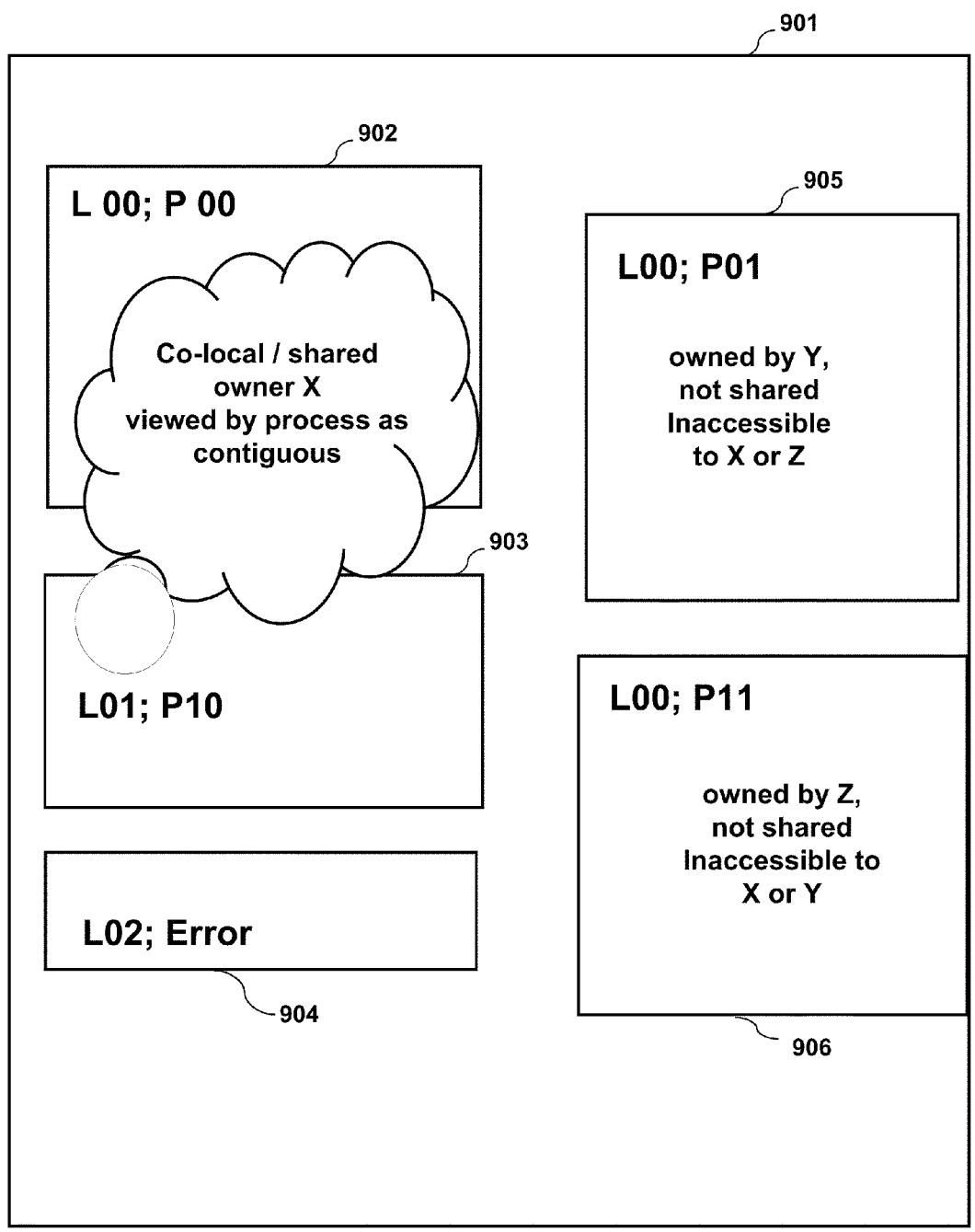

FIG. 10    Exemplary application use case
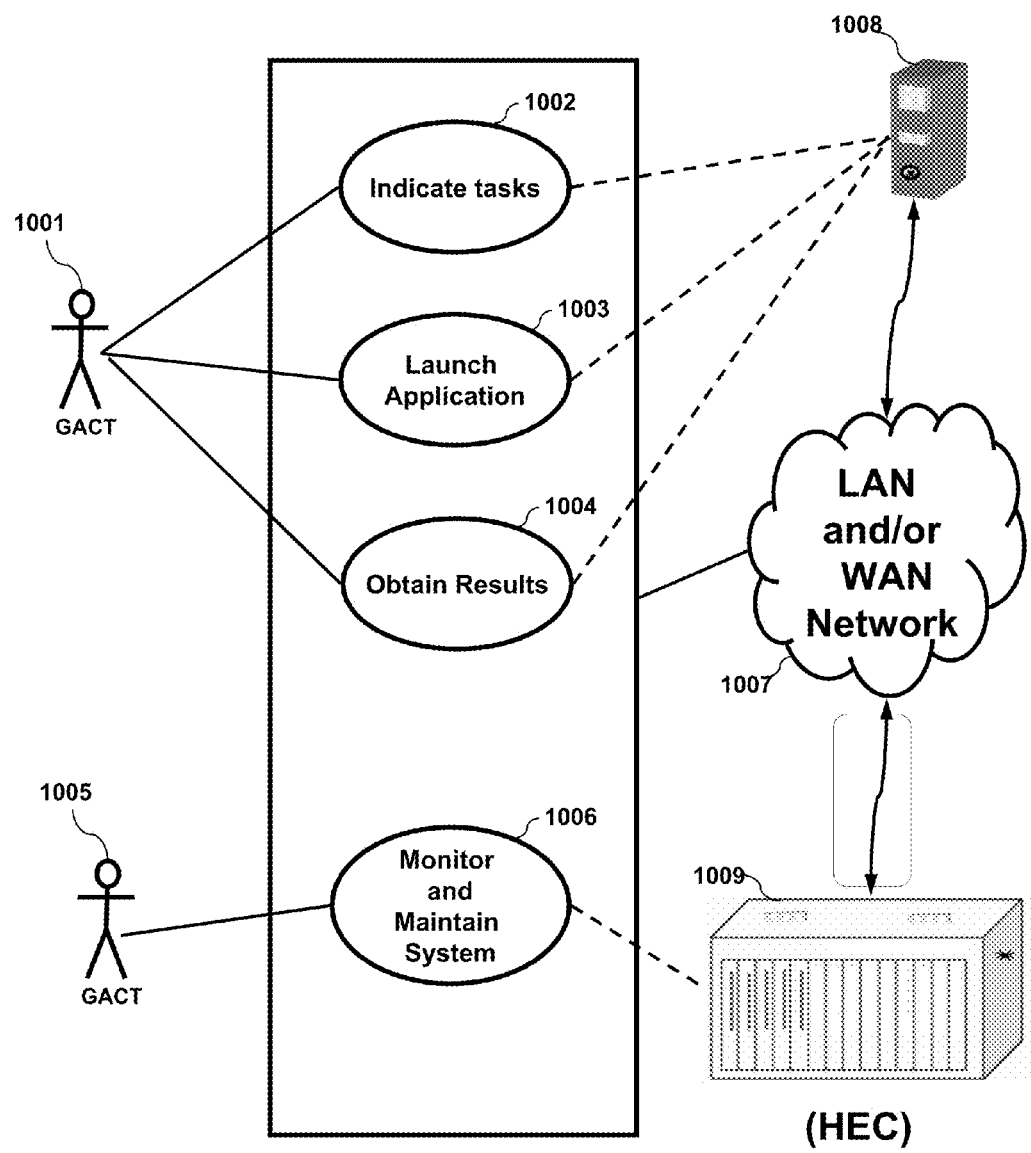

FIG. 11         Exemplary grouping in runspace, over time
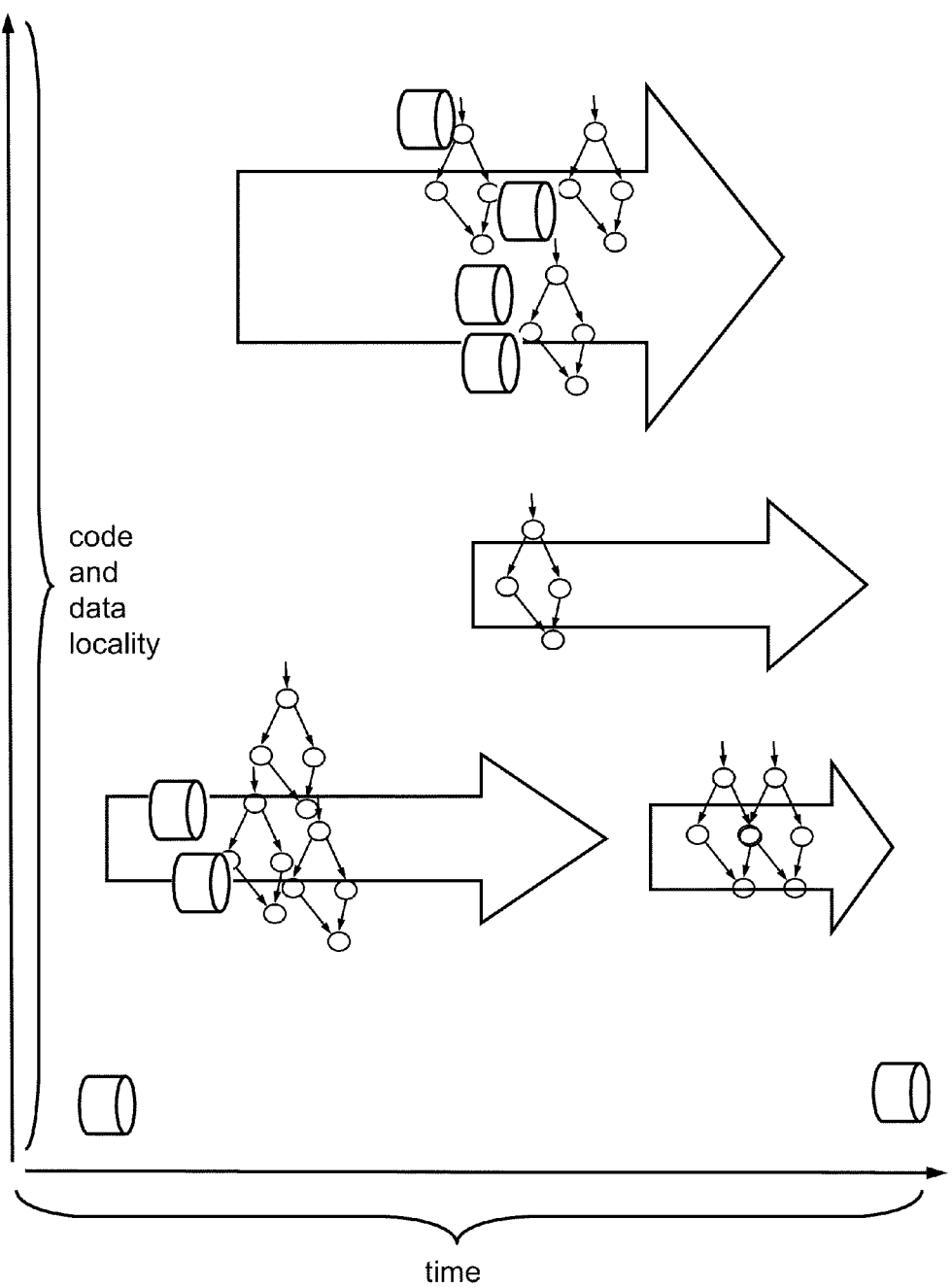

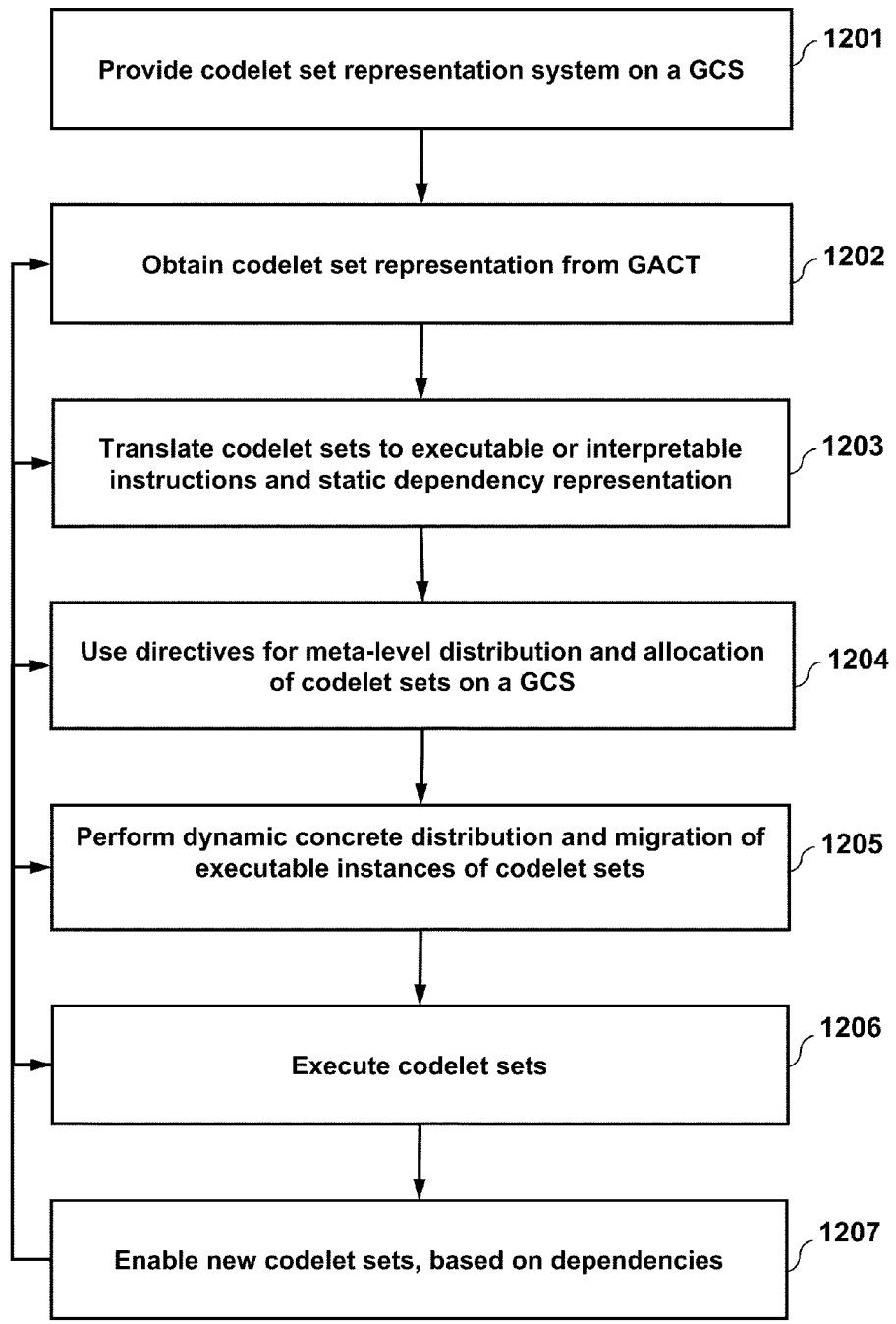

FIG. 13    Codelet Set Representation System
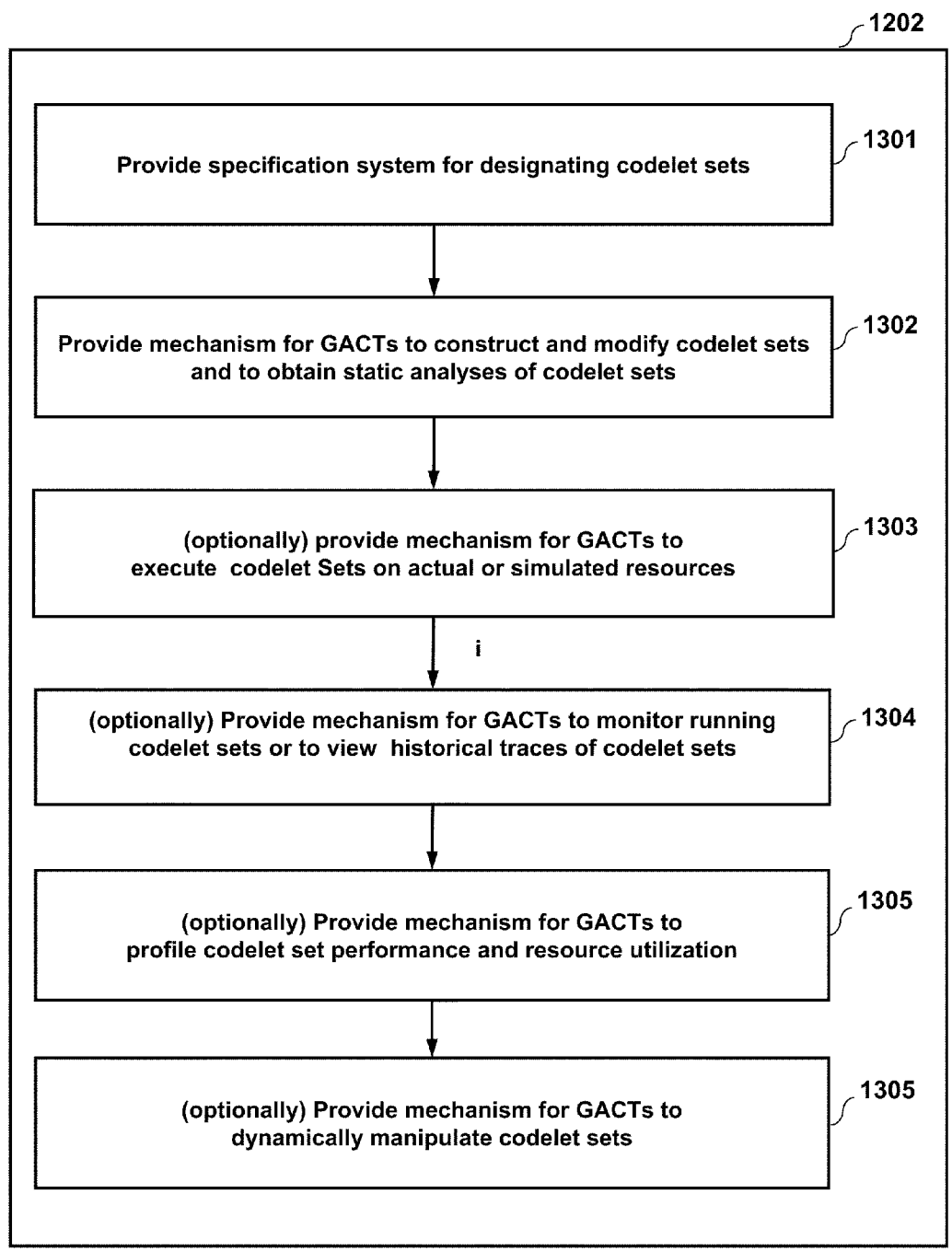

FIG. 14  Translation of Codelet Sets
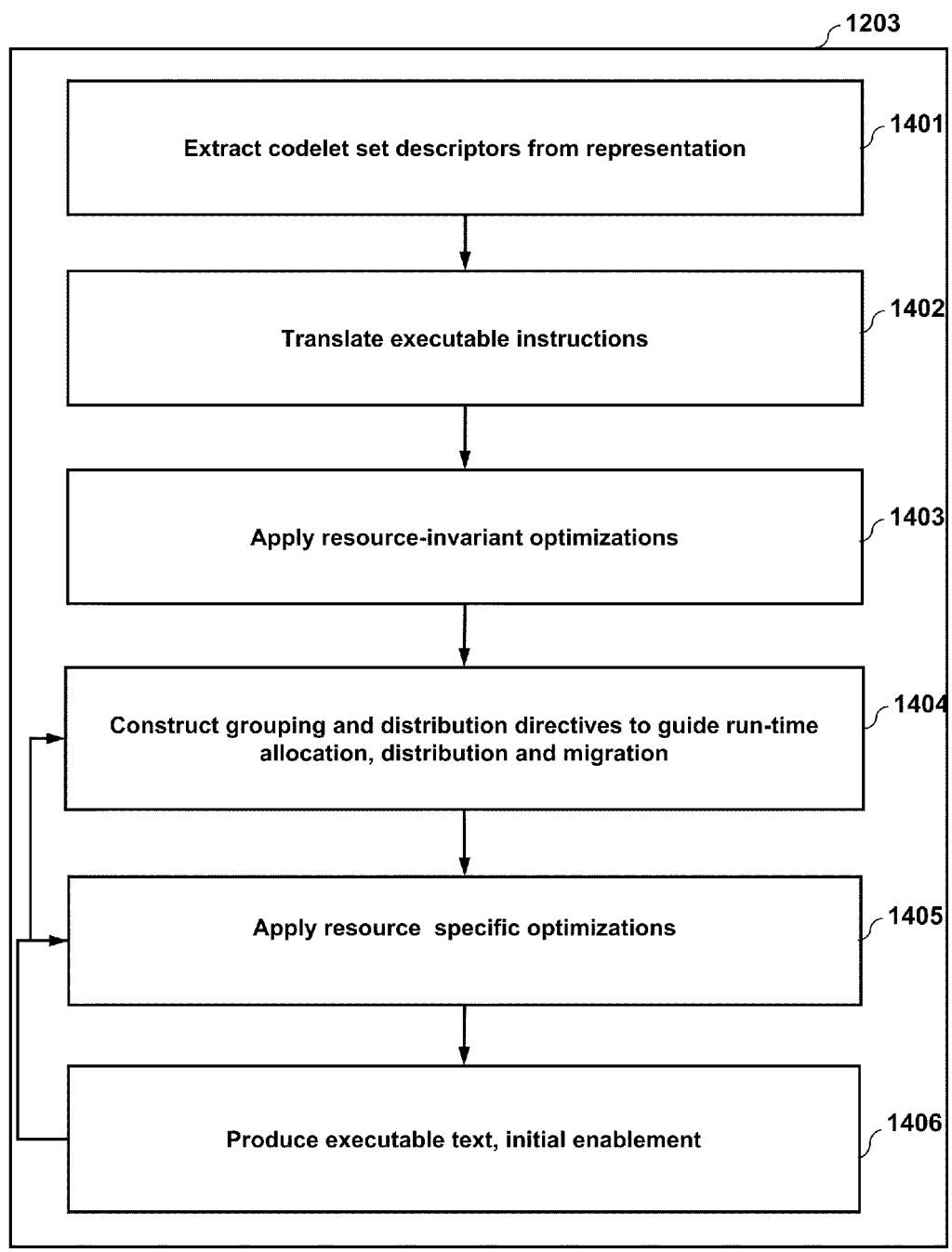

FIG. 15  Meta-level Codelet Set Distribution
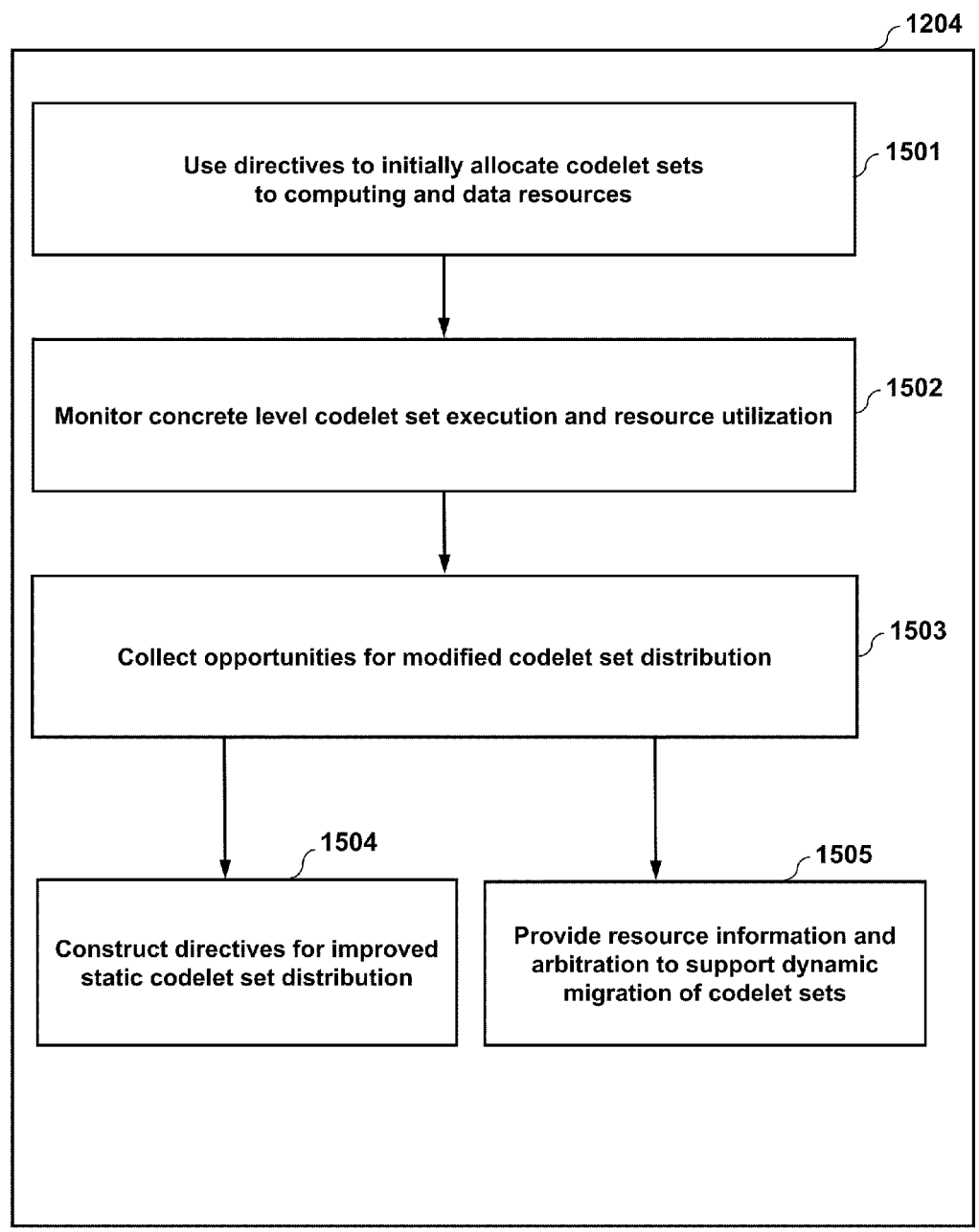

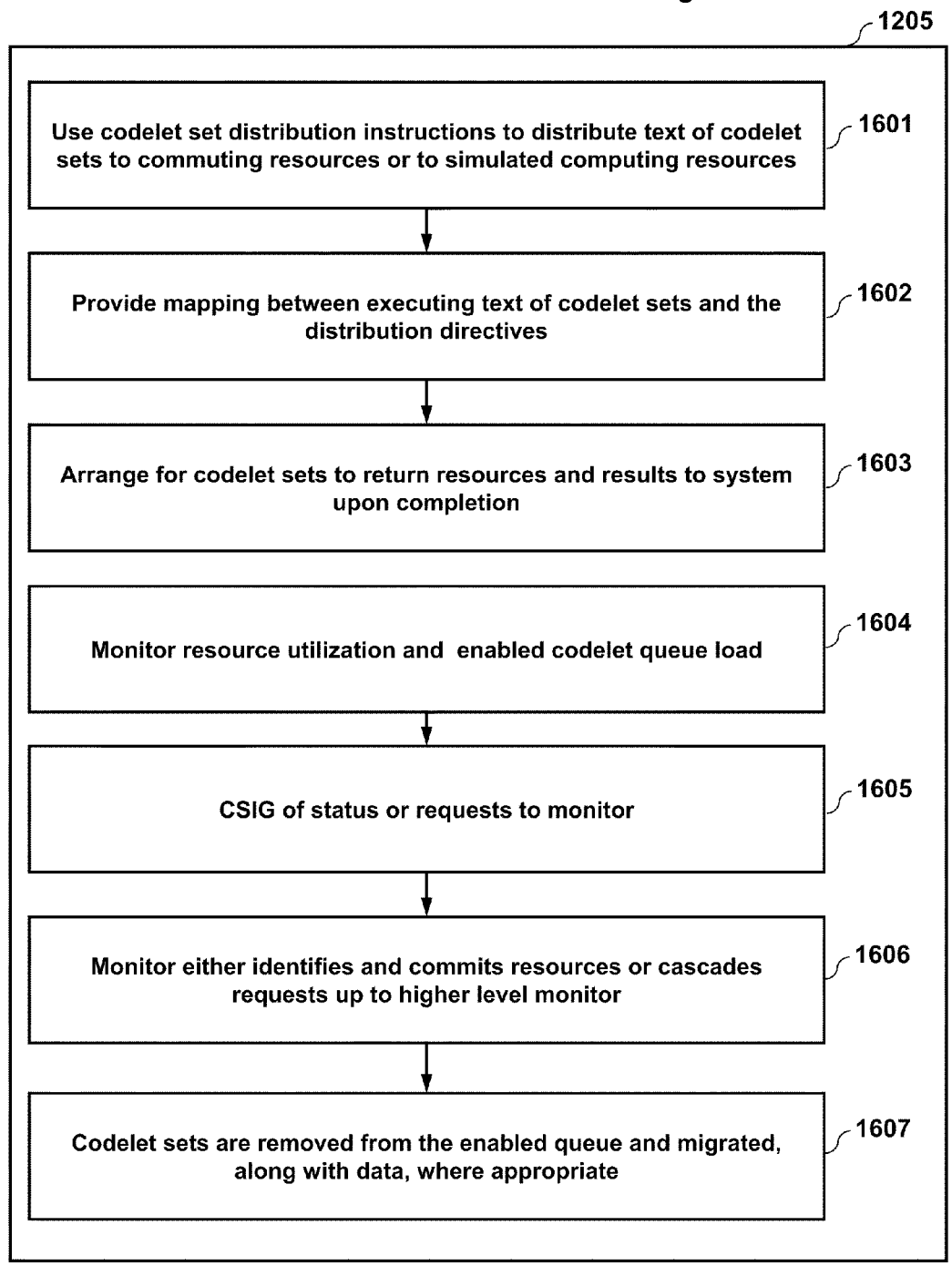
FIG. 16 Codelet Set Execution and Migration

FIG. 17 Dequeue Concurrent Access Mechanisms – write / enqueue
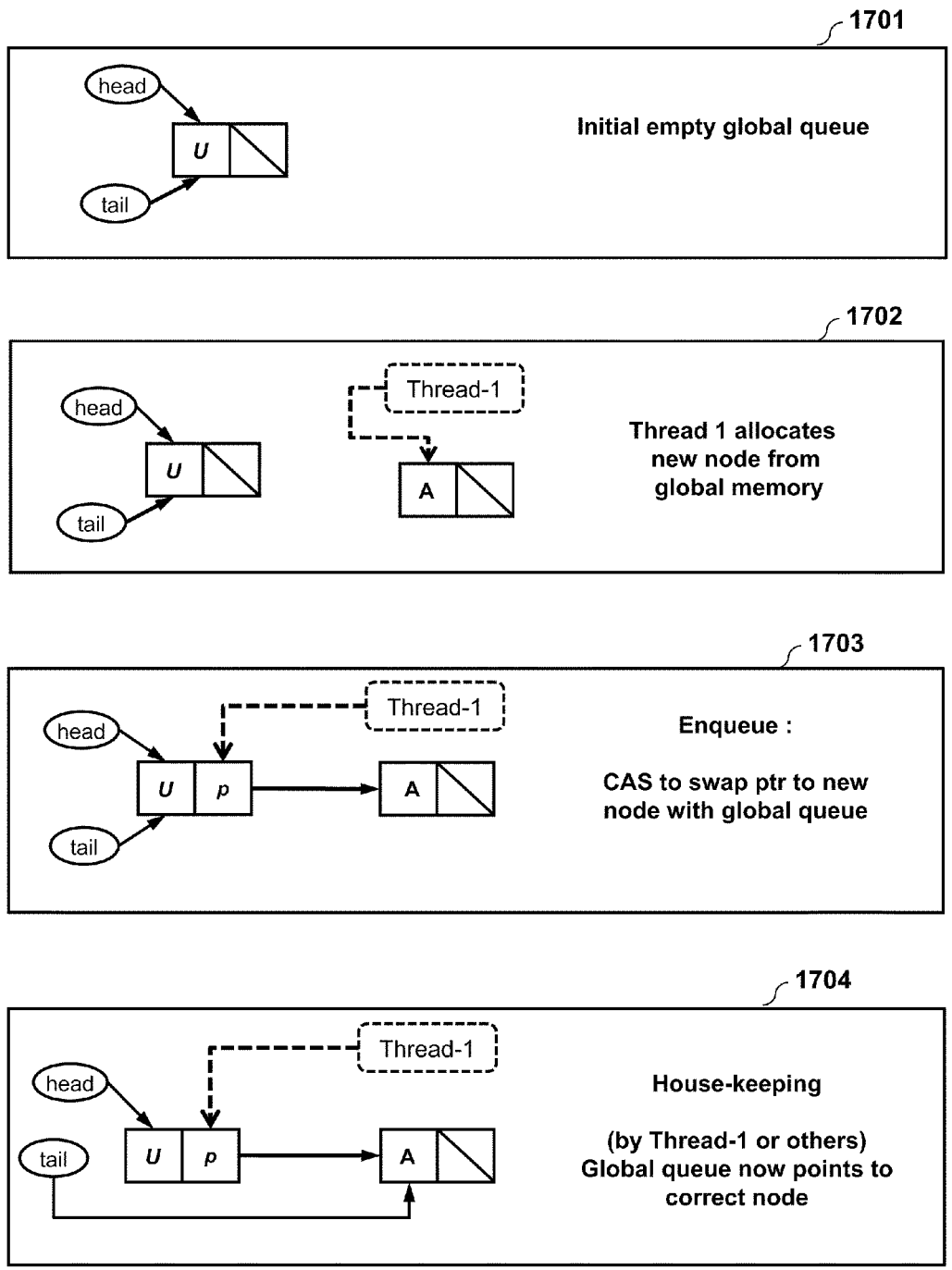

FIG. 18 Dequeue Concurrent Access Mechanisms – read / dequeue
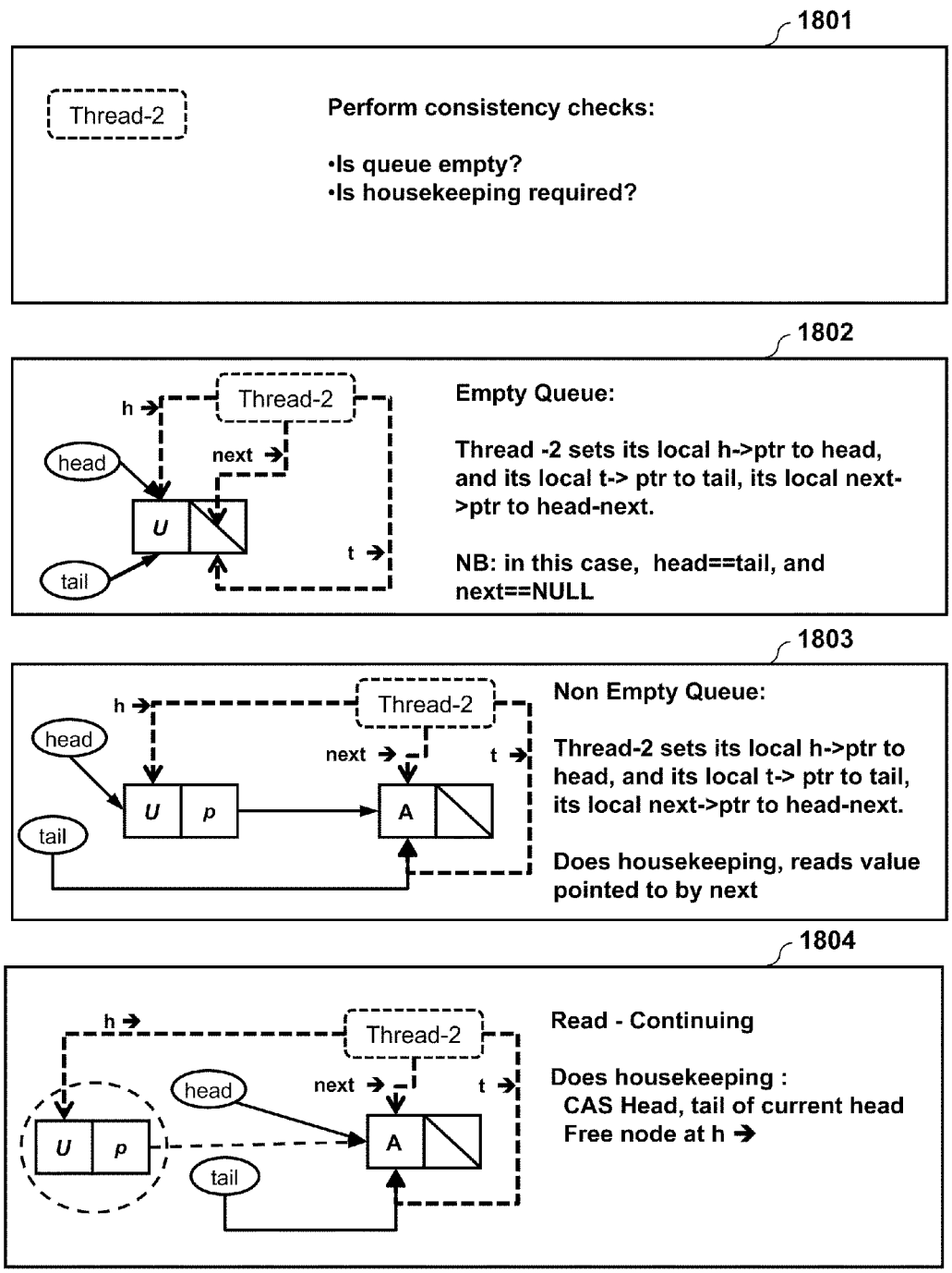

FIG. 19    Concurrent Access via Atomic Addition Array (A) : Write
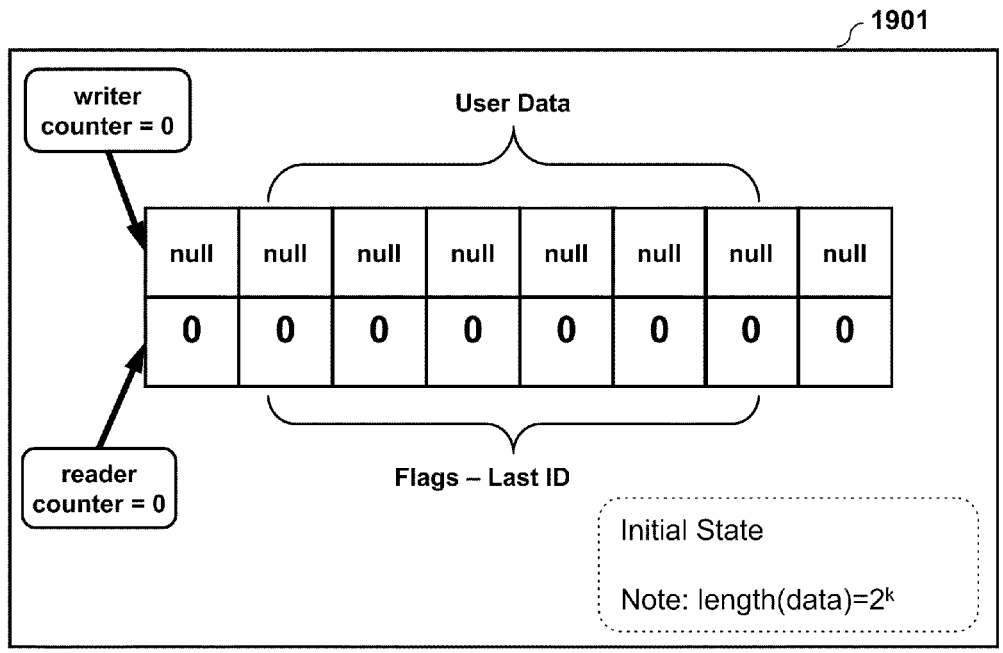
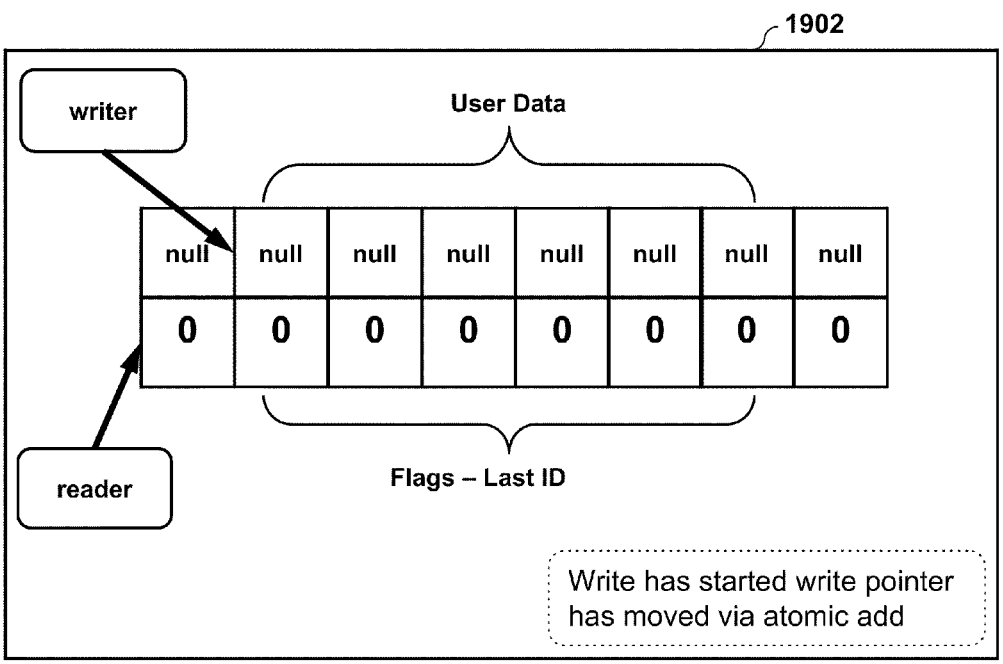

FIG. 20    Concurrent Access via Atomic Addition Array (B) : Write
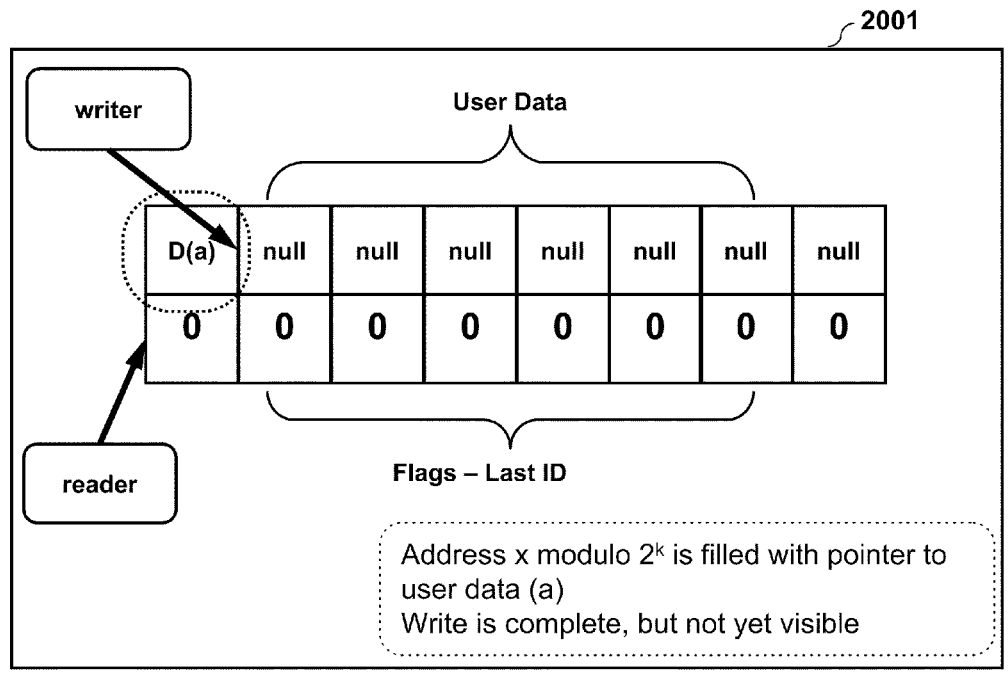
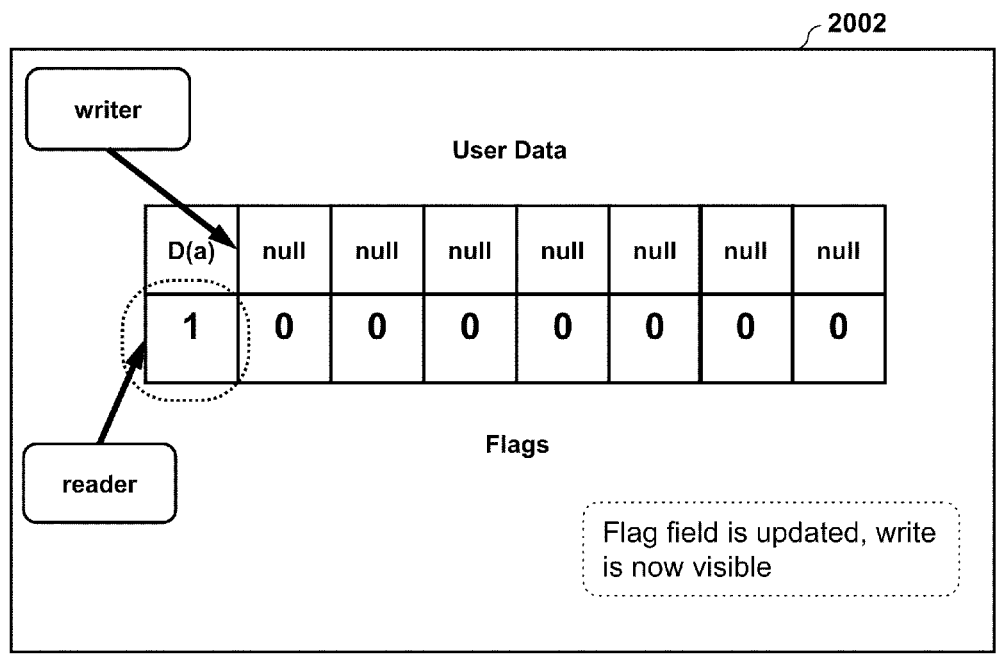

FIG. 21 Concurrent Access via Atomic Addition Array (C) : Read
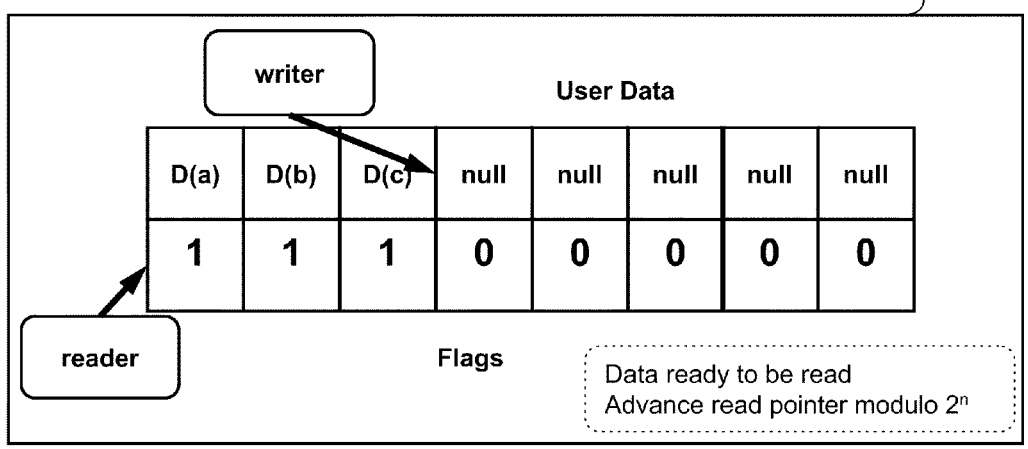
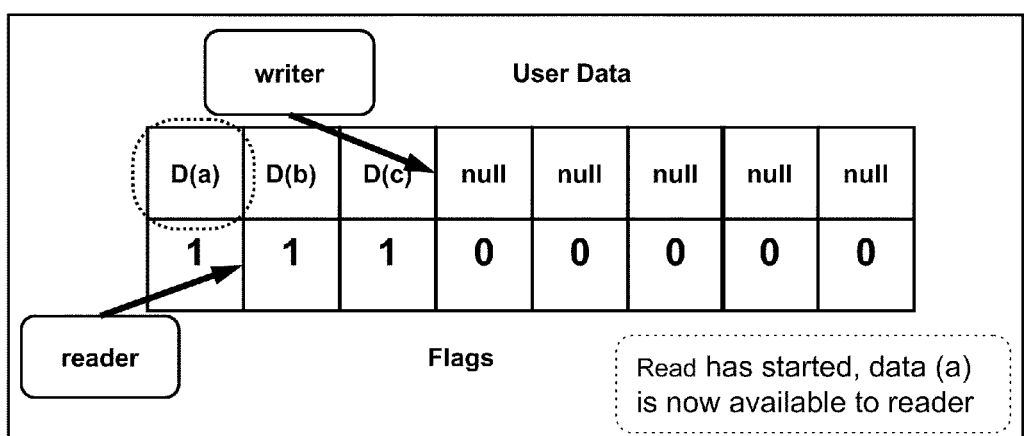
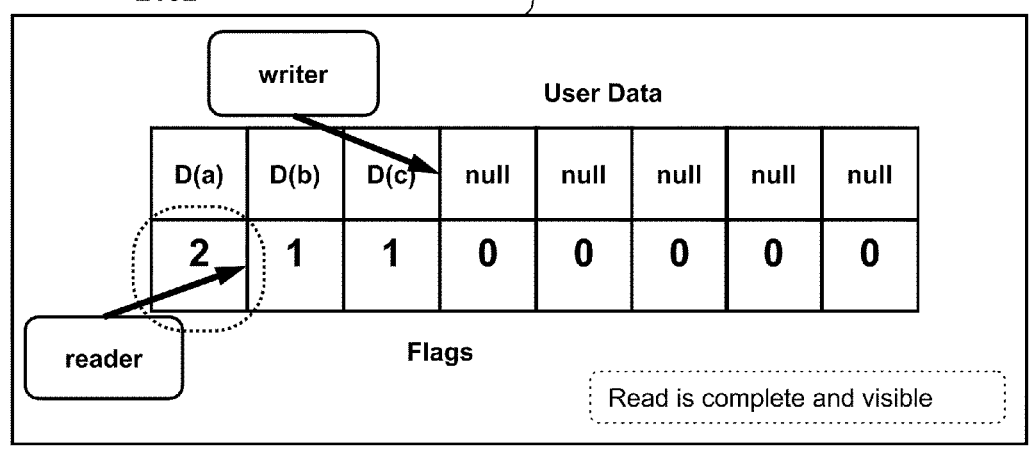

FIG. 22    Linked List / Atomic Addition Arrays (LL/AAA) (A) :
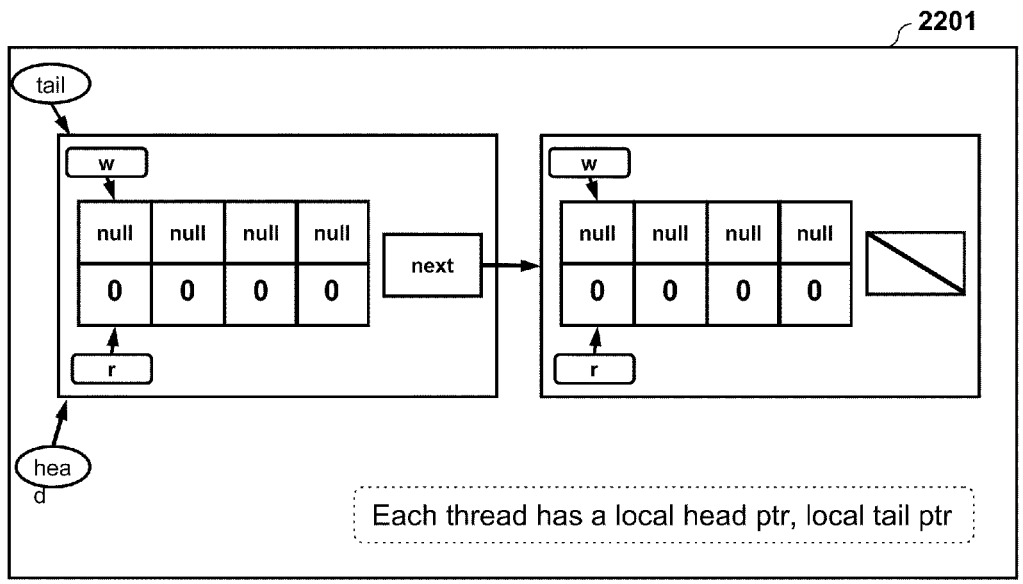
Each thread has a local head ptr, local tail ptr
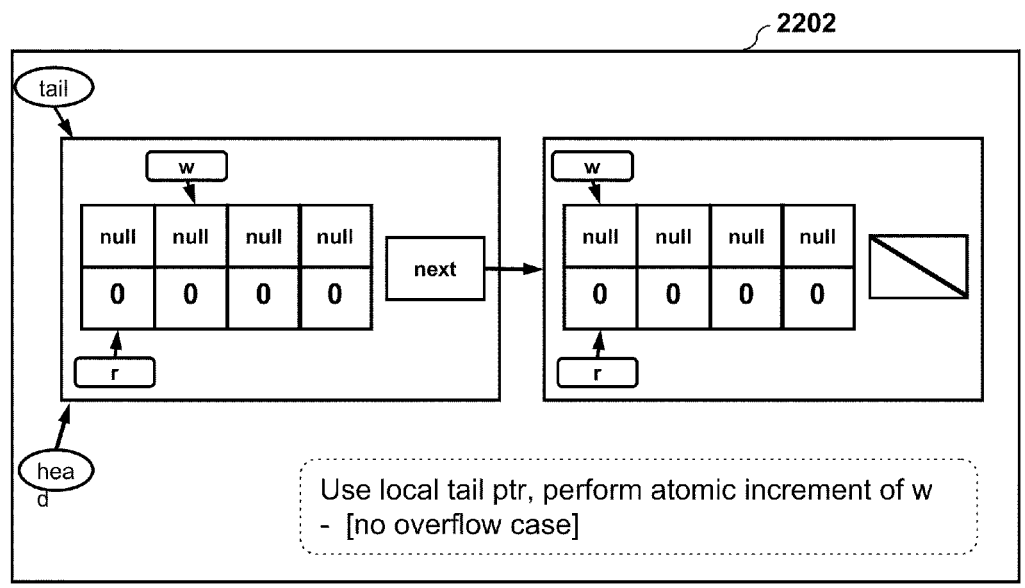
Use local tail ptr, perform atomic increment of w
- [no overflow case]

FIG. 23   Linked List / Atomic Addition Arrays (LL/AAA) (B) :
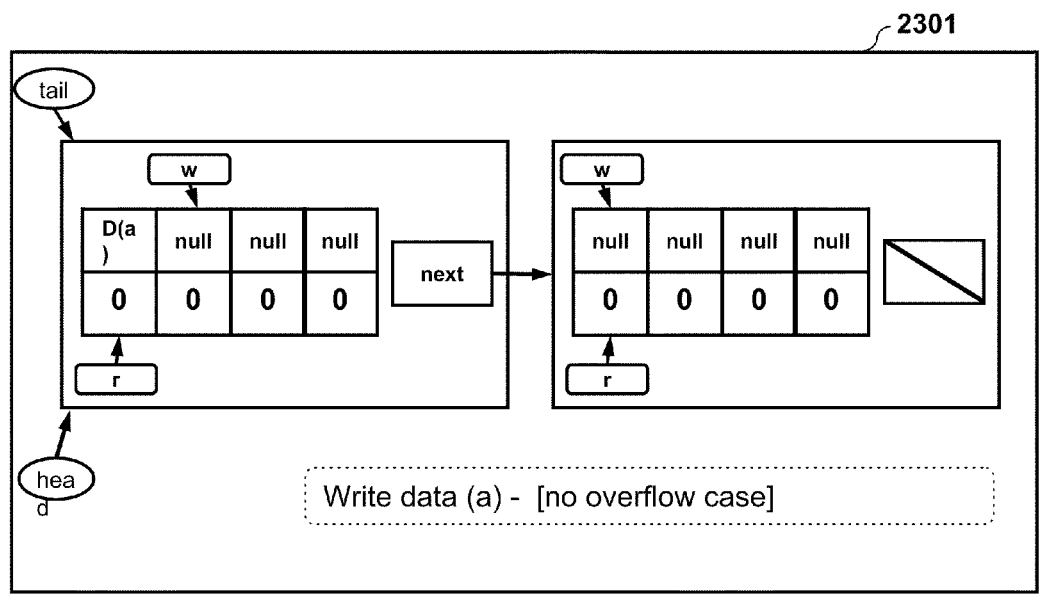
Write data (a) - [no overflow case]
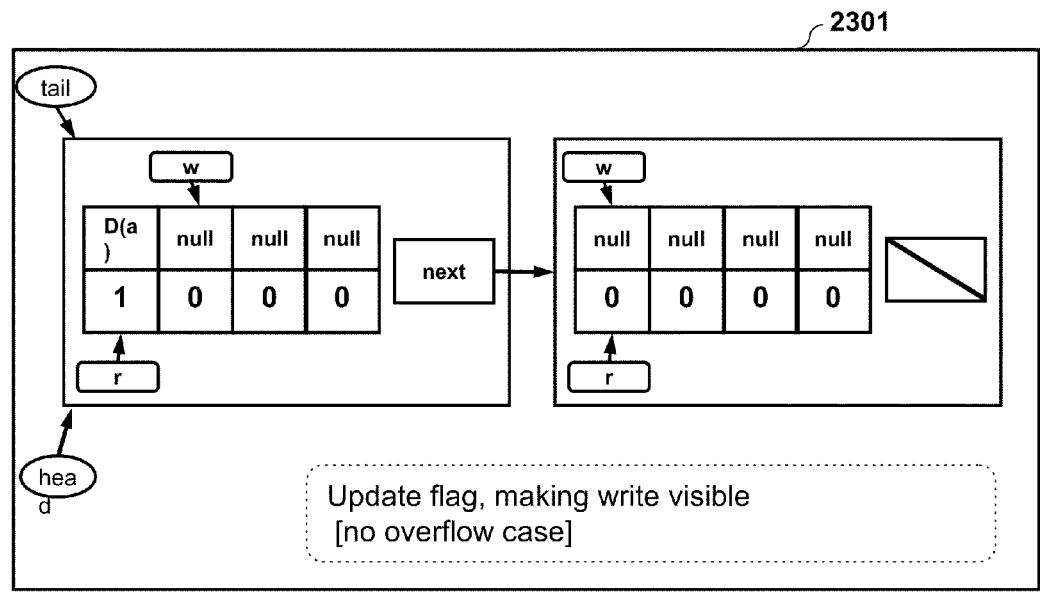
Update flag, making write visible [no overflow case]

FIG. 24  Linked List / Atomic Addition Arrays (LL/AAA) (C) :
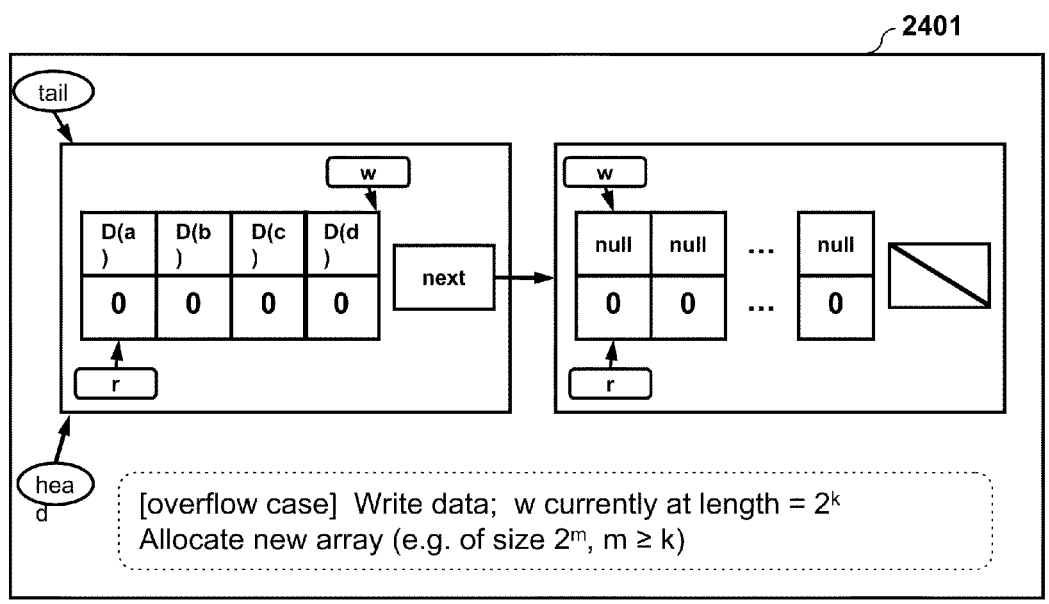
[overflow case] Write data; w currently at length = $2^k$
Allocate new array (e.g. of size $2^m$, $m \geq k$)
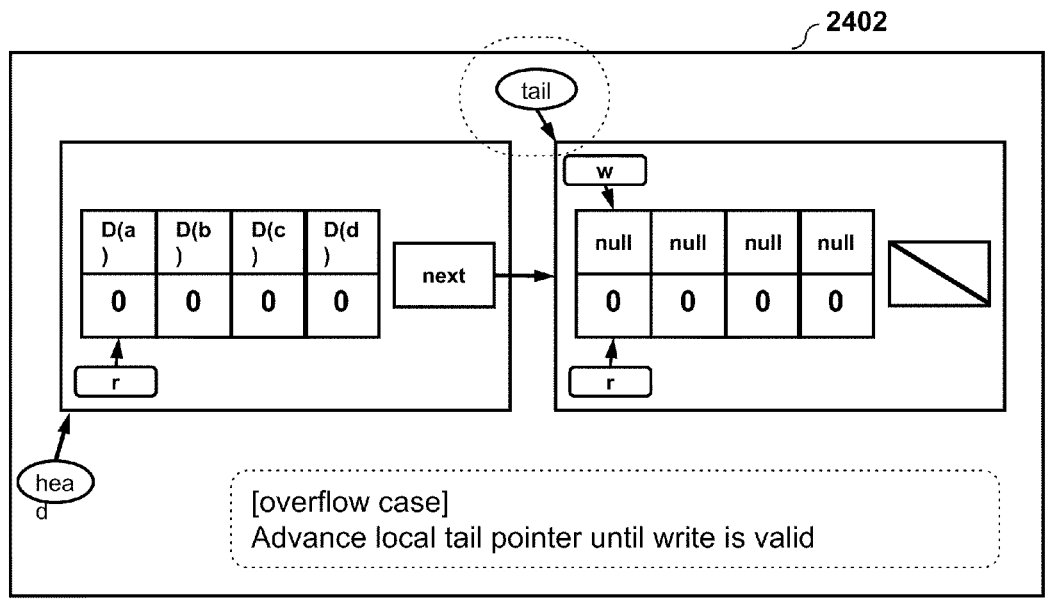
[overflow case]
Advance local tail pointer until write is valid FIG. 25    Linked List / Atomic Addition Arrays (LL/AAA) (D) :
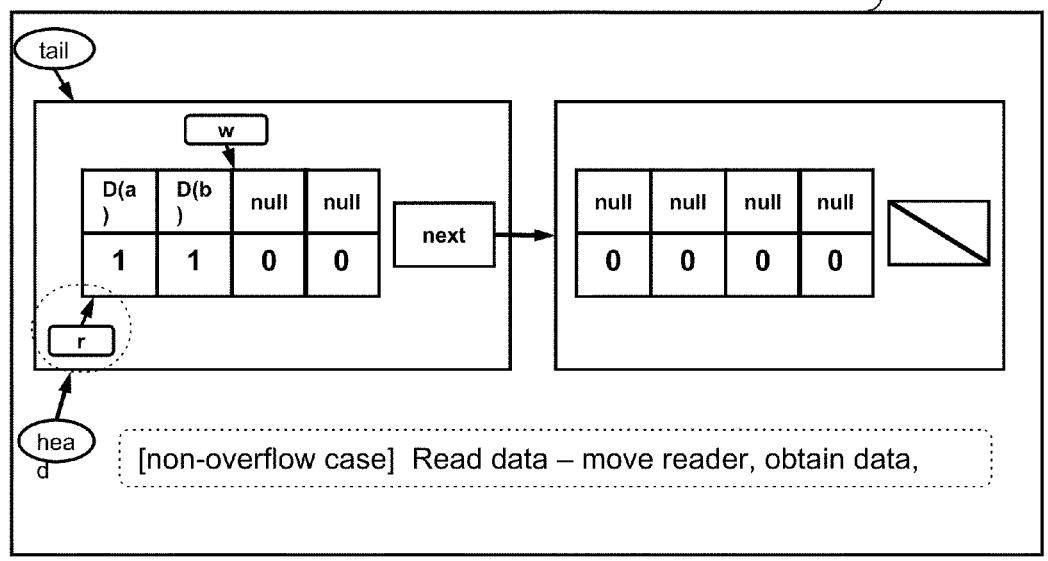
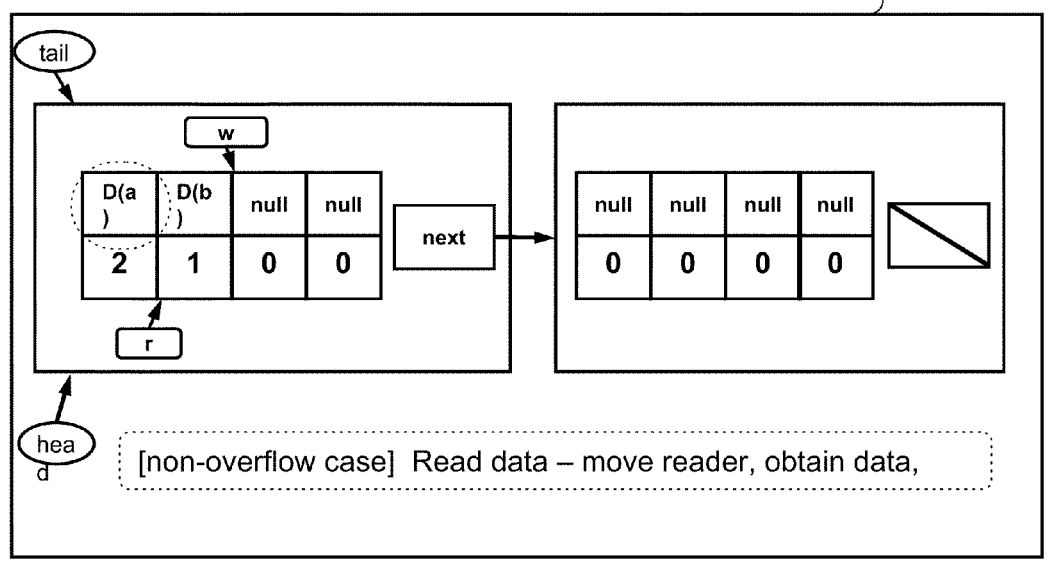

FIG. 26    Linked List / Atomic Addition Arrays (LL/AAA) (E):
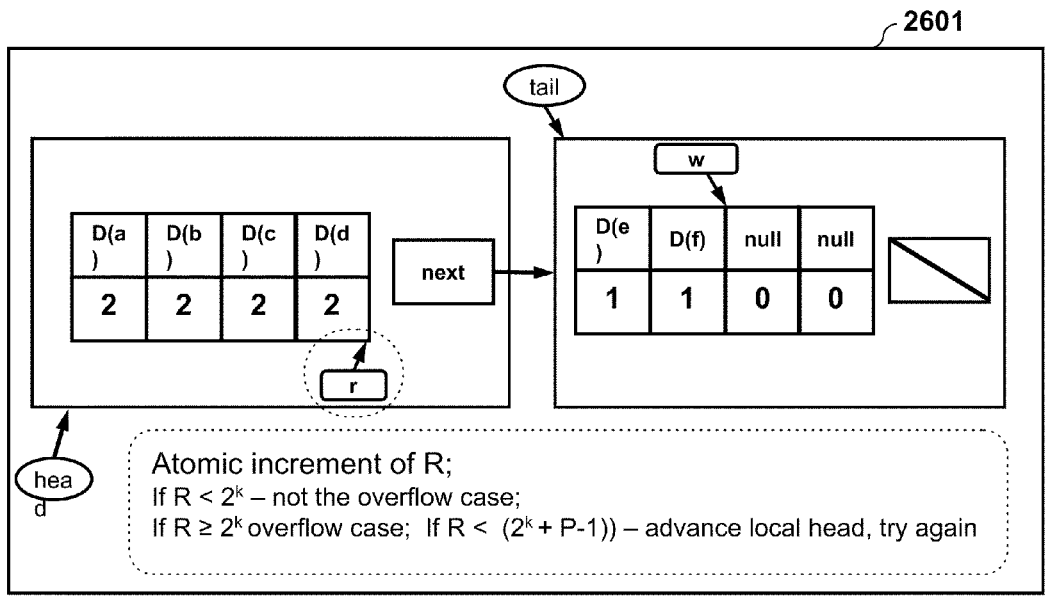
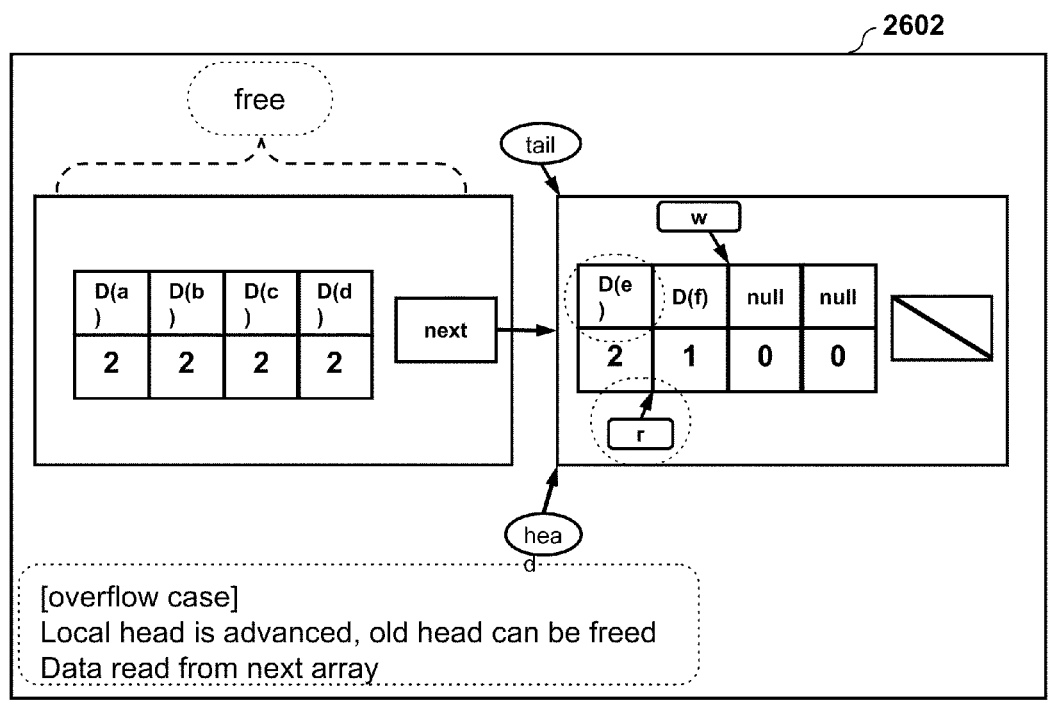

FIG. 27    Concurrent Access via Shared Array - with Turns
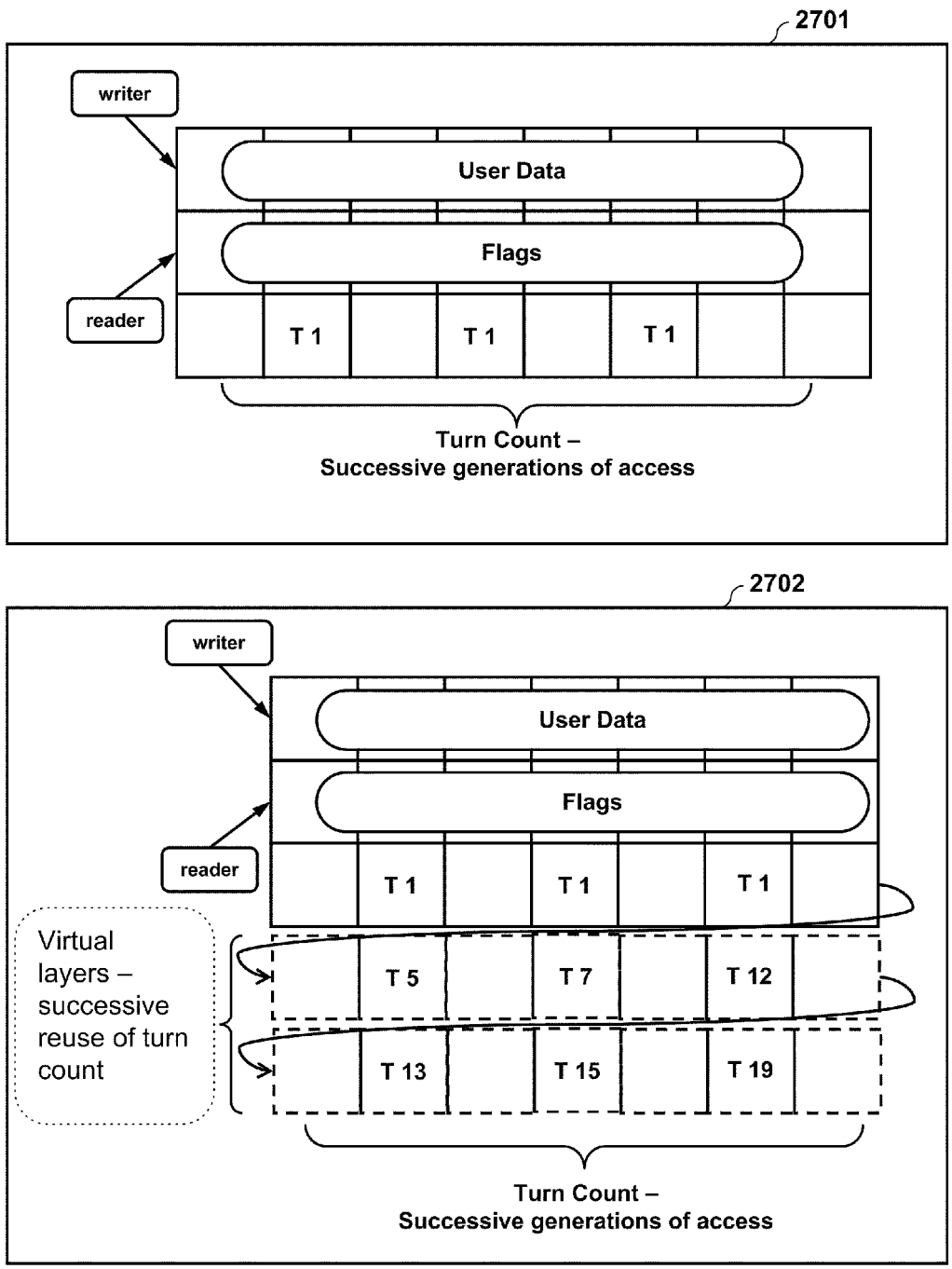

FIG. 28        Combining Network – Distributed Increment
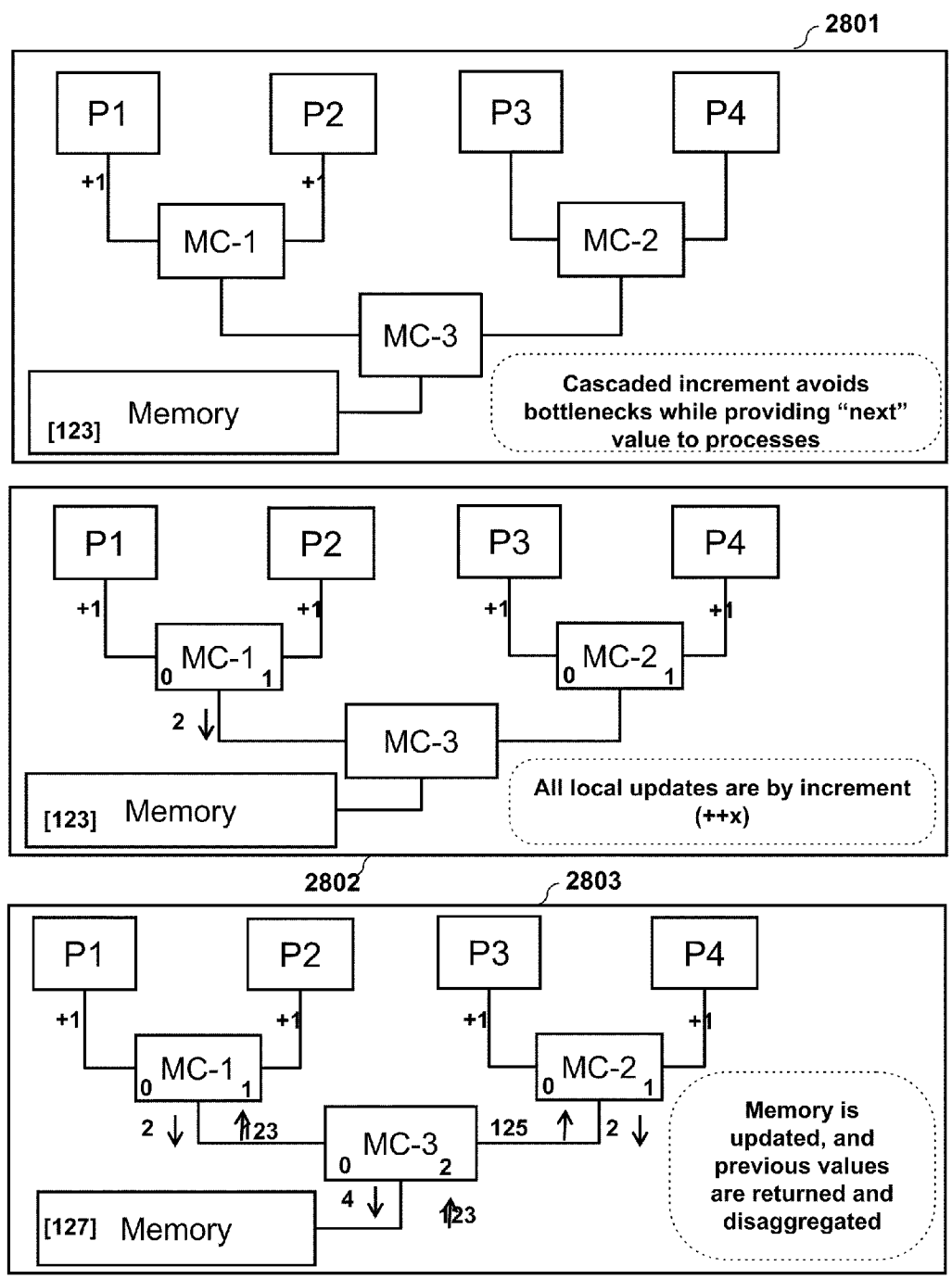

FIG. 29    Monotasks and Polytasks perform concurrent access via
Atomic Addition Array (A)
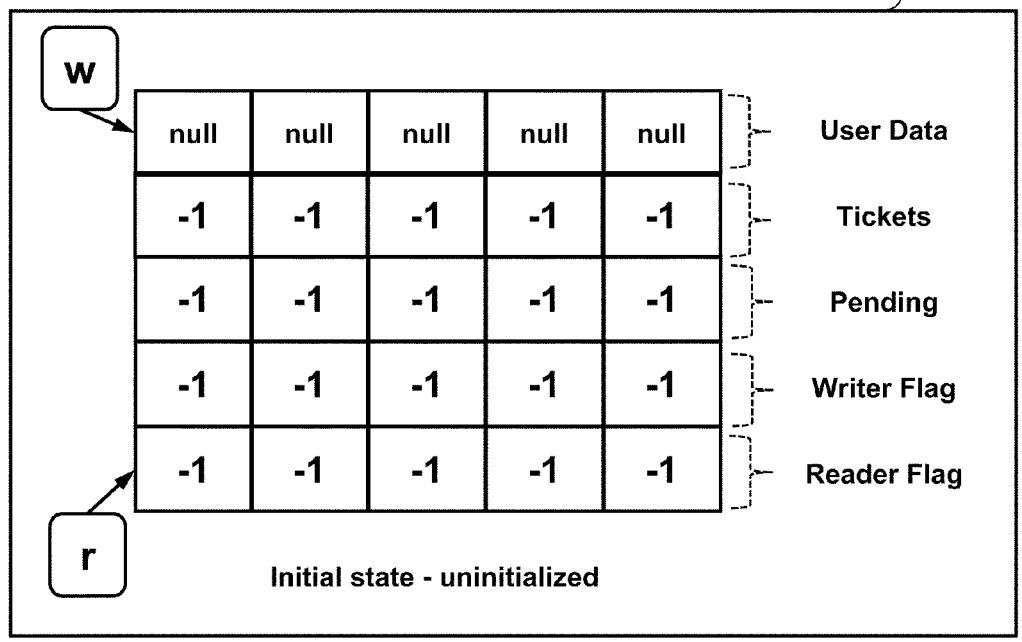
Initial state - uninitialized
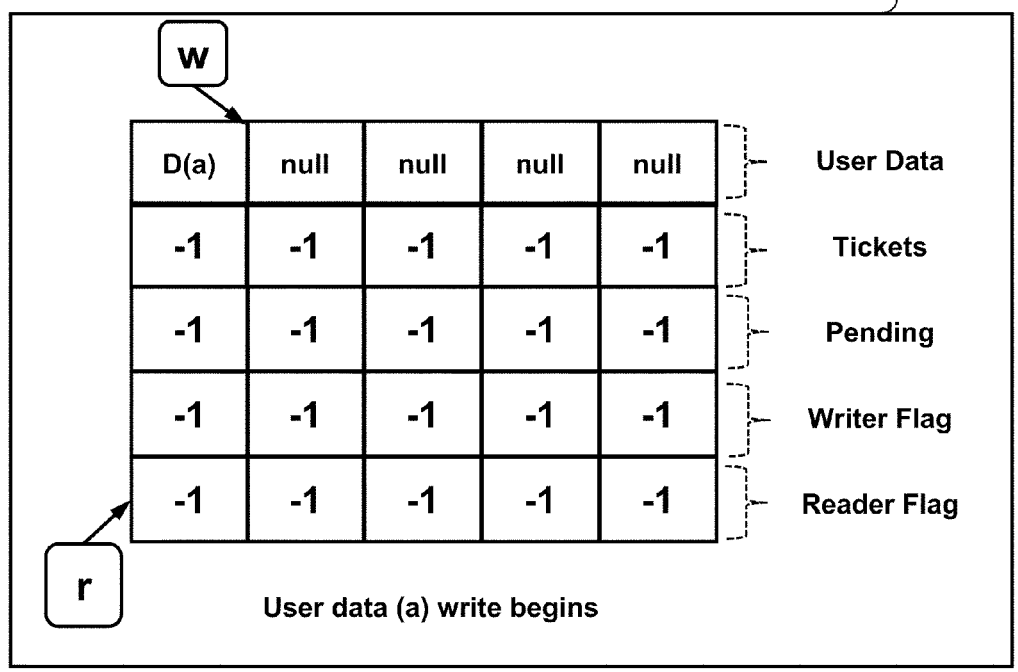
User data (a) write begins FIG. 30  Monotasks and Polytasks perform concurrent access via Atomic Addition Array (B)
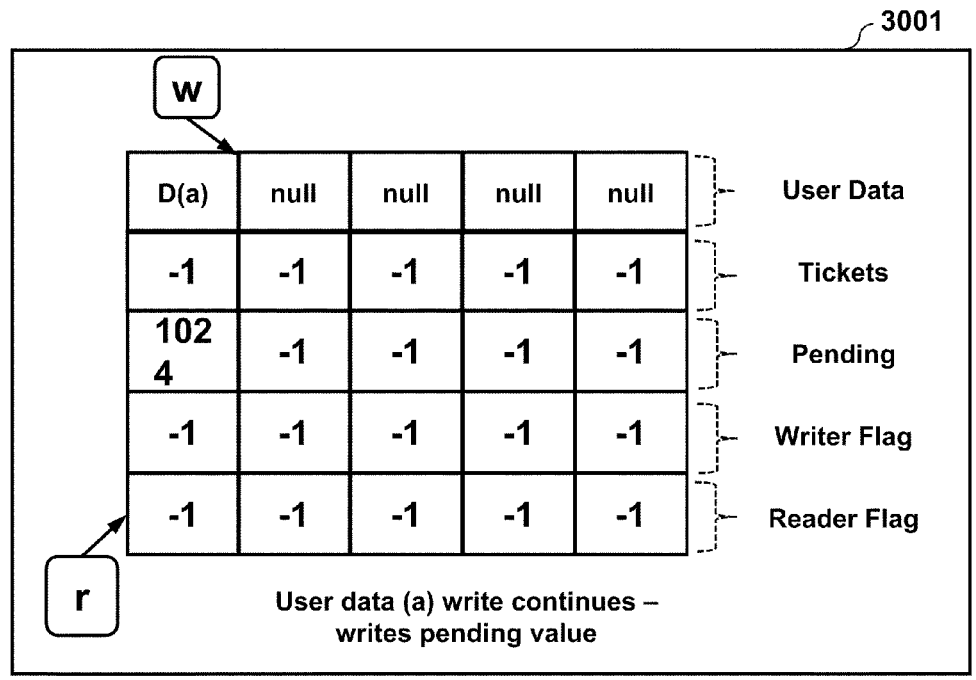
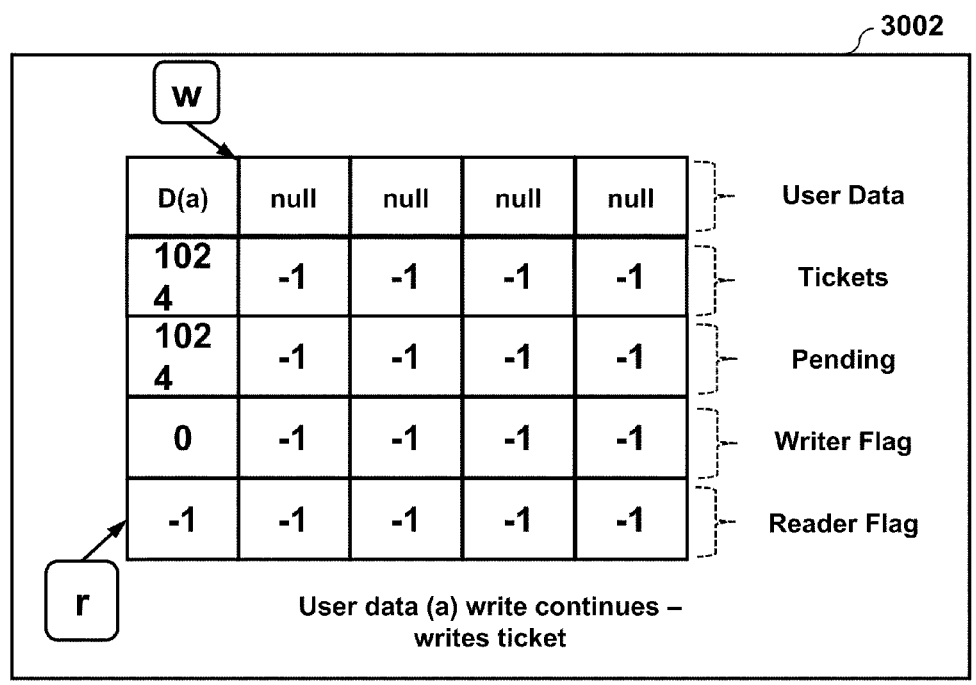

FIG. 31   Monotasks and Polytasks perform concurrent access via Atomic Addition Array (C)
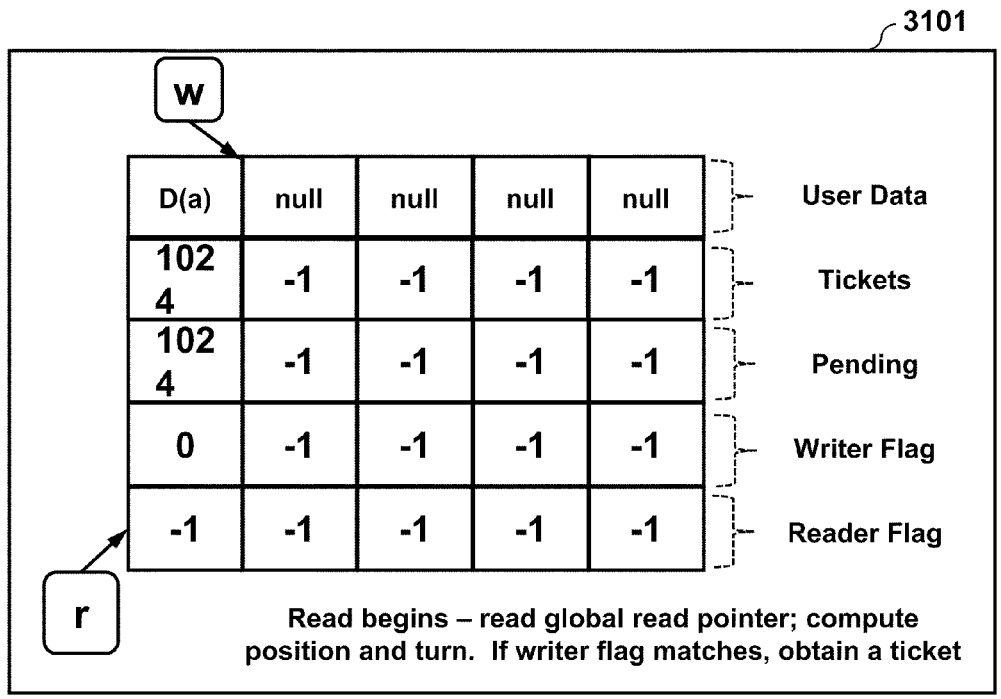
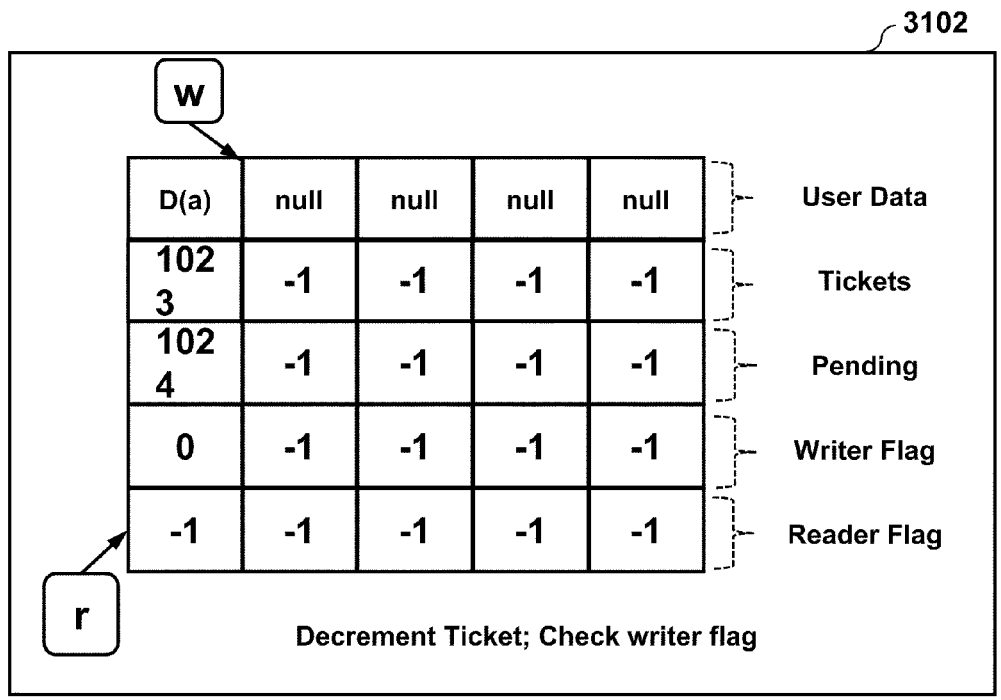

FIG. 32    Monotasks and Polytasks perform concurrent access via Atomic Addition Array (D)
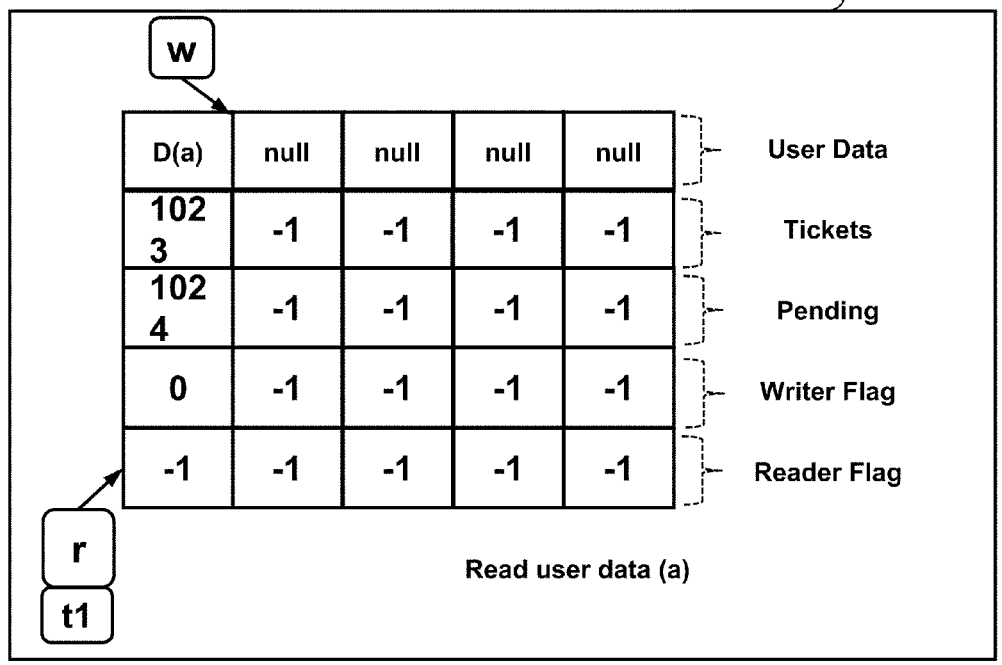
Read user data (a)
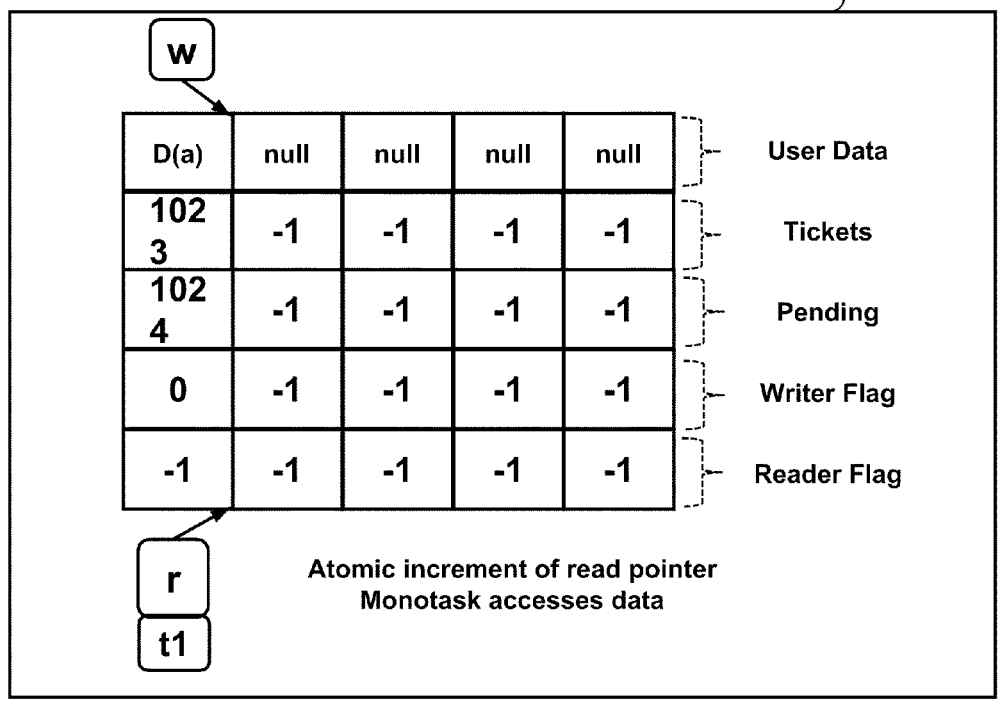
Atomic increment of read pointer
Monotask accesses data FIG. 33    Monotasks and Polytasks perform concurrent access via Atomic Addition Array (E)
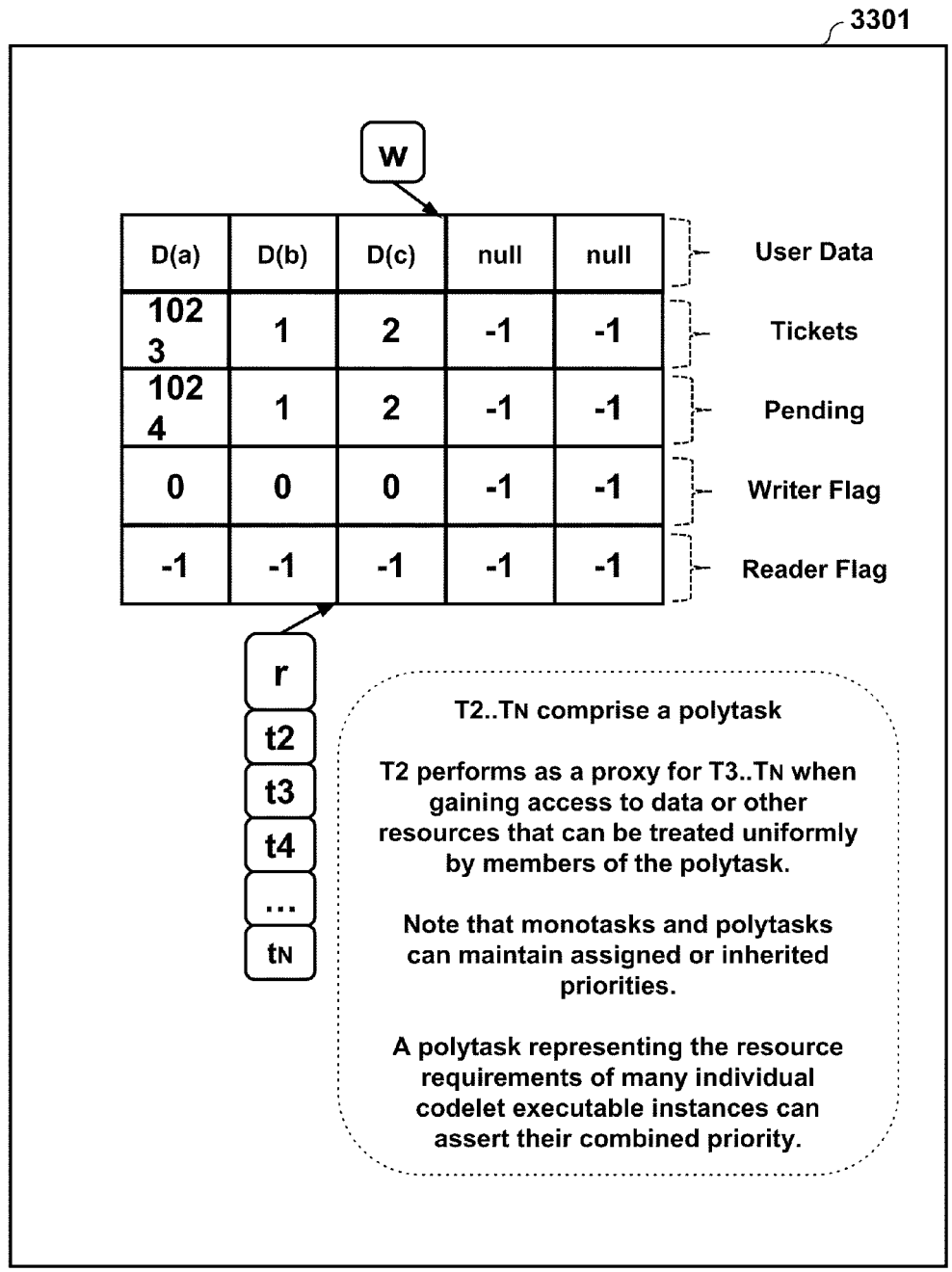

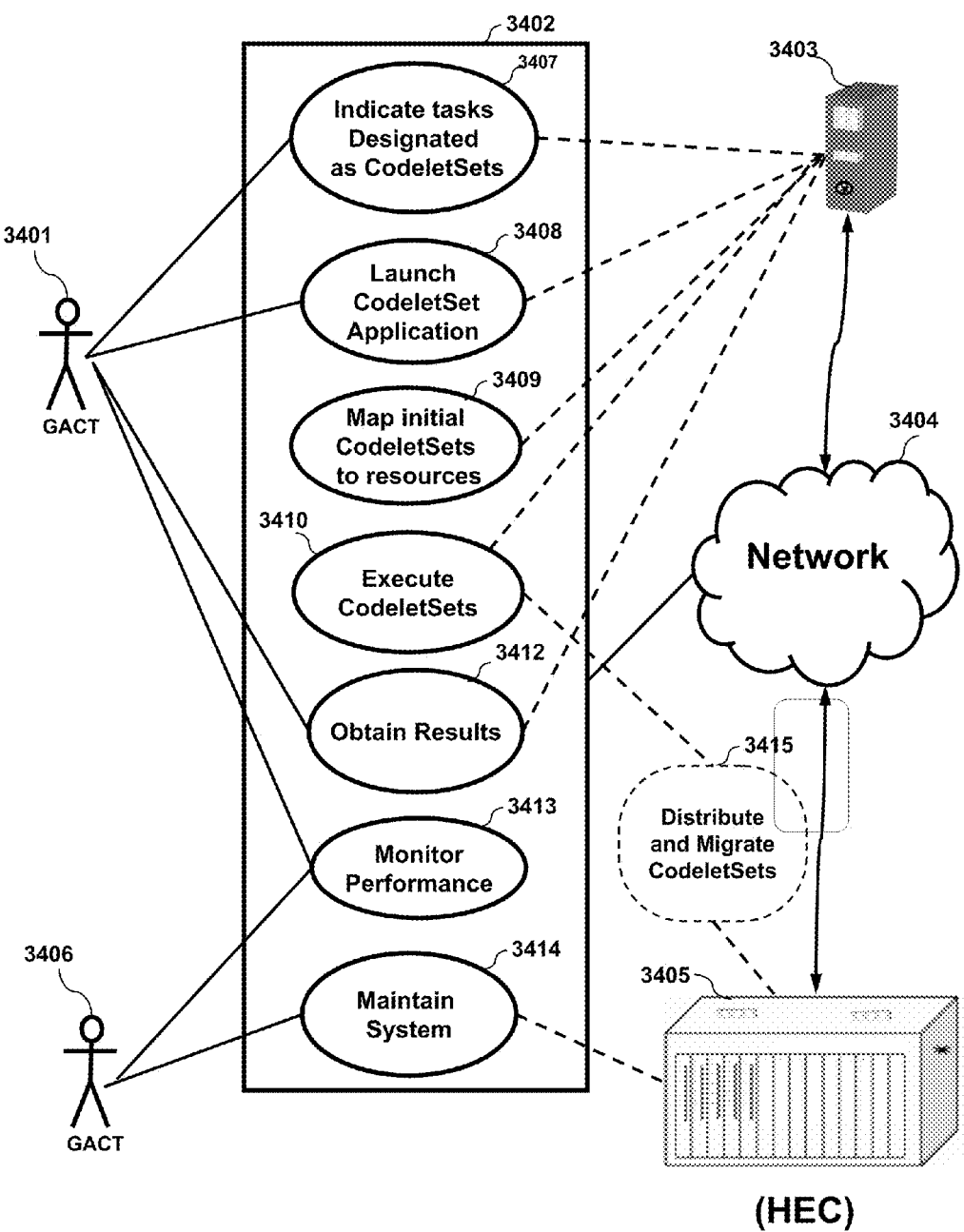
FIG. 34    CodeletSet computing system scenario

FIG. 35     Exemplary Architecture - Chip Level
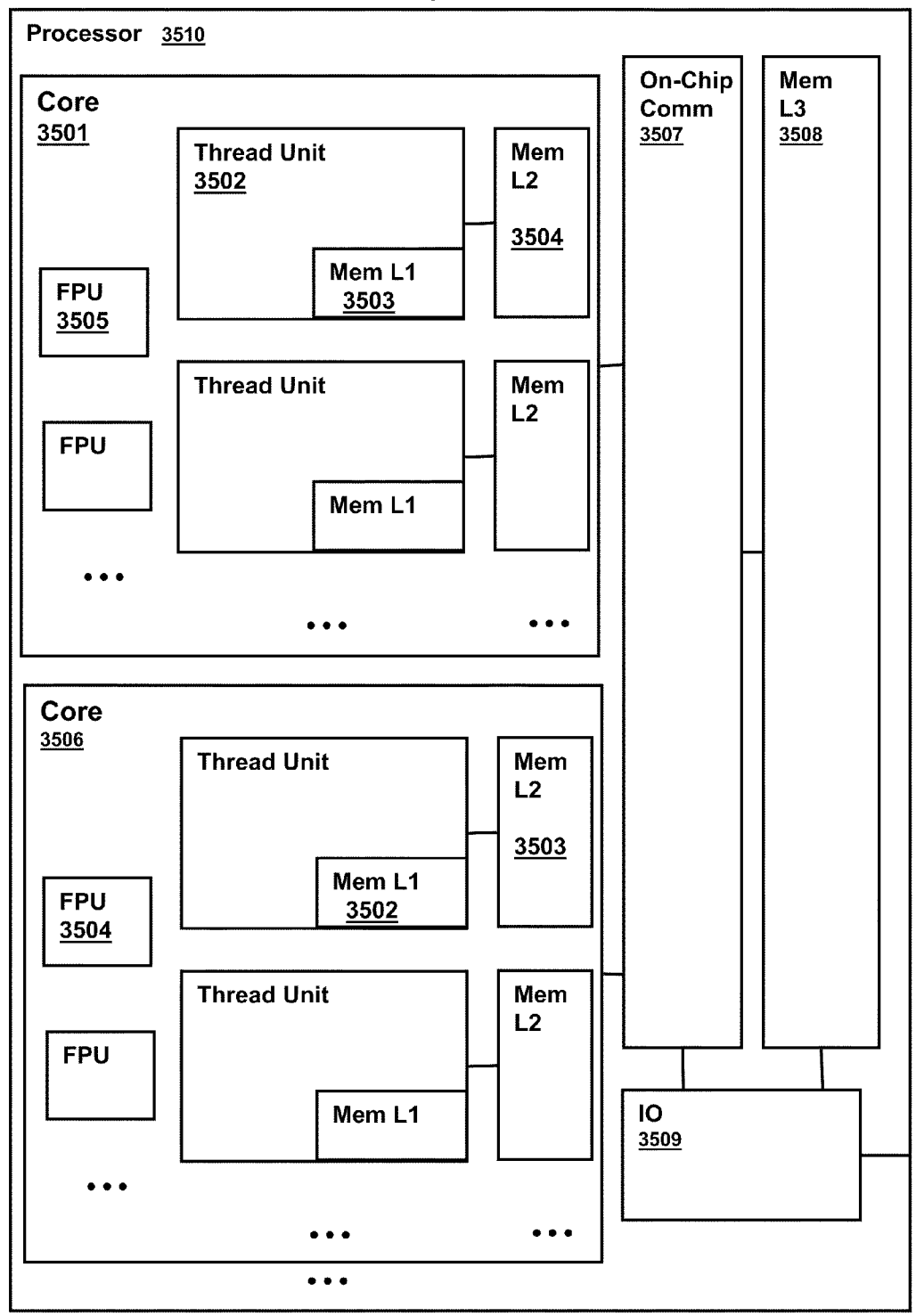

FIG. 36    Exemplary Architecture - Board / System Level
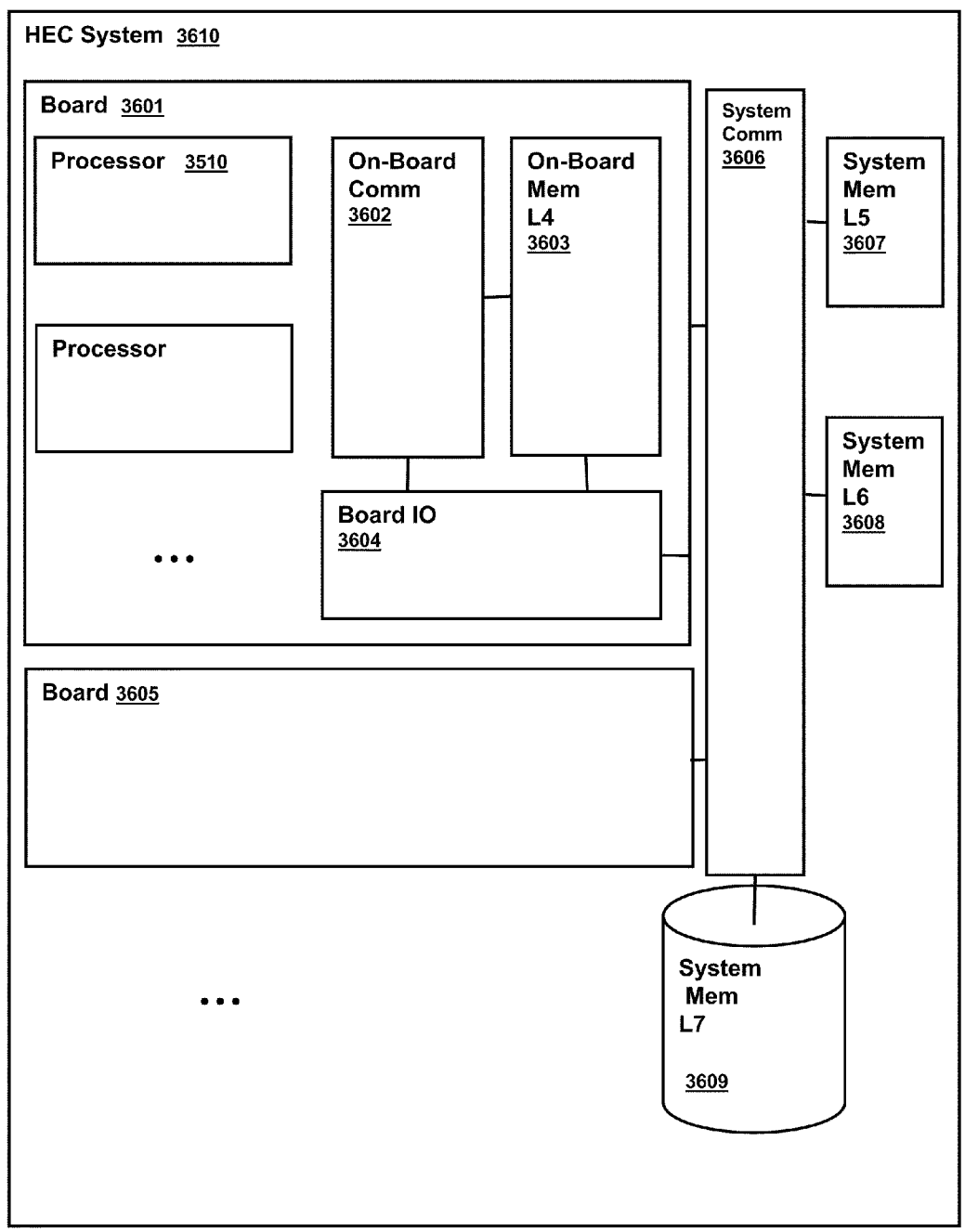

FIG. 37    Exemplary Designation of codelets and codelet sets

General Specification Mechanism

Define a set (Can contain Codelets or CodeletSets)
```
codelet_set_t *CreateCodeletSet(int count)
```
Express set membership
```
int AddElement(codelet_set_t *s, codelet_set_t *set, void *codelet,
               int priority, char *name)
```
Express dependency
```
void SetDependency(codelet_set_t *s, int producer, int consumer)
```
Runtime Compilation
```
void ImplementSet(codelet_set_t *d)
```
Transforms graphs into pointers
Determines what can be auto-enabled if descriptor is fired
Fire a CodeletSet
```
void SignalSet(codelet_set_t *d)
```
— 3701

---

C Language
```
include <codeletsets.h> double_task f1(double *x, double *y) {
  // processing
  return y[i];
} pragma codelet _start
void f2(int x, int y) {
   pragma codeletsetvariable int x[20]
   // processing
}
#pragma codelet _end
```

Explicit labeling of codelets and codeletSets via pragmas — 3702

--- scheme language
```
(define (f1 x y)
   (process x y)))

(define (f2 x y)
   (codelet (process (codeletset x) y)))
```

Implicit designation of codelets and codeletSets — 3703

FIG. 38  Exemplary Double Buffer Computation (A)

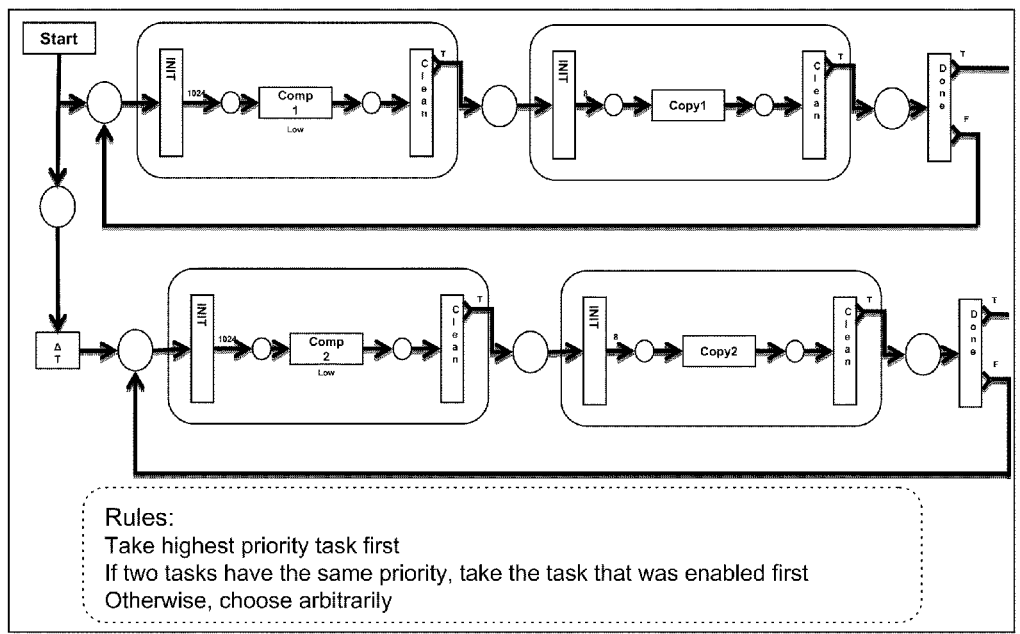

Rules:
Take highest priority task first
If two tasks have the same priority, take the task that was enabled first
Otherwise, choose arbitrarily 3802    3801

```
for (i=0; i<2; i++)
{
  comp_set[i] = CreateCodeletSet(1024);
  for (i=0; i<1024; i++) AddElement(comp_set[i],NULL,comp,0,"comp");
  copy_set[i] = CreateCodeletSet(8);
  for (i=0; i<8; i++) AddElement(copy_set[i],NULL,copy,1,"copy");
  buffer_set[i] = CreateCodeletSet(3);
  init_elem = AddElement(buffer_set[i],NULL,NULL,0,"Init");
  comp_elem = AddElement(buffer_set[i],comp_set[i],NULL,0,"Comp set");
  copy_elem = AddElement(buffer_set[i],copy_set[i],NULL,0,"Copy set");
  SetDependency(buffer_set[i],init_elem,comp_elem,"Init Signal");
  SetDependency(buffer_set[i],comp_elem,copy_elem,"Compute Complete
      Signal");
  SetDependency(buffer_set[i],copy_elem,comp_elem,"Copy Complete Signal");
  ImplementSet(buffer_set[i]);
  SignalSet(buffer_set[i]);
}
```

FIG. 39         Exemplary Double Buffer Computation (B)
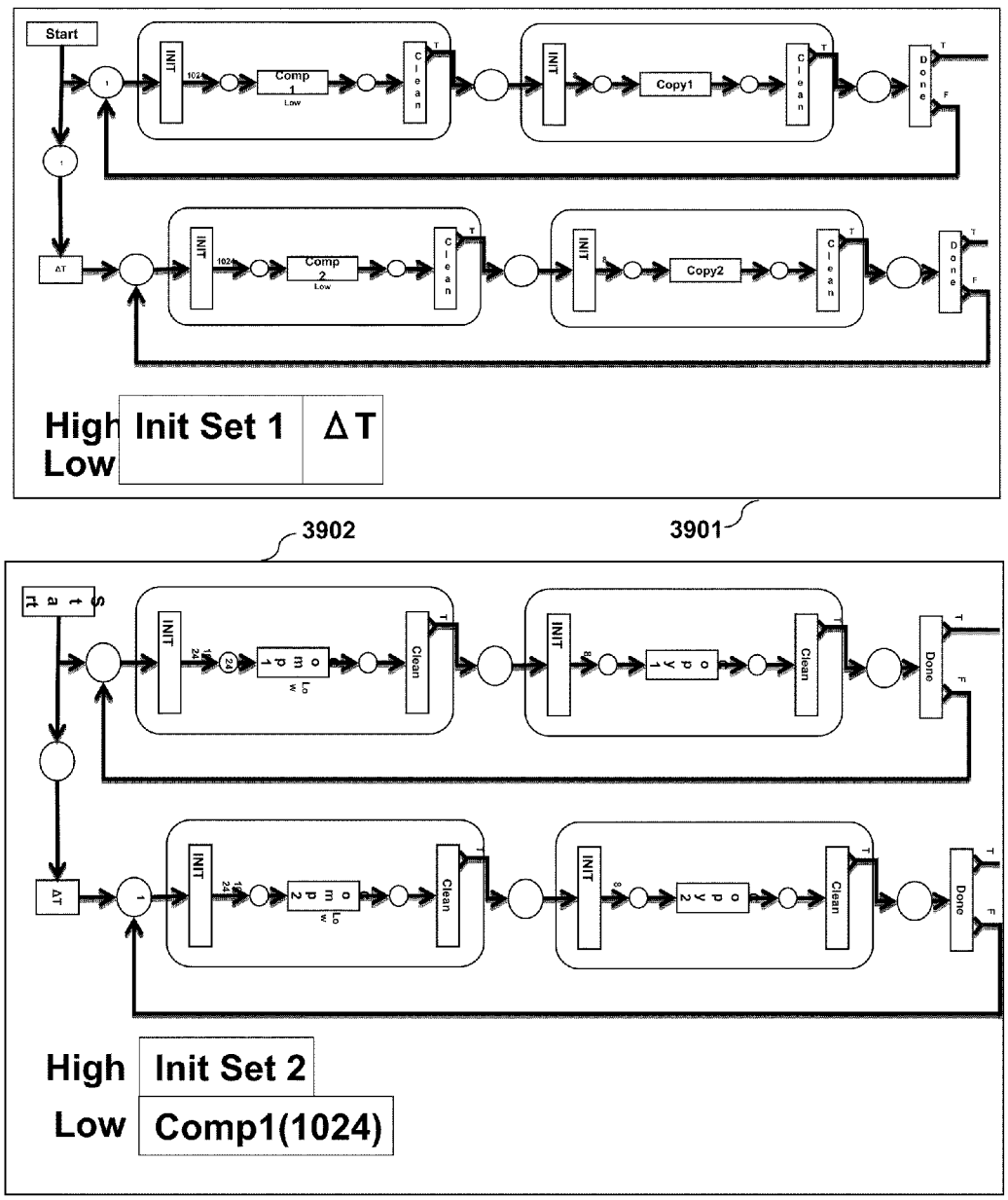

FIG. 40      Exemplary Double Buffer Computation (C)
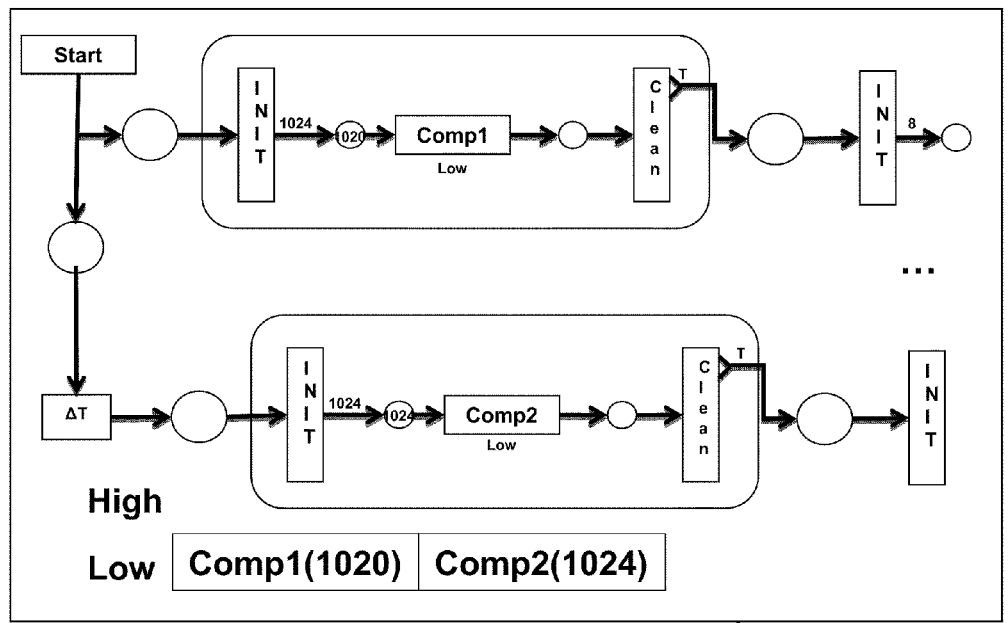
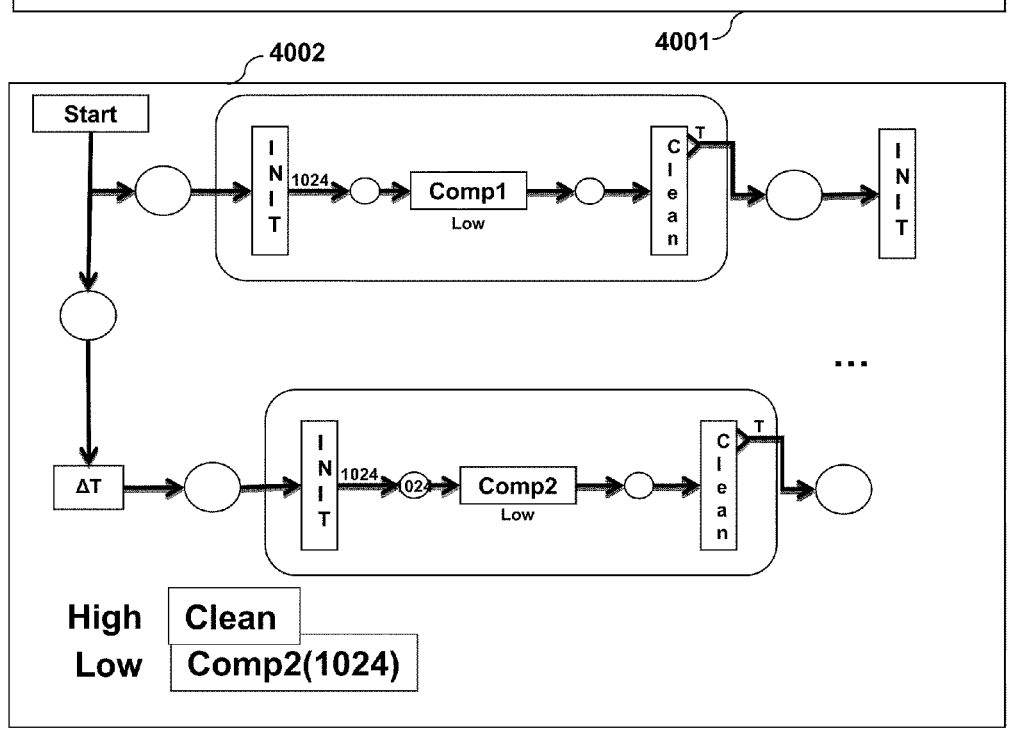

FIG. 41        Exemplary Double Buffer Computation (D)
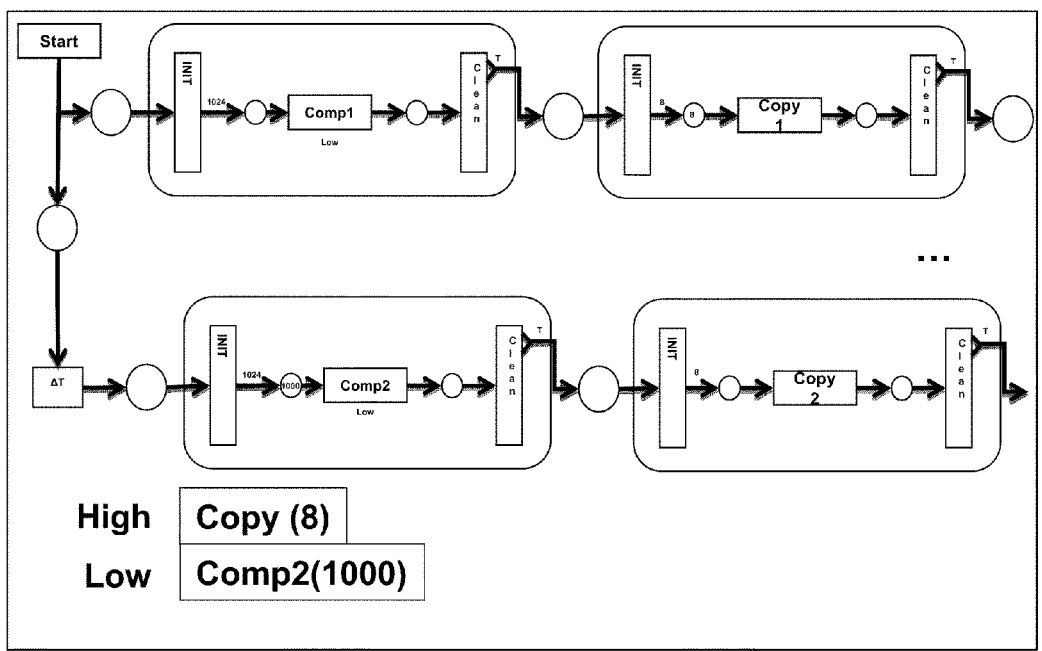
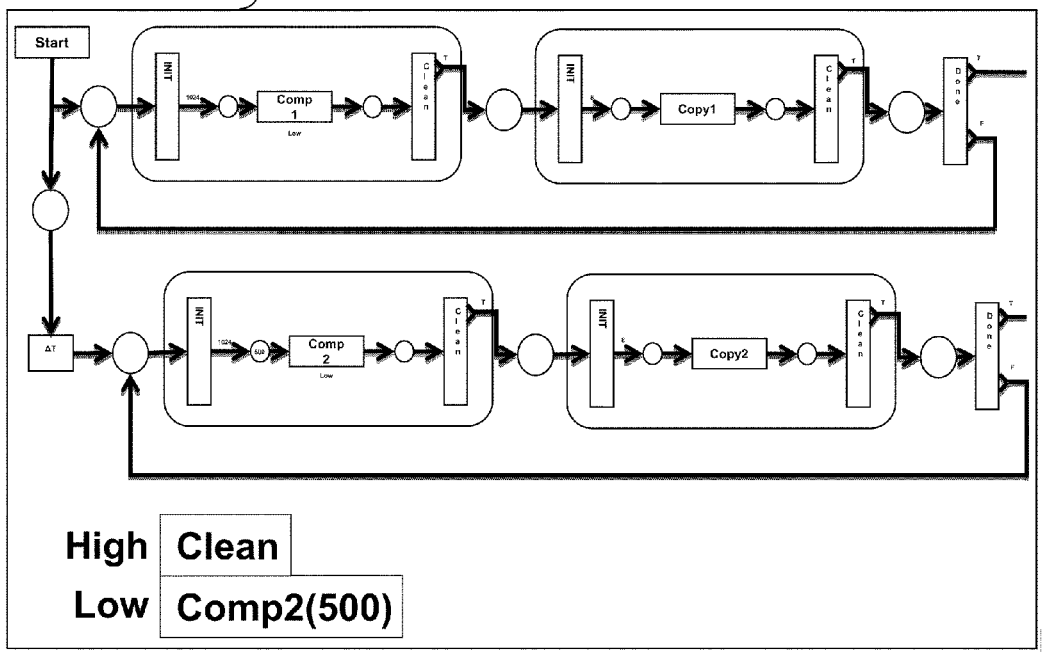

FIG. 42        Exemplary Double Buffer Computation (E)
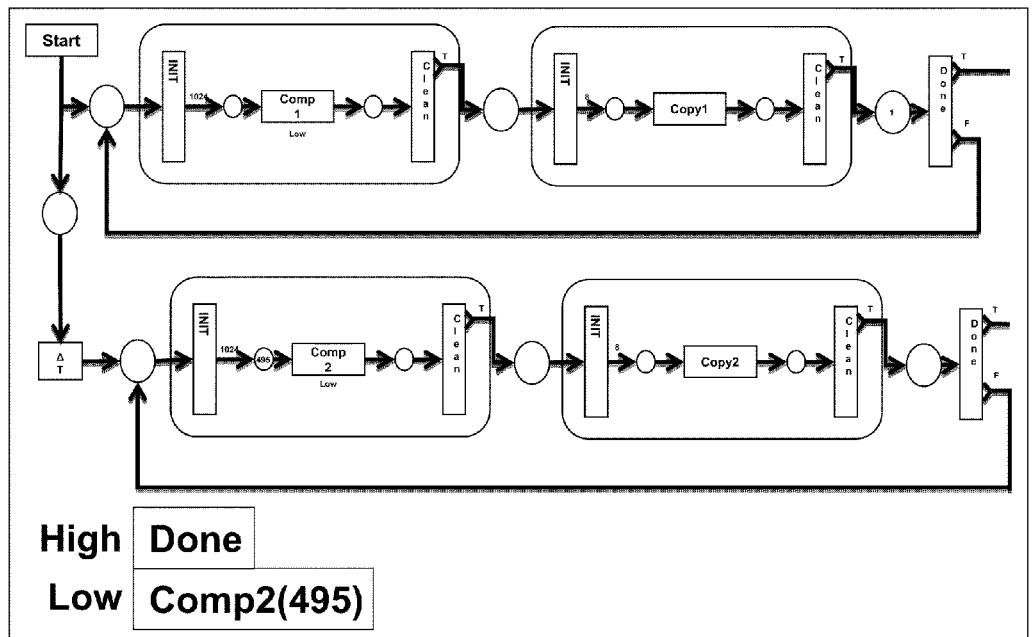
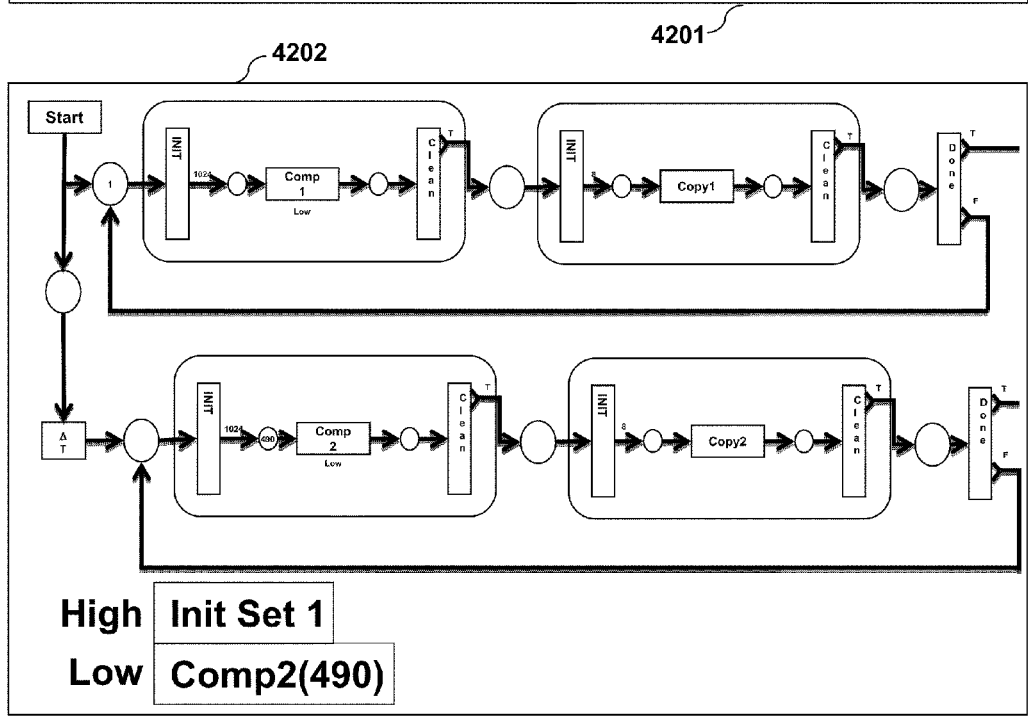

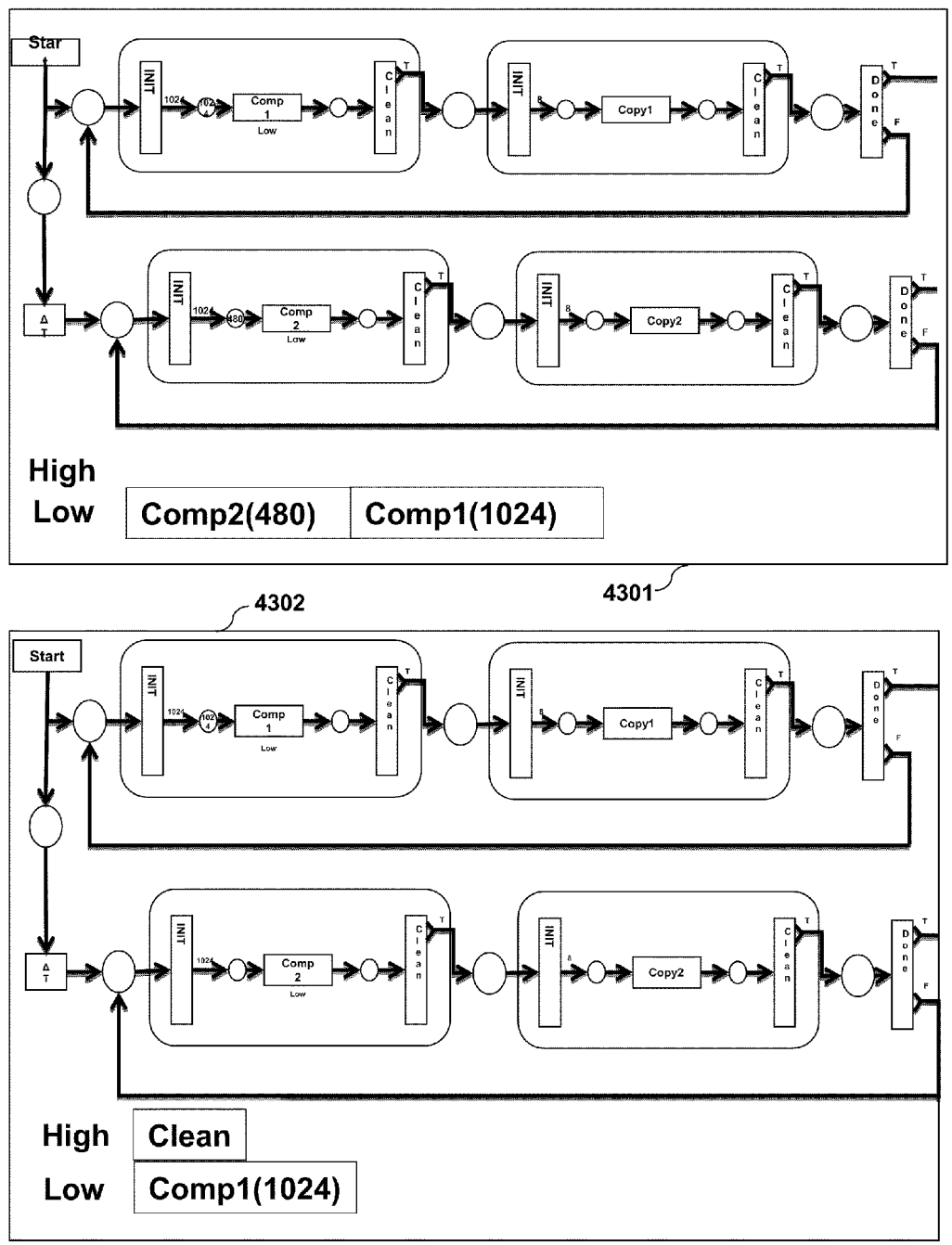
FIG. 43 Exemplary Double Buffer Computation (F)

FIG. 44        Exemplary Double Buffer Computation (G)
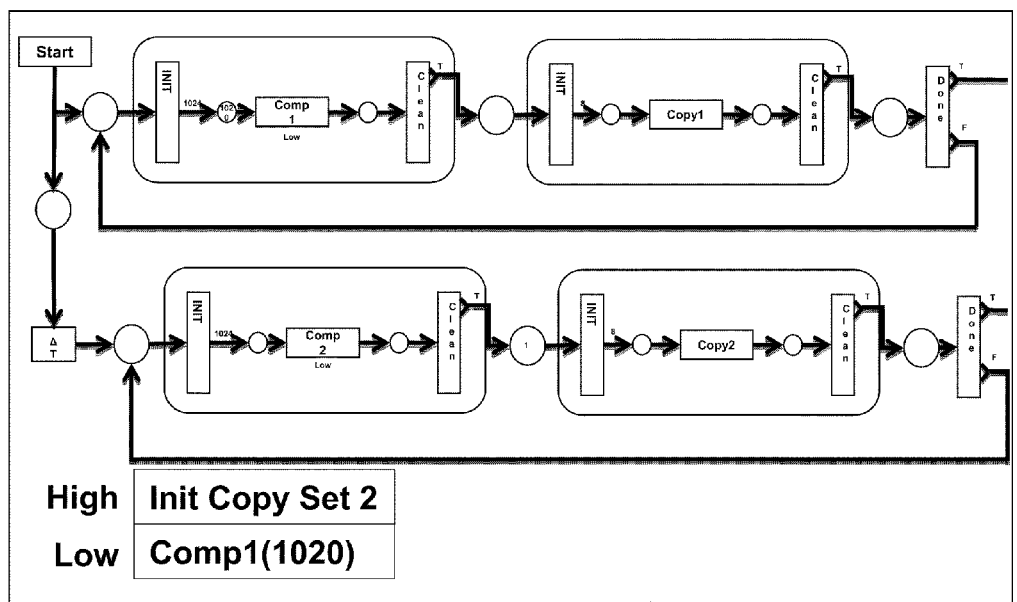

FIG. 45        Exemplary Matrix Multiply – SRAM v. DRAM
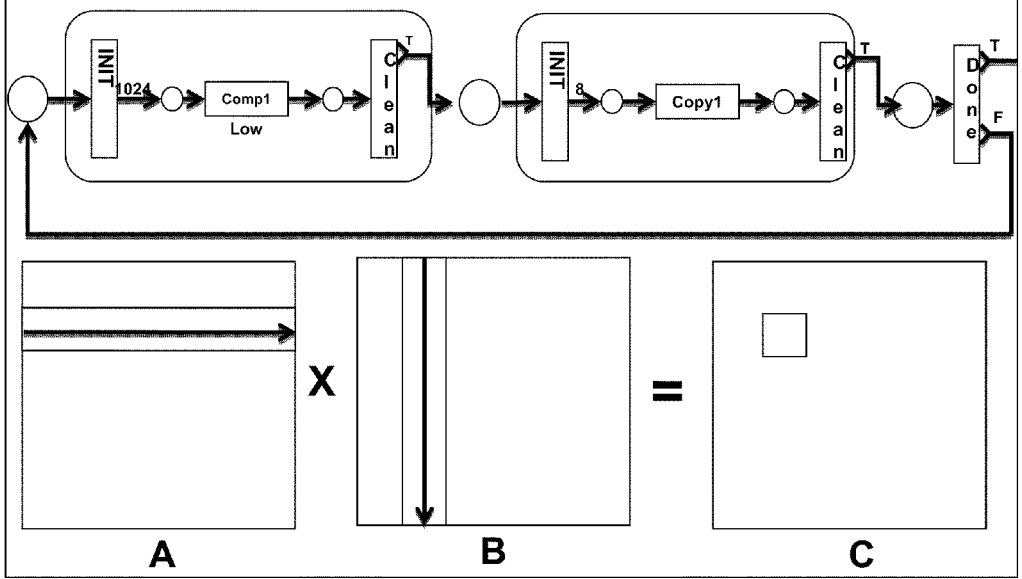
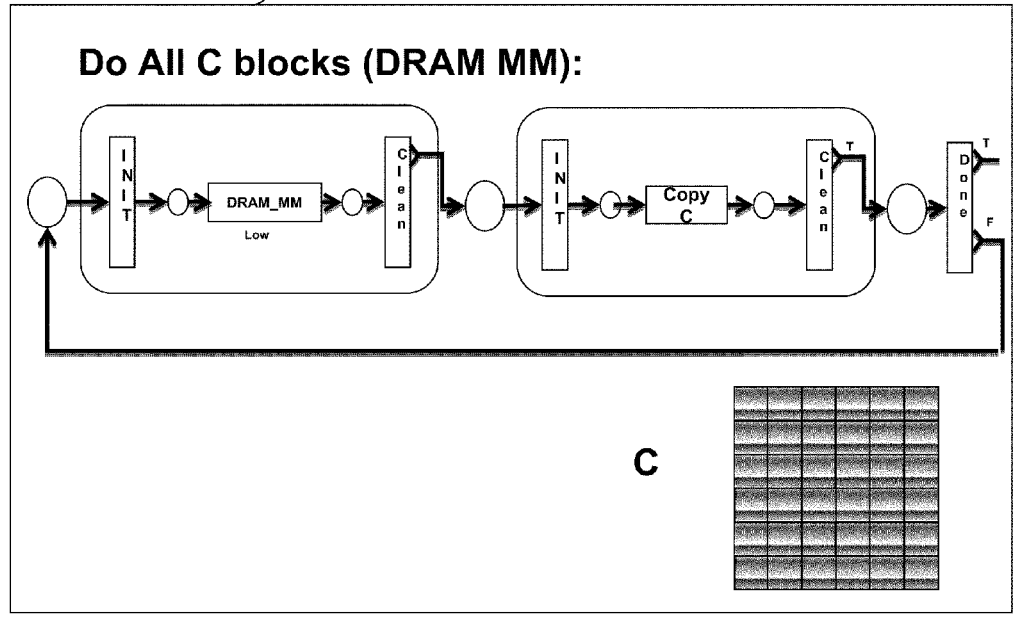

FIG. 46     Exemplary Matrix Multiply Double Buffer / DRAM
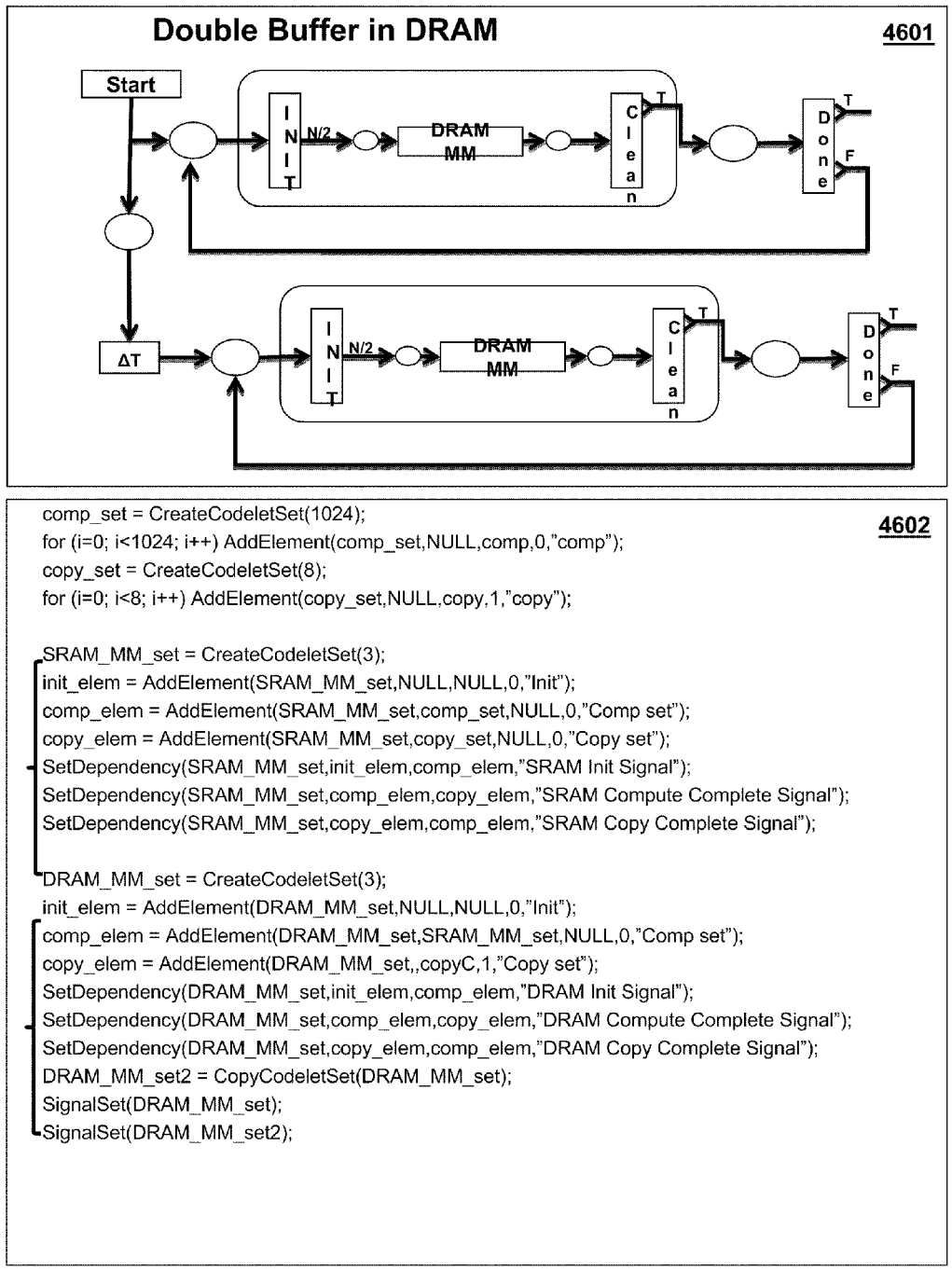

FIG. 47                                                            LINPACK DTRSM
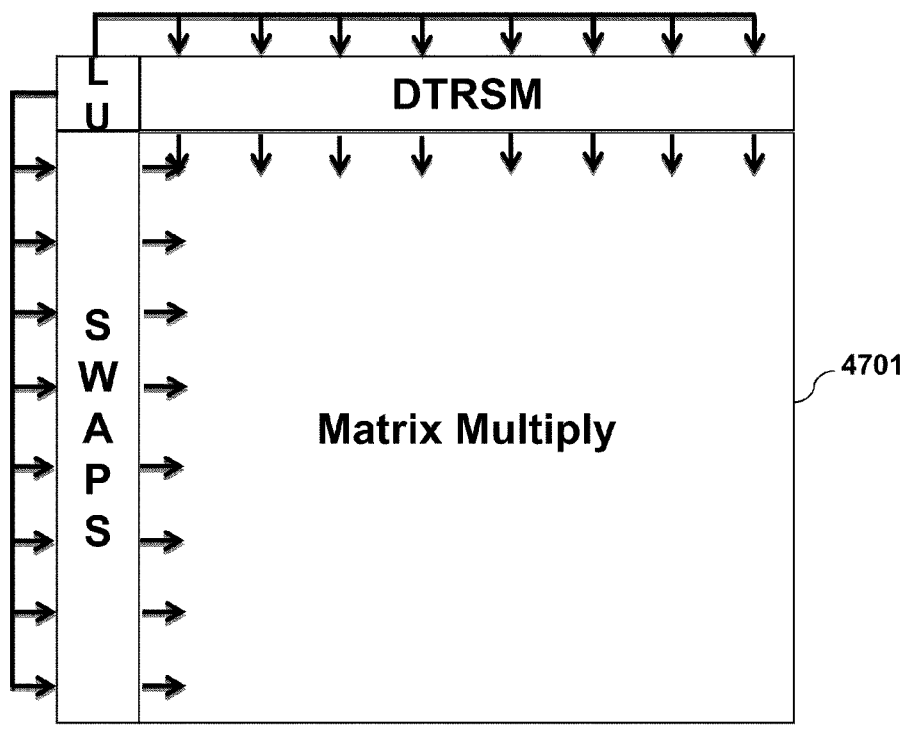
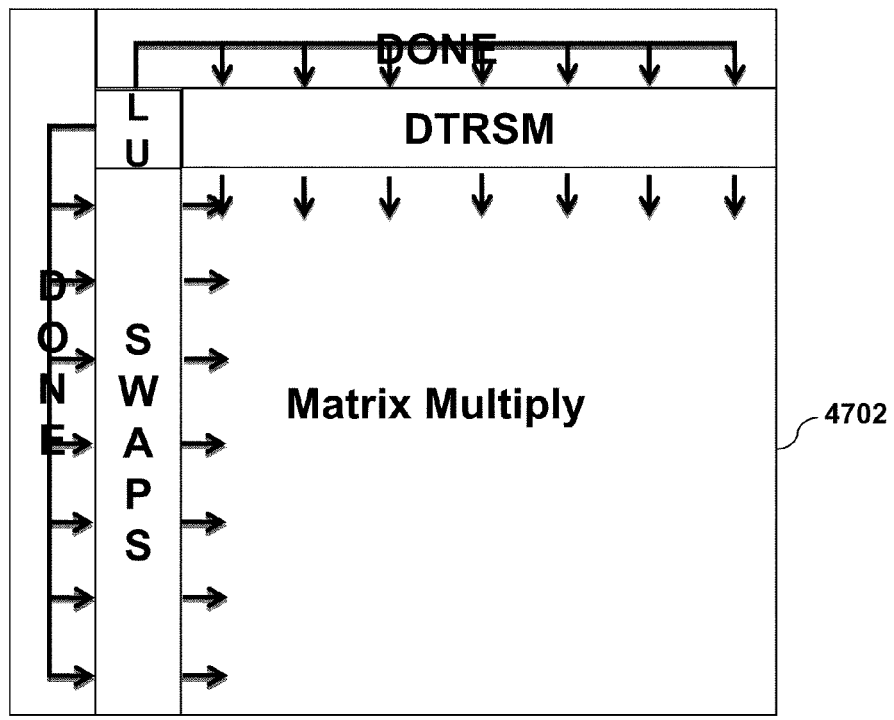

FIG. 48    Runtime Initialization of CodeletSet for DTRSM

```
Init(void *args)
{
  this = (codelet_set_t *)args[0];
  iteration = (int) args[1];
  problem_size = (int) args[2];
  length = problem_size-iteration-1;
  lu_elem = AddElement(this,LU,NULL,1,"LU");
  for (i=0; i<length; i++){
    dtrsm_elem[i] = AddElement(this,DTRSM,NULL,1,"DTRSM");
    swap_elem[i] = AddElement(this,SWAP,NULL,1,"DTRSM");
  }
  for (i=0; i<length; i++) for (j=0; i<length; j++)
    dgemm_elem[i][j] = AddElement(this,DGEMM,NULL,0,"DTRSM");
  for (i=0; i<length; i++) {
    SetDependancy(this,LU_elem,dtrsm_elem[i],"Fire DTRSM %d iter %d", i, iteration);
    SetDependancy(this,LU_elem,swap_elem[i],"Fire swap %d iter %d", i, iteration);
    for (j=0; j<length; j++) {
      SetDependancy(this,dtrsm_elem[j],dgemm_elem[i][j],
            "Fire DTRSM->DGEMM %d,%d iter %d", i, j, iteration);
      SetDependancy(this,swap_elem[i],dgemm_elem[i][j],
            "Fire SWAP->DGEMM %d,%d iter %d", i, j, iteration);
    }
  }
  SignalSet(this);
}
```

4801

4802

Some optimizations

•After first row and column of DGEMMs are done, you can do the next set
•Set the priority of the first row and column DGEMMs to high to enable the following work.

FIG. 49  Quicksort example
- Get left block and right block
- Clean block and one will be dirty
- Grab another of the block type (left or right) you just cleaned and repeat
  - Until there are only dirty blocks of one type
- After all blocks are only dirty on one side, move blocks
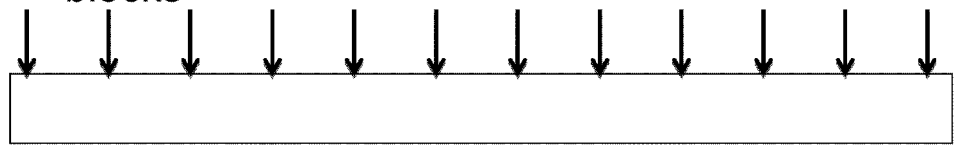
4902  4901
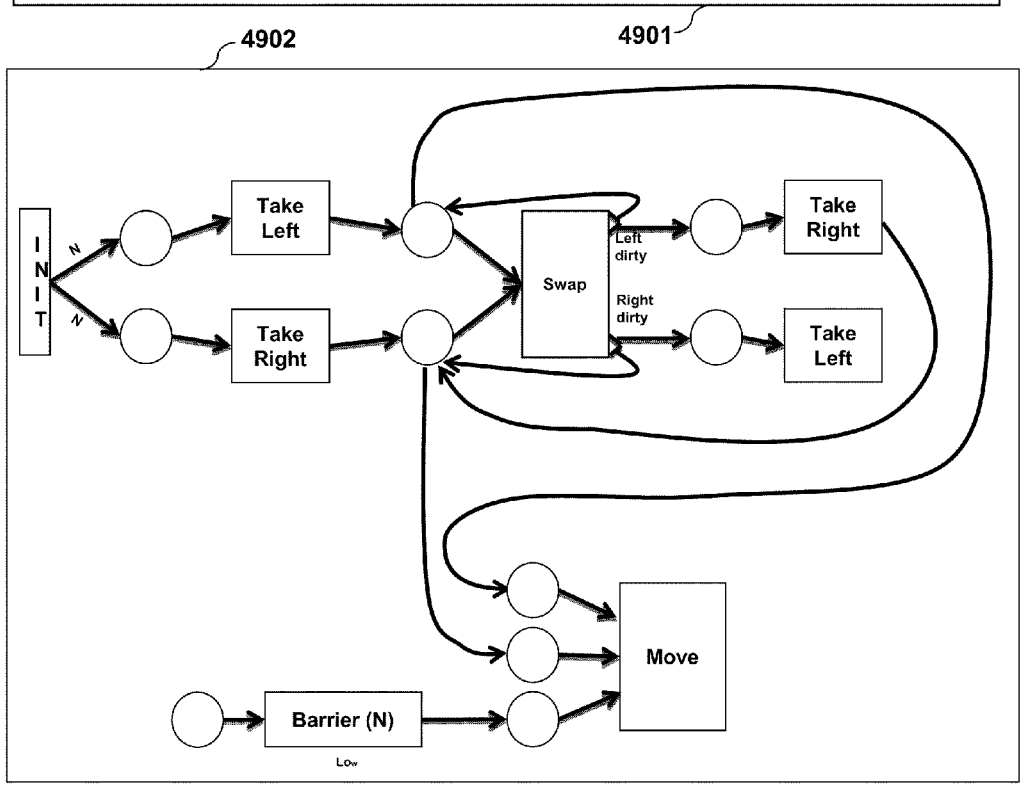

FIG. 50        Scalable system functions

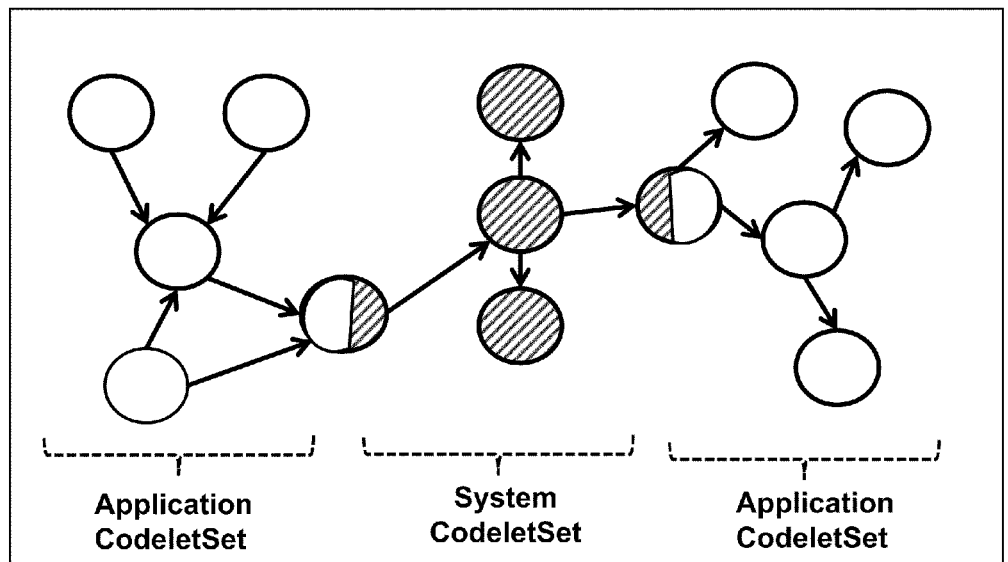

Application CodeletSet    System CodeletSet    Application CodeletSet 5002        5001

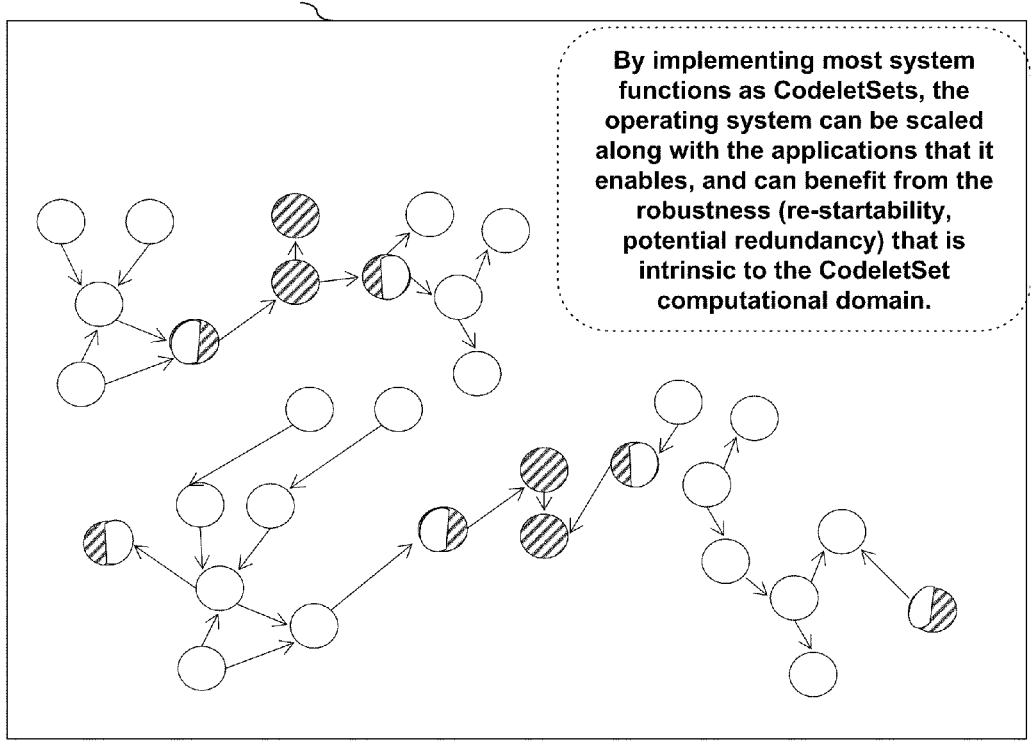

By implementing most system functions as CodeletSets, the operating system can be scaled along with the applications that it enables, and can benefit from the robustness (re-startability, potential redundancy) that is intrinsic to the CodeletSet computational domain.

FIG. 51

Conversion of Legacy code to Polytasks

5101

| Function | InVars | OutVars | Use | Count | Priority |
|---|---|---|---|---|---|
| MP1(A,B,C) | A,B | C | LIB1 | 12 | 3 |
| LIB1(k,C) | k,C | C | F2 | 8 | 5 |
| F2(X,C) | C | X | [BB1] | 8 | 7 |
| BB1(D,X.E) | — | — | — | 1 | 9 |
| MP2(D,C) | D,C | D | LIB2 | 8 | 1 |
| LIB2(D,C) | D,C | E | Print | 16 | 1 |
| PRINT | E | — | — | 1 | 9 |

Functions converted from standard parallel processing libraries (such as MPI) or functions defined in a Polytask API can be statically marked for polytask execution.

Functions in "BlackBox" code can be analyzed symbolically, to be converted to polytasks, or can be analyzed historically to guide conversion. Engineers can mark sections to be run as polytasks.

The system considers 4 types of dependencies, when they are available:
- Read after Read – which is used to guide code locality
- Read after Write – which must be ordered appropriately
- Write after Read – which must be ordered appropriately
- Write after write – which allows the first write to be skipped

EFFICIENT EXECUTION OF PARALLEL COMPUTER PROGRAMS

CROSS REFERENCE TO RELATED APPLICATIONS

This application claims the benefit of:
[1] U.S. Provisional Application No. 61/323,362, filed Apr. 13, 2010;
[2] U.S. Provisional Application No. 61/377,067, filed Aug. 25, 2010; and
[3] U.S. Provisional Application No. 61/386,472, filed Sep. 25, 2010, each of which is incorporated by reference in its entirety.

GOVERNMENT RIGHTS

The United States Government has rights in portions of this invention pursuant to Contract No. HR0011-10-3-0007 between the United States Defense Advanced Research Projects Agency (DARPA) and ET International, Inc.

BACKGROUND

Technical Field

The present invention, referred to as runspace, relates generally to fields of computing system control, data processing and data communications, and more specifically to methods and systems which provide resource-efficient computation, including for execution of large, many-component tasks distributed on multiple processing elements.

Descriptions of the Related Art

Modern high-end computer architectures embody tens of thousands to millions of processing elements, large amounts of distributed memory, together with varying degrees of non-local memory, networking components and storage infrastructure. These systems present great challenges for both static and dynamic optimization of resources consumed by executing applications. Traditionally, computer architectures have labored to present applications with a single, simple address space, along with intuitively reasonable semantics for sequential execution of code and access to data. The resulting paradigm has served well for years, but becomes an impediment to optimal resource allocation when both computation and data are distributed and virtually all hardware speedup is accomplished via parallel processing, rather than by faster clock rates. The current invention anticipates a stage when semiconductor manufacturers approach physical or cost-efficiency limits on the reduction of circuit sizes, leaving parallelism as the most promising avenue for performance improvement. Already, in applications where maximum performance is critical, traditional OS resource allocation via interrupts and pre-emption impedes performance. Thus, a major challenge in achieving efficient distributed computing is providing system software that makes optimal use of the physical system while providing a usable abstract model of computation for writers of application code.

SUMMARY

The invention provides systems and method for compiling and running computer programs with a goal of seeking maximally resource-efficient program execution. These systems and methods involve: at compile-time, determining an optimal efficiency execution environment for segments of a given program referred to as codelets; and at run-time, accordingly placing and scheduling codelets to their optimal efficiency execution environments for execution.

Embodiments of invention incorporated methods for efficiently allocating data processing system resources to application program tasks. Such methods involve: obtaining a group of codelets that accomplish certain data processing tasks; determining dependencies among these codelets; and dynamically placing and scheduling the codelets for execution using identified resources on a given data processing system based on the dependencies between the codelets and on availability and relative cost-of-usage of various resources of the data processing system.

Further methods according to embodiments of the invention, for pursuing user or system defined objectives for executing computer programs, are based on decomposing a given computer program into a set of abstract modules, which comprise codelets, sets of cooperating codelets, sets of cooperating abstract modules, and data shared between members of a given abstract module. Moreover, in various embodiments, these methods comprise steps of: obtaining program run-time information regarding the abstract modules, performance and resource utilization associated with the program; and using the program run-time information to guide subsequent placement or execution scheduling of the abstract modules on an ongoing or a subsequent runs of the computer program or portions thereof. Further embodiments of such methods comprise steps, which are implemented at least in part by the runtime system, of: defining goals of proximity of the members of the abstract module in memory space and execution time; initially placing data and scheduling execution of codelets of an abstract module, and, when beneficial in pursuing a given user or system defined objective, migrating members of abstract modules, with the placing and the migrating being done in a coordinated manner to maximize actual proximity among members of abstract modules according to the defined goals thereof.

Additional aspects of the invention include a method for optimally parallelizing execution of a software program involving steps of: a) querying the runtime system to discover a quantity of processing cores available for execution of the program; b) determining a maximum quantity of processing units into which the program is divisible; and c) based on the quantities determined in steps a) and b) dividing the program into optimal number and sizes of processing units such as codelets, and d) managing parallel execution of the program according to the dividing per step c).

Systems according to embodiments of the invention optimally locate and schedule execution a set of codelets on a given data processing hardware. Such systems include digital hardware and software based means for: exchanging information among a set of processing resources regarding metrics relevant to optimal placement of the set of codelets among the processing resources; determining to which of the processing resources to locate to-be-executing codelets among said set; and placing and scheduling execution of the codelets using the processing resources according to said determining, wherein at least some of said means are excercised dynamically during the system runtime. Further aspects of the invention involve a data processing system consisting of multiple cores, with the system comprising: a) a set of system management agents that include one or more among: data percolation manager, a codelet scheduler, a codelet migration manager, a load balancer, a power regulator and performance manager; and b) means for said set of agents to transact in a synergistic manner, in order to pursue the system-wide goals, which in various embodiments, providing dynamic runtime system behavior, are time-variable.

The invention also encompasses application and system software programs for implementing various combinations of the methods of the invention, as well as hardware systems running such programs, and related hardware and software products.

BRIEF DESCRIPTION OF THE DRAWINGS

FIG. 1 illustrates an exemplary runspace architecture.

FIG. 2 shows exemplary runspace allocation with multiple scopes.

FIG. 3 portrays an exemplary runspace runtime system.

FIG. 4 illustrates an exemplary case of runtime performance monitoring and allocation.

FIG. 5 exemplifies runtime behavior for code in the runspace system.

FIG. 6 portrays an exemplary hierarchy of interactions.

FIG. 7 illustrates an exemplary self-optimizing operating system.

FIG. 8 exemplifies explicit and implicit application directives.

FIG. 9 shows an exemplary micro-memory management unit.

FIG. 10 depicts an exemplary application use case.

FIG. 11 depicts exemplary grouping in runspace, over time.

FIG. 12 illustrates a computing system using codelet sets.

FIG. 13 shows a codelet set representation system.

FIG. 14 shows an example of translation of codelet sets.

FIG. 15 shows meta-level codelet set distribution.

FIG. 16 shows codelet set execution and migration.

FIG. 17 illustrates double-ended queue concurrent access mechanisms: write/enqueue.

FIG. 18 shows dequeue concurrent access mechanisms: read/dequeue.

FIG. 19 illustrates concurrent access via atomic addition array (A): write.

FIG. 20 illustrates concurrent access via atomic addition array (B): write.

FIG. 21 illustrates concurrent access via atomic addition array (C): read.

FIG. 22 illustrates linked list, specifically atomic addition arrays (A).

FIG. 23 illustrates linked list, specifically atomic addition arrays (B).

FIG. 24 illustrates linked list, specifically atomic addition arrays (C).

FIG. 25 illustrates linked list, specifically atomic addition arrays (D).

FIG. 26 illustrates linked list, specifically atomic addition arrays (E).

FIG. 27 illustrates concurrent access via shared array with turns.

FIG. 28 illustrates a combining network distributed increment.

FIG. 29 illustrates monotasks and polytasks performing concurrent access via an atomic addition array (A).

FIG. 30 illustrates monotasks and polytasks performing concurrent access via an atomic addition array (B).

FIG. 31 illustrates monotasks and polytasks performing concurrent access via an atomic addition array (C).

FIG. 32 illustrates monotasks and polytasks performing concurrent access via an atomic addition array (D).

FIG. 33 illustrates monotasks and polytasks performing concurrent access via an atomic addition array (E).

FIG. 34 illustrates a codelet set computing system scenario.

FIG. 35 illustrates a generic exemplary architecture at a chip level.

FIG. 36 illustrates a generic architecture at a board/system level.

FIG. 37 illustrates designation of codelets and codelet sets.

FIG. 38 illustrates double buffer computation (A).

FIG. 39 illustrates double buffer computation (B).

FIG. 40 illustrates double buffer computation (C).

FIG. 41 illustrates double buffer computation (D).

FIG. 42 illustrates double buffer computation (E).

FIG. 43 illustrates double buffer computation (F).

FIG. 44 illustrates double buffer computation (G).

FIG. 45 illustrates matrix multiply, with SRAM and DRAM.

FIG. 46 illustrates matrix multiply double buffer/DRAM.

FIG. 47 illustrates an example in computing LINPACK DTRSM (a linear algebra function).

FIG. 48 illustrates runtime initialization of codelet set for DTRSM.

FIG. 49 illustrates a quicksort example.

FIG. 50 illustrates scalable system functions interspersed with application codelet sets.

FIG. 51 illustrates the conversion of legacy code to polytasks.

DETAILED DESCRIPTION

Figure 52:
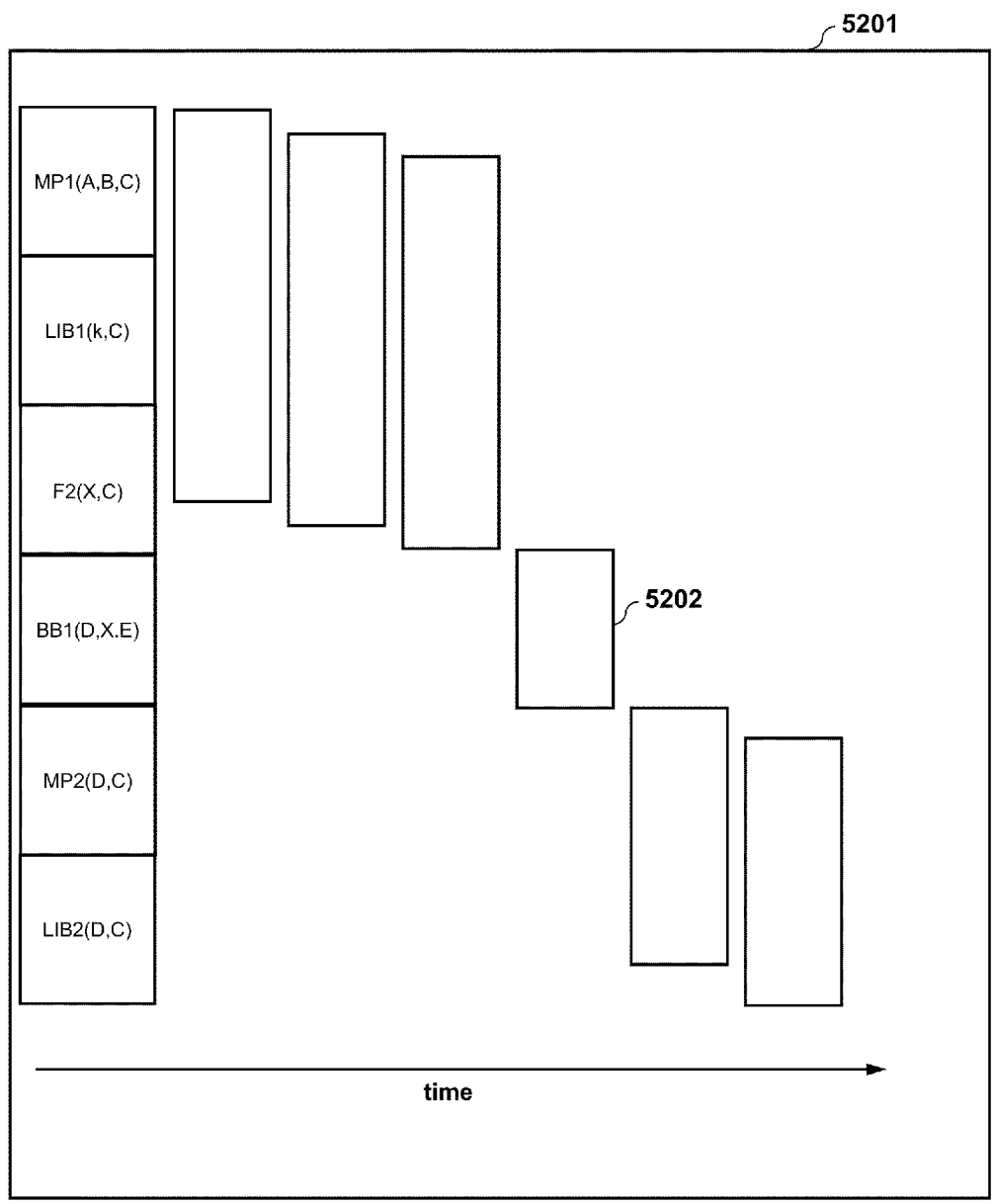
FIG. 52 illustrates blackbox code running with polytask code.

Glossary of Terms as they are Used
  Application: a set of instructions that embody singular or multiple related specific tasks that a user wishes to perform
  Application Programmer Interface (API): a set of programmer-accessible procedures that expose functionalities of a system to manipulation by programs written by application developers who may not have access to the internal components of the system, or may desire a less complex or more consistent interface than that which is available via the underlying functionality of the system, or may desire an interface that adheres to particular standards of interoperation.
  Codelet: a group of instructions that generally are able to be executed continuously to completion after their inputs become available.
  Codelet sets: groups of codelets that can be treated as a unit with respect to dependency analysis or execution.
  Computational domain: a set of processing elements that are grouped by locality or function. These domains can hierarchically include other computational domains. Hierarchical domain examples may include system, node, socket, core, and/or hardware thread.
  Concurrent systems: sets of concurrent processes and objects that are manipulated by those processes.
  Core: a processing unit in a computation device. These include, but are not limited to a CPU (central processing unit), GPU (graphics processing unit), FPGA (field gate programmable array), or subsets of the aforementioned Dependency: a directed arc between two codelet sets representing that one is to finish before the other can start.

Fractal regulation structure: mechanisms that provide efficient use of resources securely and reliably on multiple scales within the system, using similar strategies at each level.

GACT, Generalized actor: one user or a group of users, or a group of users and software agents, or a computational entity acting in the role of a user so as to achieve some goal.

GCS, Generalized computing system: one or more computers comprising programmable processors, memory, I/O devices that provide access to data and computing services.

CSIG, a codelet signal: a communication between codelets, or between a supervisory system and at least one codelet, that enables codelets whose dependencies are satisfied or communicates status and completion information.

Hierarchical execution model: a multi-level execution model in which applications are disaggregated at several levels, including into codelets at a base level of granularity.

Linearizability: One or more operations in a concurrent processing system that appear to occur instantaneously. Linearizability is typically achieved by instructions that either succeed (as a group) or are discarded (rolled back) and by systems that provide "atomic" operations via special instructions, or provide locks around critical sections.

Lock-free synchronization: non-blocking synchronization of shared resources to ensure (at least) system-wide progress.

Local Area Network (LAN): connects computers and other network devices over a relatively small distance, usually within a single organization.

Node: a device consisting of one or more compute processors, and optionally memory, networking interfaces, and peripherals Over-provisioning: Providing more numerous processing elements and local memories than are minimal, to allow more latitude in resource allocation. For instance, replacing a small number processing elements running highly sequential tasks at high clock speeds with more processing elements, running more distributed code and data at slower clock speeds.

PolyTasks: A group of related tasks that can be treated as a unit with respect to a set of computational resources. Typically, polytasks have similar resource demands, and may seek allocation of a block of resources. Polytasks can also have complementary resource requirements, and can perform load balancing by virtue of distributed requests.

Proximity: locality as in memory space, compute space, or the state of being close in time or dependence.

Queue: a data structure that can accept elements for enqueue and remove and return elements on dequeue. An element may be enqueued or dequeued at any position including, but not limited to, the beginning, end, or middle of the queue.

Run-time system (RTS): a collection of software designed to support the execution of computer programs.

Scalability: an ability of a computer system, architecture, network or process that allows it to efficiently meet demands for larger amounts of processing by use of additional processors, memory and connectivity.

Self-aware control system: a system that employs a model of its own performance and constraints, permitting high-level goals to be expressed declaratively with respect to model attributes.

Signal: An event enabling a codelet set. A signal can be sent by a codelet during execution.

Task: a unit of work in a software program.

Thread: a long-lived runtime processing object that is restricted to a specific processing element.

Wait-free synchronization: non-blocking synchronization of shared resources that guarantees that there is both system-wide progress, and per-thread progress.

Wide Area Network (WAN): Connects computers and other network devices over a potentially large geographic area.

The invention provides methods and systems for representation, manipulation and execution of codelet sets. Codelets are groups of typically non-preemptive instructions that can normally execute continuously to completion after their dependencies are satisfied. Codelet sets are groups of codelets that can be treated as a unit with respect to dependency analysis or execution. Codelet sets diverge from the traditional programming and execution model in significant ways. Applications are decomposed into independent segments of code that can be executed with minimal need for system coordination. According to embodiments of the invention, rather than centralized control and allocation of resources, the system code (itself implemented via codelet sets) merely initializes the platform for codelet sets to run by enabling the initial codelets of a codelet set. These codelets have no prior dependencies and can therefore be enabled as soon as the codelet set is enabled. Codelet set applications need not be entirely held as text code space during their execution. In fact, translation of some infrequently used codelet set elements can be deferred, even indefinitely, if they are not required for a particular run or particular data provided during an execution.

Characteristics of embodiments of the codelet set approach include:
  decomposition of computational tasks to abstract modules that minimize inter-module dependencies;
  construction of a map of abstract dependencies that guides initial codelet enablement and the initial and on-going allocation of computing resources;
  use of a computational representation that has at least as much expressive power as Petri nets;
  migration of executing or soon-to-execute codelet sets to exploit locality of resources such as local memory, particular data and intermediate results, and the locality of cooperating codelets, in order to minimize communication delays;
  migration of codelet sets to obtain better global allocation of resources, to allow some processing resources to be attenuated for energy saving or for reserve of capacity, or, e.g. in heterogeneous systems, to make use of resources better suited for a given processing task;
  use of polytasks, i.e., related tasks that can be treated as a unit with respect to a set of computational resources, and that can be managed by a representative proxy task that acts to obtain needed resources or additional tasks for the group;
  use of atomic addition arrays, which efficiently mediate concurrent access for codelets that work on shared data or other processing inputs or resources, where the sequence of access is of potential significance;

use of linked-list atomic addition arrays, which permit the efficiency of predominantly local access while supporting virtually unlimited growth of concurrent data stores;

use of multi-turn/multi-generational atomic addition arrays, to maintain the benefits of strictly local storage while supporting a large number of pending operations; and combining networks, to provide cascaded increments to memory access, avoiding the bottleneck of a single global next function.

Key concepts and aspects of the invention are described in the following with references to the drawings. Note that in the description that follows, the steps and ordering of steps is given for the purpose of illustration, but many other orderings, subsets, and supersets will become obvious to the practitioner after exposure to the instant invention. The goal of brevity precludes enumerating every combination of steps that falls within the legitimate scope of the invention.

Overview:

Runspace is constructed to exploit highly parallel architectures of many processing elements, where both data and code are distributed in a consistent multi-level organization. Runspace systems and methods achieve optimal use of processing resources by maintaining a metric space model in which a distance measure is applied to code and data. A fine level of task allocation is at the level of codelets, which are groups of instructions that can be executed non-preemptively to completion after input conditions have been satisfied.

In embodiments of the invention, the runspace methods and systems allocate computing resources to computing tasks by performing one or more of the following: obtaining at set of codelets that accomplish a set of tasks; obtaining a set of specifications of data requested by codelets; constructing a metric space representing localities of codelets and the data they will access; obtaining statically defined initial arrangements for codelets with respect to the metric space distances; using the metric space representation for initially placing codelets or the data; obtaining dynamically-available runtime resource requests for codelets and data; and using the metric space representation for dynamically placing or moving codelets or data.

Additionally, in embodiments, the runspace prepares for allocation opportunities and exploits those opportunities at run-time, by analyzing at compile-time potential code and data allocations for operations and references that indicate opportunities for merging or migrating codelets and data, and then performing run-time migration of these codelets, merged codelets, or data to exercise opportunities presented by actual code and data allocations.

Moreover, in support of fine-grained execution of codelets, embodiments of runspace provides secure and efficient localized memory access through one or more of the following actions: decomposing application code to codelets; providing a local table containing logical and physical addresses; mapping the physical addresses of distinct groups of related codelets to distinct address spaces, where each distinct address space is accessible to its distinct group of related codelets; and treating any access by a given distinct groups of codelets to a space outside its distinct address space as an error.

The invention further provides methods and systems for representation, manipulation and execution of codelet sets. Codelet sets are groups of codelets that can be treated as a unit with respect to dependency analysis or execution. Codelet sets provide a mechanism for developing and executing distributed applications, as well as a mechanism for composability of an application: codelet sets can contain codelet sets and they can be hierarchically constructed and reused. Even though codelets can run to completion without preemption as soon as their dependencies are satisfied, they can also be run on preemptive systems, either to simulate non-preemptive multicore architectures, or because some other attributes of preemptive computing are desirable for the distributed application represented by the codelet sets. Further, hints can be given to pre-emptive OS's to minimize preemption such as core affinity and process priority. In this way, the runspace of codelets can coexist with other legacy applications on current computer systems.

According to embodiments of the invention, rather than centralized control and allocation of resources, the system code, (itself implemented via codelet sets) merely initializes the platform for codelet sets to run by enabling the initial routines of a codelet set. According to the invention, application programs are decomposed into independent segments of code that can be executed with minimal system coordination.

System Utilization and Management Overview:

In embodiments of the invention, such as those studied in the following in greater detail, the runspace execution model pervades all levels of system utilization and monitoring. At a fine-grained level, the execution model provides a series of codelets and their respective dependencies. The fine-grained nature codelets allows the runtime system to allocate resources efficiently and dynamically while monitoring performance and power consumption and making or enabling schedule changes to meet the performance and power demands of the application.

Runspace system allocates available resources to a given application and provides an API to access off-chip resources such as disk, peripherals, other nodes' memory, etc. The domain of the application (i.e. the nodes that are useable by the application) is defined by the hypervisor. The fine-grained nature of codelets allows the runtime system to allocate resources efficiently and dynamically while monitoring performance and power consumption and making scheduling changes to meet the performance and power consumption goals of the application and system.

In a system 101 according to an embodiment of the invention, as illustrated in FIG. 1, there are five components used for system utilization and management in 101, an exemplary runspace architecture: (1) a traditional operating system (OS) for shared long-term file systems and to application launch, (2) a hypervisor to control system resource allocation at a coarse level, (3) a microOS to manage off-chip resources, (4) a runtime system to provide task synchronization and manage energy consumption and performance, and (5) a hardware abstraction layer to provide portability of the microOS and allow access to new peripherals. According to such embodiments, a Thread Virtual Machine (TVM) takes the place of a conventional OS to provide direct access to the hardware and fine grained synchronization between the codelets. TVM is not herein considered to be a separate component, but rather it is implemented by the runtime system and microOS.

FIG. 1 outlines the overall interactions between the components.

Hypervisor:

The hypervisor allocates global resources for the given application based on the user's parameters and optionally parameters specified in the application. This includes how many nodes should be used and, in certain embodiments, the connectedness of the nodes. The hypervisor sets the application domain and defines the microOS running on each node. Then the hypervisor loads the application specific parameters (such as command line arguments, environment variables, etc.) and instructs the runtime system to launch the application. The runtime system begins the user application by launching one or more codelets on cores starting at the main program start pointer. The user application can request more codelets to be spawned at runtime. Additionally, the user application interacts directly with the runtime system for task synchronization. All off-chip I/O is mediated by the microOS which serializes requests and responses for passage through serial conduits (such as disk I/O, Ethernet, node-to-node communication, etc). Additionally, the microOS facilitates the runtime system in communicating between nodes to other runtime system components. The hardware abstraction layer provides a common API for microOS portability to other platforms and for the discovery of new peripherals.

The next paragraphs outline the overall structure and functionality of the different components involved in system utilization and maintenance.

Thread Virtual Machine (TVM):

TVM provides a framework to divide work into small non-preemptive blocks called codelets and schedule them efficiently at runtime. TVM replaces the OS with a thin layer of system software able to interface directly with the hardware and generally shields the application programmer from the complexity of the architecture. Unlike a conventional OS, TVM is able to expose resources that are critical to achieve performance.

An embodiment of TVM is illustrated in FIG. 2. TVM abstracts any control flow, data dependencies, or synchronization conditions into a unified Data Acyclic Graph (DAG), which the runtime can break down into codelet mechanisms. On top of this DAG, TVM also superimposes an additional DAG that expresses the locality of the program using the concept of scope. In embodiments of the invention, codelets can access any variables or state built at a parent level (e.g., 201), but siblings (e.g., 202 and 203 or 204 and 205) cannot access each others' memory space. Using this scope, the compiler and runtime can determine the appropriate working set and available concurrency for a given graph, allowing the runtime to schedule resources to both the execution of codelets and the percolation of system state or scope variables using power optimizing models to set affinity and load balancing characteristics.

Unlike a conventional OS framework, the TVM maintains the fractally semantic structure and gives scheduling and percolating control to the runtime to optimally perform the task. And by following this fractal nature, the enabled programming model will be able to provide substantial information to the runtime system. Thus, unlike monolithic threads with an unpredictable and unsophisticated caching mechanism, the granularity and runtime overhead is managed as tightly as possible in both a static and dynamic nature to provide greater power efficiency.

Runtime System:

The runtime system is implemented in software as a user library and in hardware by a runtime system core to service a number of execution cores. In embodiments, this runtime system core can be different than the execution cores or can have special hardware to facilitate more efficient runtime operations. In embodiments, execution cores can execute the runtime system tasks and there may or may not be a dedicated core for runtime system task execution.

Configuring and executing a dynamic runtime system according to embodiments of the invention involve methods for optimally allocating data processing resources to data processing tasks. Such method involve, at compile time, analyzing potential code and data allocations, placements and migrations, and at run time, placing or migrating codelets or data to exercise opportunities presented by actual code and data allocations, as well as, in certain embodiments, making copies of at least some data from one locale to another in anticipation of migrating one or more codelets, and moving codelets to otherwise underutilized processors.

Embodiments of the invention involve a data processing system comprising of hardware and software that optimally locate a set of codelets in the system. Elements of such systems include a digital hardware or software based means for (i) exchanging information among a set of processing resources in the system regarding metrics relevant to optimal placement of the set of codelets among the processing resources, (ii) determining to which of the processing resources to locate one or more codelets among said set, and (iii) mapping the one or more codelets to one or more processing resources according to said determining. In various embodiments the mappings may involve data and/or codelet migrations that are triggered by sub-optimal data locality. In certain scenarios, volumes codelets and data are migrated, according to the cost of migration. In embodiments, migration cost drivers include one or more of the following: the amount of data or code to be migrated, the distance of migration, overhead of synchronization, memory bandwidth utilization and availability.

The runtime system can use compile-time annotations or annotations from current or previous executions that specify optimal efficiency environments for codelets. Related methods in embodiments of the invention involve compiling and running a computer program with a goal of seeking maximally resource-efficient program execution. Such methods, at a program compile-time, determine optimal efficiency execution environments for portions of program referred to as codelets, and accordingly, at a program run-time, locate codelets for execution at their optimal efficiency execution environments. Furthermore, in certain embodiments, the determining of optimal environments is done based on indications in program source code such as: (i) compiler directives, (ii) function calls, wherein a type of function called provides information regarding an optimal execution environment for said function, (iii) loop bodies that have certain characteristics such as stride, working set, floating point usage, wherein the optimal execution environment has been previously determined by systematic runs of similar loops on similar data processing platforms. The optimal efficiency execution environment for the execution of a given codelet can be defined by criteria such as: power consumption, processing hardware resource usage, completion time, shortest completion time for a given power consumption budget.

Internal Hardware/Software Runtime Stack:

In embodiments of the invention, such as the system 300 illustrated in FIG. 3, the runtime system core 301 is co-located with an event pool storage 302. In embodiments, the tasks of the runtime system can be operated on a dedicated runtime system core, or alternatively by execution cores. The event pool 302 contains fine-grain codelets to run, application and system goals (such as performance or power targets) and data availability events. The event pool 302 may be an actual shared data structure such as a list, or a distributed structure such as a system of callbacks to call when resource utilization changes (such as when a queue has free space, a processing element is available for work, or a mutex lock is available). The runtime system core 301 responds to events in the event pool 302. According to embodiments of the invention, there are five managers running on the runtime system core 301: (1) data percolation manager, (2) codelet scheduler, (3) codelet set migration manager, (4) load balancer and (5) runtime performance monitor/regulator. In certain embodiments, these managers work synergistically by operating in close proximity and sharing runtime state. The inputs, outputs, and interactions 401 of the managers running on the runtime system core 301 of one exemplary embodiment are depicted in FIG. 4. When it deems appropriate, the data percolation manager percolates data dependencies (i.e., prefetch input data, when available) and code dependencies (i.e., prefetch instruction cache). When all input dependencies are met, the codelet scheduler places the codelet in the work queue, in certain scenarios reordering the priority of the ready codelets in the queue. Execution cores repeatedly take tasks from the work queue and run them to completion. In the process of running a codelet, an execution core may create codelets or threads and place them in the event pool. The runtime performance monitor/regulator monitors power and performance of the execution cores and can make adjustments to decrease power (e.g., scale down frequency and/or voltage of cores, turn off cores, or migrate some or all work from the work queues to other domains of computation on the chip and turn off cores) or increase performance (e.g., scale up frequency and/or voltage, turn on cores, recruit more work from other computational domains or turn on different computational domains and join them to the application). The load balancer analyzes the work queue and event pool and determines if work should be done locally (i.e., in this computational domain) or migrated elsewhere. The codelet migration manager works with other runtime system cores on the node and on remote nodes to find an optimal destination for a set of codelets and migrates them appropriately. Codelet migration may also be triggered by poor data locality: if many codelets in a codelet set request data located on another node, it may be better to relocate the code than to relocate the data.

These managers also communicate together in a synergistic manner to attain goals that have mutual interest e.g. a minimum completion time for given power consumption budget, etc. For example, if the performance manager wants to throttle power down and the load balancer wants to migrate more work locally, having the two managers collocated on an RTS core means they can communicate the best course of action for both their goals simultaneously and make quick, decisive actions. Thus, these subsystems provide a control architecture that builds an internal model of performance and attains set points based on the Generalized Actor (GACT) goals. An objective of the system is to provide the highest performance for the least power consumption in an energy-proportional manner bounded by the GACT constraints. In embodiments of the invention, these functions rely on the runtime system cores to asynchronously communicate with a master runtime system core by sending load and power indicators and receiving goal targets. The master runtime system core's job is to monitor the overall performance/power profile of a given application on the chip and tune the performance (which may include frequency, voltage, and on/off state of individual cores) of each computational domain appropriately.

The master runtime system core of each node allocated to an application asynchronously communicates with the master runtime system core of a so-called head node for the application and exchanges performance metrics and goal targets such as time to completion, power consumption, and maximum resource constraints (e.g., memory space, nodes, network links, etc). The hierarchical and fractal regulation structure of the runtime system hardware reflects the hierarchical nature of the execution model. Collectively, the master runtime system cores of the nodes running an application perform hypervisor tasks as described later in the hypervisor section. Runtime systems communicate with each other and provide feedback (e.g. the local runtime core determines that workload is low, tells the master runtime core, and receives more work) such that the system as a whole is self-aware.

In an embodiment of a self-aware operating system, a fractal hierarchical network of monitoring domains achieves regulation of a data processing system. For example, in a basic cluster, domains may be: cluster, node, socket, core, hardware thread. A process (which may be the scheduler) at each leaf domain monitors the health of the hardware and the application (e.g. power consumption, load, progress of program completion, etc). Monitors at higher levels in the hierarchy aggregate the information from their child domains (and may optionally add information at their domain—or require that all monitoring is done by children) and pass information up to their parents. When a component of the hardware fails, it is reported up the chain. Any level in the hierarchy can choose to restart codelets that ran on the failed hardware or passed up the chain. Once a level chooses to restart the codelets, it can delegate the task down to its children for execution. Enabled codelets can also be migrated in this way. If a level finds that its queues are getting too full or is consuming too much power, it can migrate enabled codelets in the same way as described above. Finally, if a level finds that it has too little work, it can request work from its parent and this request can go up the chain until a suitable donor can be found.

Runtime System User API:

Codelets can create additional codelets by calling runtime library calls to define data dependencies, arguments, and program counters of additional codelets. Synchronization can be achieved through data dependence or control dependence. For example, a barrier is implemented by spawning codelets that depend on a variable's equality with the number of actors participating in the barrier (see FIG. 5). Each of the participating codelets atomically adds one to the barrier variable. Mutexes can be implemented in a similar manner: a codelet with a critical section uses a mutex lock acquisition as a data dependence and releases the lock when complete. However, if the critical section is short, in certain scenarios (in the absence of deadlock and when the lock is in spatially local memory) it may be more productive for the core to just wait for the lock. Finally, atomic operations in memory (managed by the local memory controller) allow many types of implicit non-blocking synchronizations such as compare and swap for queue entry and atomic add for increment/decrement.

Micro OS:

Micro OS provides off-node resources and security at the node boundary. In an embodiment of the invention, the micro OS has two components: (1) special codelets that run on execution cores; and (2) library functions that user codelets call via system calls (syscalls). The special codelets are used for event-based, interrupt-driven execution or asynchronous polling of serial devices and placement of the data into queues. Typical devices include Ethernet, ports of the switch connecting this node to other nodes, and other sources of unsolicited input (possibly asynchronous responses from disk-I/O). Additionally, a codelet may be reserved for timing events such as retransmit operations on reliable communication protocols such as TCP/IP. These codelets analyze the sender and receiver to ensure that the specific sources belonging to the application that owns the node are allowed to access resources on the node or resources dedicated to the application (such as scratch space on the disk). Accesses to shared resources (such as the global file system) are authenticated through means such as user, group, role, or capability access levels.

Library functions allow the user application to access hardware directly without intervention or extra scheduling. Some of these functions can be implemented directly in hardware (e.g., LAN, node-to-node, or disk writes). Others use lower level support for directly sending and receiving data via buffers from asynchronous input polling threads, such as requesting disk access from another node. The library calls direct the user to access data allocated to its application. The user or the system library can specify whether to block waiting for a response (e.g. we know it's coming back soon) or schedule a codelet to run with a data dependence on the result.

The library functions are designed to be energy-efficient and hide latency by being tightly coupled with the runtime system. For example, a codelet that calls a file-system read would make the file-system request, create a codelet to process the response that has a data dependency on the file system response, and exit. This allows the execution core to work on other codelets while the data is in transit (instead of sitting in an I/O wait state). If there is not enough concurrency, the runtime system can turn off cores or tune down the frequency of cores to allow for slower computation in the face of long latency read operations.

Embodiments of the invention provide security in two modes: high performance computing (HPC) mode where entire nodes are owned by one application, and non-HPC mode where multiple applications can co-exist on one node. In HPC mode, it is generally sufficient that security is performed at the node boundary (i.e., on-chip accesses are not checked except for kernel/user memory spaces and read-only memory). It is also sufficient for user applications to know the logical mapping of nodes in their application (i.e. node 0 through N–1, where N is the number of nodes in the application). The microOS knows the physical mapping of node IDs to the logical node IDs and re-writes the addresses as appropriate. Also, when the microOS obtains input from outside the node boundary, it verifies that the data is for that node. Thus, on-chip security encompasses protecting the kernel code from the user code and protecting the user's read-only memory from writing. In non-HPC mode, the microOS allows the node to communicate with outside peripherals but generally not with other nodes. Input is validated in the same way. Further security is performed by the hardware as configured by the hypervisor as described in the hypervisor section. Security can be performed at a coarse grain application level, or at a fine grain codelet level. At the codelet level, because the data dependencies and the size of the data blocks are known at runtime, the security can be guaranteed by hardware by using guarded pointers (like those used on the M-machine) or by software using invalid pages or canaries (used in ProPolice or StackGuard) around data objects.

Hypervisor:

The hypervisor is in charge of allocating resources to a user application. In embodiments of the invention, it physically resides on all nodes and partially on the host system. One or more codelet sets on each chip are made available to hypervisor functions. They reside in runtime system cores and execution cores and generally follow the same fine-grained execution model as the rest of the system. Embodiments of the hypervisor on the host-software maintain a state of all resources allocated to all applications in the system. When launching an application, the Generalized Actor (GACT) can specify a set of execution environment variables such as the number of nodes and power and performance targets. The hypervisor places the application in the system and allocates resources such that the nodes within the application space are contiguous and preferably match the GACT's application request. Once a set of nodes are allocated, the host hypervisor communicates to the hypervisor instance on each of the nodes to allocate the nodes, pass the application code image and user environment (including power and performance targets if any), and signal the runtime system to start the application. The hypervisor notifies the microOS and runtime system of the resources allocated to the application. Then the hypervisor instance on the nodes monitors the application performance and works with both the other hypervisor instances on other nodes allocated to the application and the runtime system cores to achieve the power/performance targets by managing the relationship of power, performance, security, and resiliency to maintain an energy proportional runtime power budget (see FIG. 6 for hierarchy 601 of overall system, hypervisor, and runtime system interactions). The micro OS threads and library provide security of the application data and environment on all nodes allocated to the application.

In non-HPC mode where multiple applications can coexist on one node, the hypervisor creates computational domains from sets of cores. RAM is segmented for each application and user applications cannot write into each other's' DRAM or on-chip SRAM. This can be accomplished with a basic Memory Management Unit (MMU) for power efficiency or a generalized virtual memory manager (VMM) on legacy machines. The hypervisor determines the address prefix and size of each segment during the application boot phase, and the application addresses can be rewritten on the fly by the MMU. Generally, the addresses that map to the application's memory space can be accessed in this manner.

Hardware Abstraction Layer:

The hardware abstraction layer (HAL) allows the micro OS and user application to query the hardware device availability and interact with hardware in a uniform way. Devices can be execution cores, disks, network interfaces, other nodes, etc. Much of the system can be accessed by the user application via file descriptors. Micro OS library function calls such as open, read, write, and close provide a basic hardware abstraction layer for the application. A driver interacts with the HAL with a series of memory reads and writes. The HAL implementation translates these requests into the bus transactions relevant to the hardware platform. This allows users to reuse driver code on different underlying platforms.

Additionally an application can query the hardware or runtime system for the number of nodes available to the application, number of execution cores in a chip and memory availability to help decide how to partition the problem. For example, if one thousand cores exist, the application can divide a loop of one million iterations into one thousand iteration codelets, whereas if there are only four cores, it could divide the work into courser grained blocks because there is no more concurrency to be gained from the hardware and the overhead of fewer codelets is lower. In various embodiments, the optimal size of blocks can be, for instance, (1) a rounded integer quotient of the maximum number of units of work that could be done in parallel divided by the quantity of processing elements available to the application, (2) a varying size between blocks such that the maximal difference between the smallest and largest block size is minimized or (3) a maximum size that allows completing the segment of the application in provided time budget while staying within a provided power consumption budget.

Self-Optimizing Operating System:

The operating system services are performed by the micro OS and the runtime system and regulated through the hypervisor. Together, these components make up the exemplary self-aware operating system 701, as illustrated in an embodiment shown in FIG. 7. The self-optimizing nature of the runtime system is realized by (1) the self-aware features of the execution systems; (2) the self-aware features of the OS; and (3) the interactions between (1) and (2). As illustrated in FIG. 7, the OS, hypervisor, runtime system, and execution units communicate with each other and their neighboring levels to provide a feedback observe-decide-control loop.

In this section an embodiment of a self-optimizing system model 701 is described.

(1) The self-optimizing loop embedded in the execution systems: An embodiment of the execution model features two types of codelets: asynchronous tasks and dataflow codelets. In both types, the invoking of corresponding codelet activities is event-driven. At least in the case of asynchronous tasks, invocation of codelets may additionally depend on computation load, energy consumption, error rate, or other conditions on a particular physical domain to which the tasks may be allocated. Self optimization can also be applied to performance-aware monitoring and adaptation.

(2) The self-optimizing loop embedded in the operating system: The self-optimizing OS observes itself, reflects on its behavior, and adapts. It is goal-oriented; ideally, it is sufficient for the system's client to specify a goal, and it is the system's job to figure out how to achieve the goal. To support such self-optimizing functionality, the OS observer-agents (i.e. the runtime system cores and hypervisors) are in embodiments equipped with a performance monitoring facility that can be programmed to observe all aspects of program execution and system resource utilization, and an energy efficiency monitoring facility that can observe system power assumption at the requests of the OS at different time intervals or specific locations/domains.

In embodiments, the OS decision-agent (the code running on the runtime system cores) is equipped with appropriate model builders and learning capabilities so it can take timely and effective actions for self-correction and adaptation to meet the goals. In some embodiments the OS self-optimizing loop may invoke control theory methods to achieve its objectives. Interactions between (1) and (2) are illustrated in FIG. 7: the control loop in OS and control loops in each execution systems are connected. The OS control loops can make inquiries to the execution systems regarding their running status, resource usage, energy efficiency and error states, in order to make informed decisions for performing system level global control and adjustments. At the same time, each individual execution system can ask the OS for help to resolve the problems in its own control that can be more optimally resolved with help at the OS level.

To effectively use the runspace systems and methods, application developers can provide directives, which the system notes at compile time, and which result in better initial static allocation, better runtime (dynamic) allocation or both. FIG. 8 shows an explicit language element (801) in the C language, wherein the application programmer alerts the system to a "resource-stall" that might indicate that the code can be migrated to very a low-power, slow, execution unit. Reference 802 shows an implicit directive: a special API call that uses a low-fidelity floating point calculation. Such calculations can be carried out inexpensively on floating point processing units with very few mantissa bits, allowing for greater specialization, and thus better matching of capability to demands, within the computing domains of the system. These are some examples of user-specified directives that the runtime can use to make dynamic decisions. In addition, applications can be profiled and annotated with directives so that the runtime can make better dynamic decisions in subsequent runs based on the hints provided by the annotations.

An exemplary micro-memory management unit is illustrated in FIG. 9. Ref 901 is a processing unit, with local code execution and four local physical memory blocks. Ref 902 and 903 are two memory blocks owned by the same controlling task, owner X, and accessible to codelets associated with that task. 902 has logical address 00 and physical address 00, while 903 has physical address 10, and logical address L01. Ref 904 shows how a memory access beyond L01 would appear to codelets owned by X. That is, any local logical address beyond L02 appears as an error to codelets owned by X. Ref 905 shows a memory segment residing at physical location 01, which appears logically to codelets owned by Y as L00. All other local physical memory is inaccessible to Y codelets. Ref 906 shows a memory segment residing at physical location 11, which appears logically to codelets owned by Z as L00. All other local physical memory is inaccessible to Z codelets.

FIG. 10 illustrates a simple use case involving the runspace system, wherein a generalized agent 1001 indicates tasks (typically by compiling source code), launches an application 1003, and obtains results 1004. Concurrently, another GACT, 1005 performs monitoring and system maintenance 1006. In a typical environment, the runspace system is available via Local Area Network (LAN) and/or Wide Area Network (WAN) 1007 and proceeds by interaction with a conventional front end server 1008, which communicates with a High End Computer (HEC) 1009.

FIG. 11 illustrates an example of code and data locality observed in runspace, with allocation of codelets and data over time. Additional attributes of runspace can include peripheral resource demands or allocation, processor operating envelope and constraints, task urgency or deferability, etc. The runspace system uses a metric space distance model to initially allocate code and data to appropriate local processing elements, and can migrate code and data dynamically, as it is deemed beneficial to optimize system performance with reference to the current goals. The system can use both policy-driven optimization techniques for dynamic allocation and exhaustive optimization approaches at compile time. Additionally, the system can learn from past performance data to improve future allocation of particular codelets, subroutines, tasks, and applications.

Cross-cutting Interactions:

Execution model: The runtime system and microOS manage, migrate, and spawn codelets. They choose the codelet versions to run according to the runtime goals. As described above, the runtime system core manages the data dependencies between codelets, migrating data and codelets together and spawning the correct codelet version based on runtime constraints.

Dependability is a combination of security and resilience. Security aspects of the invention, according embodiments, involve providing security markings for codelets, with marking indicates restrictions or privileges to be considered in allocations of codelets in question and their related data. Accesses of memory outside of the data bounds or prescribed privileges will throw a security exception to be handled by the runtime system. In HPC mode, a node is completely owned by an application. Security is provided at the core level by the user/kernel space memory and instruction set enforcement. Security is provided at the application level by both the host system, which defines the set of nodes on which the application runs, and the hypervisor, which relays that information to the microOS running on the allocated nodes. Security is provided at the system level by the job manager on the host system, which schedules and allocates nodes to applications in a mutually exclusive manner. In non-HPC mode, the system is further subdivided into mutually exclusive chip domains and memory segments, and memory and resources are mapped in such a way as to prevent applications from accessing each other's data on the same chip.

Resilience is maintained by fractally monitoring the health of the system and re-executing codelets that fail. The local runtime core in a computational domain monitors the execution core health. A node-level runtime core monitors the runtime cores. The node-level runtime core is monitored by the host system. When a component fails, the codelets running on the core are either restarted (if they created no state change in the program) or the application is restarted from a checkpoint (if the state of the program is non-determinant).

The efficiency goal seeks to maximize performance and to minimize power consumption given a set of application and system goals. This is achieved through frequency and voltage scaling at the execution core level based on the dependencies of the codes and the availability of work. Also, codelets and data are migrated to where they can most effectively communicate with each other (e.g. by keeping more tightly interacting codelets together) and consume the least amount of power (e.g., moving codelets together to allow for power domain shutdown of unused clusters and eliminate idle power consumption).

Self-optimizing: Self-optimization is maintained through the fractal monitoring network (of both health and performance) and runtime system rescheduling to achieve the goals of the application and system while maintaining dependability and efficiency.

Description of Embodiments:

Operating examples and application scenarios of embodiments of the invention are described in the following with further references to the drawings.

FIG. 12 illustrates a computing system using codelet sets. Significant representative steps include: 1201 providing codelet set representation system on a GCS; 1202 obtaining codelet set representation from GACT; 1203 translating codelet sets to executable or interpretable instructions and dependency representation; 1204 using directives for meta-level distribution and allocation of codelet sets on a GCS; 1205 performing dynamic concrete distribution and migration of executable instances of codelet sets; 1206 executing codelet sets, and 1207 enabling new codelet sets, at least in part based on dependencies.

FIG. 13 shows a codelet set representation system, including the steps of: 1301 providing a specification system for designating codelet sets; 1302 providing a mechanism for GACTs to construct and modify codelet sets and to obtain initial analyses of codelet sets; 1303 providing a mechanism for GACTs to execute codelet sets on actual or simulated resources; 1304 providing a mechanism for GACTs to monitor running codelet sets or to view historical traces of codelet sets; 1305 providing a mechanism for GACTs to dynamically manipulate codelet sets; and 1306 providing a mechanism for GACTs to profile codelet set performance and resource utilization.

FIG. 14 shows an example of translation of codelet sets, including steps: 1401 extracting codelet set descriptors from representation; 1402 translating executable instructions; 1403 applying resource-invariant optimizations; 1404 constructing, grouping and distributing directives to guide runtime allocation, distribution and migration; 1405 applying resource specific optimizations; and 1406 producing executable text, and enabling initial codelets.

FIG. 15 shows an example of meta-level codelet set distribution, and includes the steps of: 1501 using directives to initially allocate codelet sets to computing and data resources; 1502 monitoring concrete level codelet set execution and resource utilization; 1503 collecting opportunities for modified codelet set distribution; 1504 constructing directives for improved initial (compile-time) codelet set distribution; and 1505 providing resource information and arbitration to support dynamic (run-time) migration of codelet sets.

FIG. 16 shows codelet set execution and migration, and includes steps of: 1601 using codelet set distribution instructions to distribute text of codelet sets to commuting resources or to simulated computing resources; 1602 providing mapping between executing text of codelet sets and the distribution directives; 1603 arranging for codelet sets to return resources and results to system upon completion; 1604 monitoring resource utilization and enabled codelet queue load; using codelet signals to obtain or communicate status information, or to monitor the codelet system; 1606 monitoring to identify and commit resources or cascades requests up to higher level monitor; and 1607 removing codelet sets from the enabled queue and migrating them, along with data, where appropriate.

FIG. 17 illustrates double-ended queue concurrent access mechanisms: 1702 write and 1703 enqueue. Other states of the queue are 1701 empty and 1704 housekeeping.

FIG. 18 shows dequeue concurrent access mechanisms this time performing 1801 a consistency chenk 1802 an empty queue 1803 a non-empty queue and 1804 a read and dequeue. Note that one strength of such systems is that the processes using the system have an integral feature of taking care of housecleaning tasks, so the queue is very robust.

FIG. 19 illustrates concurrent access via atomic addition array (A): write. States depicted consist of 1901 inital state and 1902 atomically updated write pointer.

FIG. 20 illustrates concurrent access via atomic addition array (B): write. States depicted consist of 2001 data written and 2002 flag updated and data visible to readers.

FIG. 21 illustrates concurrent access via atomic addition array (C): read. States depicted consist of 2101 data ready to be read and read pointer updated and 2102 read started and 2103 read complete and flag updated.

FIG. 22 illustrates linked list, specifically atomic addition arrays (A).

FIG. 23 illustrates linked list, specifically atomic addition arrays (B).

FIG. 24 illustrates linked list, specifically atomic addition arrays (C).

FIG. 25 illustrates linked list, specifically atomic addition arrays (D).

FIG. 26 illustrates linked list, specifically atomic addition arrays (E).

FIG. 27 illustrates concurrent access via shared array with turns.

FIG. 28 illustrates a combining network distributed increment.

FIG. 29 illustrates monotasks and polytasks performing concurrent access via an atomic addition array (A).

FIG. 30 illustrates monotasks and polytasks performing concurrent access via an atomic addition array (B).

FIG. 31 illustrates monotasks and polytasks performing concurrent access via an atomic addition array (C).

FIG. 32 illustrates monotasks and polytasks performing concurrent access via an atomic addition array (D).

FIG. 33 illustrates monotasks and polytasks performing concurrent access via an atomic addition array (E).

FIG. 34 illustrates a codelet set computing system scenario, showing the roles of different users with respect to the system.

FIG. 35 illustrates a generic exemplary architecture at the microchip level. Note that the memory levels are non-specific and are intended to convey the hierarchy of local memory (with fast access) versus non-local memory. For instance, L1 could be implemented as register files, SRAM, etc.

FIG. 36 illustrates a generic architecture at the board/system level; again portraying ranges of performance and globality.

FIG. 37 illustrates designation of codelets and codelet sets. There are many equivalent ways to specify codelet sets. Specifications typically may be signaled by the use of special meta-language, by native language constructs, or even by non-executable annotations, or selections made via integrated development environments. Codelet sets are compose-able, and can be defined to fire other codelets or codelet sets. GACTs build functionality by constructing codelet sets out of basic codelets and then by combining sets into large sets encompassing entire applications. Function setDependency allows for expression of a dependency between two elements of a codelet set or two elements of different codelet sets. In one embodiment, function implementSet is called at runtime to build the dependence graphs and translate them into pointers. Also, in an embodiment, a compiler is modified to generate dependency information from the code, even when such dependency information is not provided by the GACT.

FIG. 38 illustrates double buffer computation (A). Note that every codelet set has an init and clean procedures to start the system and clean up and fire exit dependencies. In some embodiments, the init and clean tasks may be optimized away statically at compile time or dynamically at runtime. The runtime system is isomorphic when a represented as a Petri net, which is a graph of places and transitions. Places extend dataflow models and allow representation of data dependencies, control flow dependencies, and resource dependencies. In one embodiment, the system executes higher priority tasks first and then moves on to lower priorities. This allows certain system-critical codelets to be scheduled, such as tasks that maintain concurrent resource access for the system. If all of the execution cores worked on Comp1 and then Comp2, suddenly there is no work for most of the cores until copy1 and copy2 are finished. Therefore, codelets that produce more codelets are given higher priority so that the run queue is never empty. In the following illustrations, once the system is started, it will continuously have at least some compute codelets to execute because the copy codelets have high priority when they become available.

Additionally, in the double buffer computation example, the example index 1024 bound indicates that when Init is finished, it enables 1024 Comp1 codelets. Similarly, the example index bound 8 copy codelets are fired in the copy codelet set. Note that the count of 8 is used because the system may have many processors demanding DRAM bandwidth to be arbitrated among them. Therefore, the codelet system can use fewer execution cores to achieve the same sustained bandwidth, although lower (context switching) overhead, thus achieving improved application program processing throughput. In another embodiment, the system can dynamically supply a place going into copy1 and returning from copy1 with 8 tokens in it all of the time. Similarly, the same optimization can be done for copy2. Finally, in another embodiment, these two places can be fused into the same place and the copy functions could use same pool of DRAM bandwidth tokens. In such a case, if the compute is longer than the copy, the system can assure that copy1 and copy2 will not occur at the same time. This is an example of the expressive power of the petri net for resource constraints such as memory bandwidth, execution units, power, network, locks, etc., and demonstrates that codelet sets can exploit that expressive power to enable the construction of highly parallel, highly scalable applications. Note that in 2702, deltaT is implicit in the fact that SignalSet (buffer_set[0]) is executed before SignalSet(buffer_set[1]).

FIG. 39 illustrates double buffer computation (B). In 3901, Init Set 1 is signaled, while in 3902, Init set 2 is signaled, and computation of the example number of 1024 codelets begins.

FIG. 40 illustrates double buffer computation (C). In 4001, task Comp2 is in the queue, but the execution cores will continue to work on Comp1, as the system is operating in first-come-first-served mode, except for priority differences. In 4002, Comp1 finishes, and a high-priority task of "clean" is placed. Comp2 can now continue. In other embodiments, work can be consumed in ways other than first-in-first-out, such as last-in-first-out to give stack-like semantics. This embodiment is useful for work sharing in recursive applications.

FIG. 41 illustrates double Buffer computation (D). In 4101, Comp2 can continue, but at least one execution unit is used for the high-priority task of copy(8). In 4102, Comp2 is still continuing, but even more execution units have been allocated for copy function. The system cleans resources after the copy.

FIG. 42 illustrates double buffer computation (E). In 4201 the system will check to see if done flag is in buffer 1. In 4202, the Comp1 codelet is initialized.

FIG. 43 illustrates double buffer computation (F). In 4301, the Comp1 codelets are queued behind the existing Comp2 codelets. In 4302, Comp2 completes, while Comp1 continues.

FIG. 44 illustrates double buffer computation (G). Finally, in 4401, a high priority codelet of copy set 2 is initialized, while Comp1 continues. Note that codelets can receive signals at any time—even during their execution. This enables migration of code and data to better exploit the computational resources. To summarize, some of the notable aspects may includes: (a) priorities; (b) balancing concurrency with queue space; and (c) extensions beyond dataflow, which may include, e.g., early signals, event flow, and/or enabling a programmer to influence the schedule.

FIG. 45 illustrates matrix multiply with SRAM and DRAM. In 4501, the system is copying blocks of both matrices A and B from DRAM to SRAM, and computing matrix C in SRAM. In 4502, each block of C is copied back to the appropriate place in DRAM.

FIG. 46 illustrates matrix multiply double buffer/DRAM. In this case, codelets are used to double buffer the DRAM access to reduce the latency of accesses; this is illustrated in the portions of code 4602 shown in brackets.

FIG. 47 illustrates an example in computing LINPACK DTRSM (double triangular right solve multiple). 4701 shows the initial dependencies. As soon as the first row and column are done matrix multiply, the system can move on to the next set of data.

FIG. 48 illustrates runtime initialization of a codelet set for DTRSM. Note that Init( ) is called with a parameter that indicates how many codelets will be generated. 4802 shows some optimizations that can be performed on the codelet-set implementation of DTRSM.

FIG. 49 illustrates a Quicksort example. In 4901, the control flow paths are data dependent. The dependencies can be conditionally set based on codelet output, or intermediate state, if the dependencies are resolved/satisfied early. 4902 illustrates a Petri net representation for the quicksort graph. Given this representation, the threads will work on the top half until there is no more input data for the swap codelet (either because there is no more data or because all of the dirty data is on one side). When the execution unit has no more high-priority codelets, it takes low-priority codelets, e.g., waiting at the barrier. At this point, the "move" codelets fire and move the pivot to the correct position.

FIG. 50 illustrates scalable system functions interspersed with application codelet sets. Because system functionality can be fluidly integrated with codelet set applications, system designers gain great flexibility in balancing system overhead versus system services. For some uses and applications, the system software may be nearly absent, while in other cases, extensive monitoring and debugging may cause more system tasks than application tasks to run at a given time.

FIG. 51 illustrates conversion of existing program code to polytasks, showing how poly task input-output tables can be used to develop concurrent evaluation of codes via codeletsets. The priorities are constructed so that sequential tasks, which are necessary to enable one or more subsequent concurrent tasks, have a high priority. The mapping between particular elements of the sets of input variables to output variables allows recipient functions to start processing as soon as the first instances become available. Counts of the numbers of separable instances in the codeletsets allow the system software to distribute codelet executions both to allow high CPU utilization, and to exploit locality of data.

FIG. 52, showing a case of "black-box" code running with polytask code, illustrates a scenario 5201 in which the library codes have been converted to codeletsets, but a black-box user code 5202 is still inherently sequential. In alternative embodiments, priorities can be conservative, assuming that all blackbox values are needed for subsequent processing, or statistical, based on performance evaluation from previous runs, or previous cycles of the same run, or both.

Figure 53:
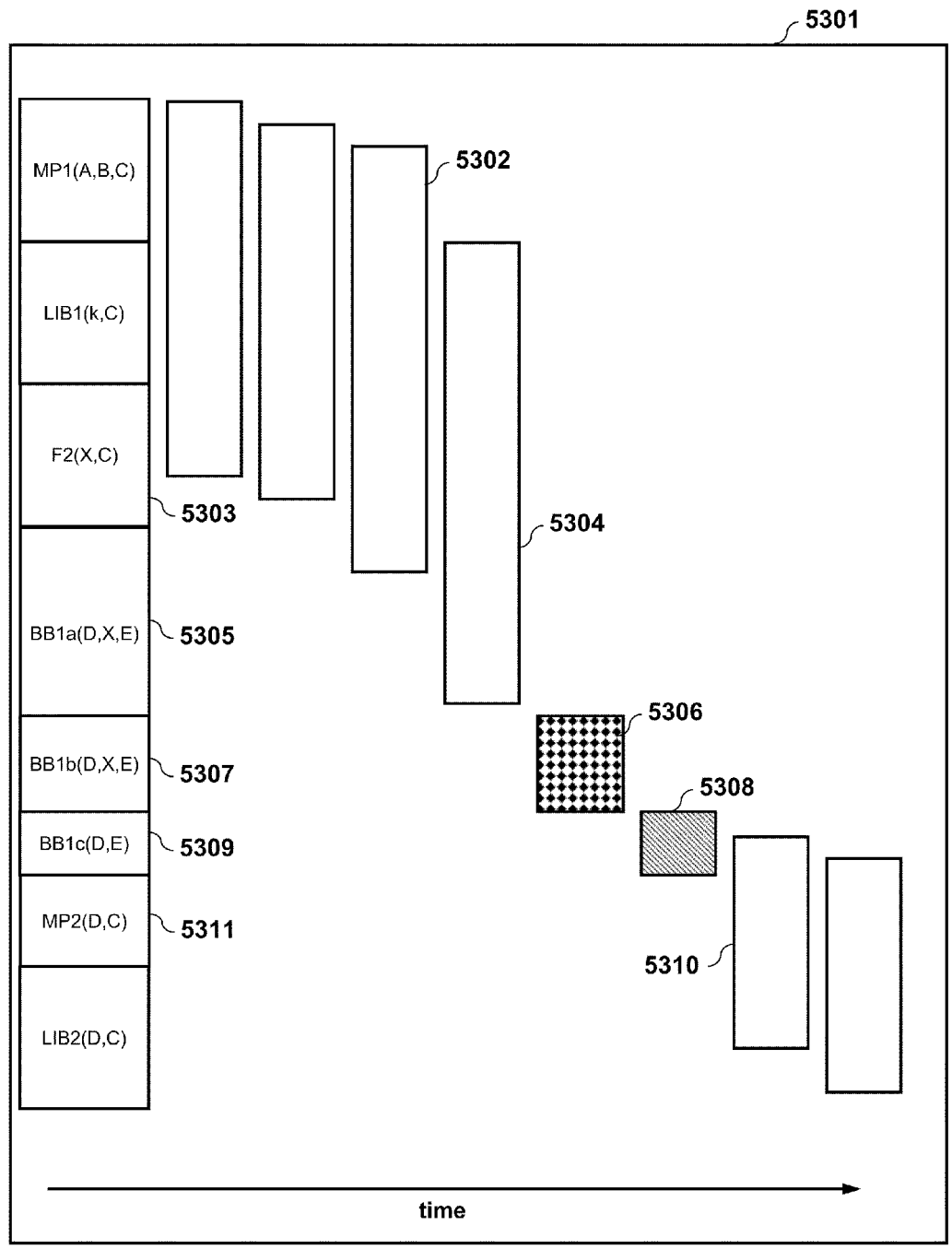
FIG. 53 illustrates improved blackbox code running with polytask code.

FIG. 53 illustrates an improved blackbox code running with polytask code. In this case, portions of the black-box code have been marked by the user, so that it becomes available for concurrent execution. The polytask preceding the original black-box task, 5302 corresponds to function F2, 5303. The initial section of the black box task, 5304, corresponds to refactor function BB1a, and has been converted to run currently, using results from 5302 as they become available. The next section of black-box function is inherently sequential, and remains a blackbox that is to complete before subsequent operations. Note that in an embodiment, speculative execution of subsequent functions can be performed, providing a way to gain concurrency even during the execution of 5306. Ref. 5308 is a third part of the refactored black-box function, corresponding with function BB1c, and permits concurrent execution of library call 5310 corresponding to MP2 5311.

Further Comments:

Various embodiments of the invention may address optimization of performance of an application program with respect to some performance measure(s) or with respect to some resource constraint(s). Exemplary performance measures or constraints may relate to, but are not limited to, a total runtime of the program, a runtime of the program within a particular section, a maximum delay before an execution of particular instruction, a quantity of processing units used, a quantity of memory used, a usage of register files, a usage of cache memory, a usage of level 1 cache, a usage of level 2 cache, a usage of level 3 cache, a usage of level N cache wherein N is a positive number, a usage of static RAM memory, a usage of dynamic RAM memory, a usage of global memory, a usage of virtual memory, a quantity processors available for uses other than executing the program, a quantify of memory available for uses other than executing the program, energy consumption, a peak energy consumption, a longevity cost to a computing system, a volume of register updates needed, a volume memory clearing needed, an efficacy of security enforcement and a cost of security enforcement.

CONCLUSIONS

This detailed description provides a specification of embodiments of the invention for illustrative system operation scenarios and application examples discussed in the preceding. Specific application, architectural and logic implementation examples are provided in this and the referenced patent applications for the purpose of illustrating possible implementation examples of the invented concepts, as well as related invention utilization scenarios. Naturally, there are multiple alternative ways to implement or utilize, in whole or in part, the principles of the invention as set forth in the aforementioned. For instance, elements or process steps described or shown herein as distinct can in various embodiments be combined with each other or with additional elements or steps. Described elements can also be further subdivided, without departing from the spirit and scope of the invention. Moreover, aspects of the invention may in various embodiments be implemented using application and system software, general and specialized micro-processors, custom hardware logic, and various combinations thereof. Generally, those skilled in the art will be able to develop different versions and various modifications of the described embodiments, which, even if not each explicitly described herein individually, rely on the principles of the invention, and are thus included within its spirit and scope. It is thus intended that the specification and drawings be considered not in a restrictive sense, but as exemplary only, with the true scope of the invention indicated by the following claims.

What is claimed is:

1. A method of executing one or more programs on a dataflow processing system, the method comprising:
    a) obtaining a group of codelets configured to accomplish at least one task of a program, wherein the respective codelets are blocks of instructions arranged to execute non-preemptively to completion, once respective input conditions, including availability of all required inputs and any other requirements for execution, of the respective codelets are satisfied;
b) awaiting completion of data percolation in the dataflow processing system, which occurs when data, code or both involved in codelet execution reside locally with respect to the codelet;
c) verifying, after data percolation, that the input conditions for a given codelet are met, and placing the given codelet in an event pool, to indicate that the given codelet is enabled for execution; and
d) scheduling, from the event pool, the given codelet for execution on a set of data processing system resources of the dataflow processing system.

2. The method of claim 1, further comprising:
dynamically mapping a given codelet within the group of codelets to a set of data processing system resources for execution of the given codelet, based at least in part on dependencies among the codelets and on an availability of data processing system resources.

3. The method of claim 2, wherein the dynamically mapping comprises at least one function selected from a group consisting of: placing, locating, re-locating, moving and migrating.

4. The method of claim 2, wherein the mapping comprises at least one function selected from a group consisting of: determining a start time for execution of the given codelet, and determining a place for the execution of the given codelet.

5. The method of claim 2, wherein the mapping comprises performing mapping based on at least one criterion selected from a group consisting of: 1) improving a performance metric of an application program, 2) improving utilization of the data processing system resources, and 3) maximizing a performance metric of an application program while complying with a given set of resource consumption targets.

6. The method of claim 2, wherein the mapping is performed in order to optimize a performance of the program with respect to at least one measure selected from a group consisting of:
a total runtime of the program, a runtime of the program within a particular section, a maximum delay before an execution of particular instruction, a quantity of processing units used, a quantity of memory used, a usage of register files, a usage of cache memory, a usage of level 1 cache, a usage of level 2 cache, a usage of level 3 cache, a usage of level N cache wherein N is a positive number, a usage of static RAM memory, a usage of dynamic RAM memory, a usage of global memory, a usage of virtual memory, a quantity processors available for uses other than executing the program, a quantity of memory available for uses other than executing the program, energy consumption, a peak energy consumption, a longevity cost to a computing system, a volume of register updates needed, a volume of memory clearing needed, an efficacy of security enforcement and a cost of security enforcement.

7. The method of claim 2, wherein the mapping is performed in order to operate within a resource constraint that is selected from the group consisting of:
a total runtime of the program, a runtime of the program within a particular section, a maximum delay before an execution of particular instruction, a quantity of processing units used, a quantity of memory used, a usage of register files, a usage of cache memory, a usage of level 1 cache, a usage of level 2 cache, a usage of level 3 cache, a usage of level N cache wherein N is a positive number, a usage of static RAM memory, a usage of dynamic RAM memory, a usage of global memory, a usage of virtual memory, a quantity processors available for uses other than executing the program, a quantity of memory available for uses other than executing the program, energy consumption, a peak energy consumption, a longevity cost to a computing system, a volume of register updates needed, a volume of memory clearing needed, an efficacy of security enforcement and a cost of security enforcement.

8. The method of claim 2, wherein the mapping is performed in order to pursue a time-variable mixture of goals, wherein said mixture changes over time due to a factor selected from the group consisting of: pre-specified change and dynamically emerging changes.

9. The method of claim 2, further comprising applying a set of compile-time directives, to aid in carrying out one or more of the obtaining or the dynamically mapping.

10. The method of claim 9, wherein the compile-time directives are selected from the group consisting of: a floating point unit desired, a floating point accuracy desired, a frequency of access, a locality of access, a stalled access, a read-only data type, an initially read-only data type, a finally read-only data type, and a conditionally read-only data type.

11. A dataflow processing system including multiple run-time system cores, a respective run-time system core comprising:
a set of multiple system management agents, said set including: a data percolation manager, a codelet scheduler, a codelet migration manager, a load balancer, a thread scheduler, and a power regulator or a performance manager, wherein a respective codelet is a block of instructions arranged to execute non-preemptively to completion, once respective input conditions, including availability of all required inputs and any other requirements for execution, of the respective codelets are satisfied, wherein the set of system management agents are configured to interact in a synergistic manner to optimize program execution in the multiple cores,
wherein the data percolation manager is configured to percolate data, code or both to reside locally with respect to a codelet,
wherein the codelet scheduler is configured to verify, once the data percolation manager has completed data percolation, that the input conditions for a given codelet are met, and to place the given codelet in an event pool, to indicate that the given codelet is enabled for execution, and
wherein the thread scheduler is configured to take enabled codelets from the event pool and place them in one or more work queues associated with one or more execution cores.

12. The dataflow processing system of claim 11, wherein the load balancer is configured to analyze the event pool, the work queues, or both, to determine if work should be performed locally, with respect to the respective run-time system, or if work should be migrated elsewhere.

13. The dataflow processing system of claim 12, wherein the respective run-time system core further comprises a thread migrator configured to migrate work to at least one other run-time system core.

14. A computer program product, in a computer system comprising multiple nodes, the computer program product comprising a storage medium having stored thereon computer program code designed for execution on at least one of said nodes, which upon executed results in the implementation of operations according to the method of claim 1.

15. A computer usable storage medium or network accessible storage medium having executable program code stored thereon, wherein at least a portion of said program code, upon execution, results in the implementation of operations according to the method of claim 1.

* * * * *